United States Patent
Dutescu

(10) Patent No.: US 12,346,128 B1
(45) Date of Patent: Jul. 1, 2025

(54) INDOOR ALTITUDE DETERMINATION FOR AERIAL VEHICLES

(71) Applicant: Amazon Technologies, Inc., Seattle, WA (US)

(72) Inventor: Dan-Adrian Dutescu, Giroc (RO)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 17/958,257

(22) Filed: Sep. 30, 2022

(51) Int. Cl.
*G05D 1/00* (2024.01)
*B64C 39/02* (2023.01)
*B64U 30/294* (2023.01)
*B64U 50/19* (2023.01)
*G05D 1/467* (2024.01)
*G05D 1/48* (2024.01)
*B64U 101/10* (2023.01)
(Continued)

(52) U.S. Cl.
CPC .......... *G05D 1/063* (2013.01); *B64C 39/024* (2013.01); *B64U 30/294* (2023.01); *B64U 50/19* (2023.01); *G05D 1/00* (2013.01); *G05D 1/085* (2013.01); *G05D 1/101* (2013.01); *G05D 1/467* (2024.01); *G05D 1/48* (2024.01); *B64U 2101/10* (2023.01); *B64U 2101/70* (2023.01); *G05D 2111/00* (2024.01)

(58) Field of Classification Search
CPC .......... G05D 1/063; G05D 1/00; G05D 1/085; G05D 1/101; G05D 1/467; G05D 1/48; G05D 2111/00; B64C 39/024; B64U 30/294; B64U 50/19; B64U 2101/10; B64U 2101/70
See application file for complete search history.

(56) References Cited

U.S. PATENT DOCUMENTS

| | | |
|---|---|---|
| 4,865,248 A | 9/1989 | Barth |
| 4,954,962 A | 9/1990 | Evans, Jr. et al. |

(Continued)

FOREIGN PATENT DOCUMENTS

| | | | |
|---|---|---|---|
| CN | 107085434 A | * 8/2017 | ........... G05D 1/0808 |
| CN | 111103894 A | * 5/2020 | ........... G05D 1/0088 |

(Continued)

OTHER PUBLICATIONS

Original and machine translation of CN107085434A (Year: 2017).*

(Continued)

*Primary Examiner* — Frederick M Brushaber
(74) *Attorney, Agent, or Firm* — Athorus, PLLC

(57) ABSTRACT

An aerial vehicle equipped with a first range sensor oriented to capture range data above the aerial vehicle and a second range sensor oriented to capture range data below the aerial vehicle is programmed with global map of an indoor space, including an upper global map representing distance data for upper surfaces of the indoor space and a lower global map representing distance data for lower surfaces of the indoor space. An offset to an altitude is calculated based on a comparison between range data captured by the first range sensor and the upper global map, and range data captured by the second range sensor and the lower global map. Additionally, global maps may be updated based on returns captured by the range sensors, where such data indicates the presence of a previously undetected object.

22 Claims, 59 Drawing Sheets

(51) Int. Cl.
  *B64U 101/70* (2023.01)
  *G05D 111/00* (2024.01)

(56) References Cited

U.S. PATENT DOCUMENTS

| | | |
|---|---|---|
| 5,040,116 A | 8/1991 | Evans, Jr. et al. |
| 5,283,739 A | 2/1994 | Summerville et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,690,997 B2 | 2/2004 | Rivalto |
| 6,694,217 B2 | 2/2004 | Bloom |
| 6,705,523 B1 | 3/2004 | Stamm et al. |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,511,606 B1 | 8/2013 | Lutke et al. |
| 8,577,538 B2 | 11/2013 | Lenser et al. |
| 8,599,027 B2 | 12/2013 | Sanchez |
| 8,602,349 B2 | 12/2013 | Petrov |
| 8,736,820 B2 | 5/2014 | Choe et al. |
| 8,752,166 B2 | 6/2014 | Jung et al. |
| 8,791,790 B2 | 7/2014 | Robertson et al. |
| 8,874,301 B1 | 10/2014 | Rao et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |
| 9,959,773 B2 | 5/2018 | Raptopoulos et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,137,984 B1 | 11/2018 | Flick |
| 10,558,226 B1 | 2/2020 | Bigdeli |
| 10,756,919 B1 * | 8/2020 | Kerzner ................ G05D 1/0282 |
| 11,164,464 B1 * | 11/2021 | Marriott ................ B64U 50/31 |
| 11,370,540 B2 * | 6/2022 | Liu ................ G05D 1/0061 |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |

(56) References Cited

U.S. PATENT DOCUMENTS

| | | |
|---|---|---|
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0160335 A1 | 8/2004 | Reitmeier et al. |
| 2004/0162638 A1 | 8/2004 | Solomon |
| 2004/0257199 A1 | 12/2004 | Fitzgibbon et al. |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0244763 A1 | 10/2007 | Williams et al. |
| 2007/0293978 A1 | 12/2007 | Wurman et al. |
| 2008/0012697 A1 | 1/2008 | Smith et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0189012 A1 | 8/2008 | Kaufmann |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0091435 A1 | 4/2009 | Bolourchi |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0007479 A1 | 1/2010 | Smith |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0169185 A1 | 7/2010 | Cottingham |
| 2010/0287065 A1 | 11/2010 | Alivandi |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0246331 A1 | 10/2011 | Luther et al. |
| 2011/0264311 A1 | 10/2011 | Lee et al. |
| 2011/0282476 A1 | 11/2011 | Hegemier et al. |
| 2011/0313878 A1 | 12/2011 | Norman |
| 2012/0039694 A1 | 2/2012 | Suzanne |
| 2012/0078592 A1 | 3/2012 | Sims |
| 2012/0109419 A1 | 5/2012 | Mercado |
| 2012/0219397 A1 | 8/2012 | Baker |
| 2012/0221438 A1 | 8/2012 | Cook et al. |
| 2012/0234969 A1 | 9/2012 | Savoye et al. |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0093582 A1 | 4/2013 | Walsh et al. |
| 2013/0126611 A1 | 5/2013 | Kangas et al. |
| 2013/0148123 A1 | 6/2013 | Hayashi |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0324164 A1 | 12/2013 | Vulcano |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0102154 A1 | 4/2015 | Duncan et al. |
| 2015/0112837 A1 | 4/2015 | D'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0058181 A1 | 3/2016 | Han et al. |
| 2016/0068267 A1 | 3/2016 | Liu et al. |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0129592 A1 | 5/2016 | Saboo et al. |
| 2016/0130015 A1 | 5/2016 | Caubel et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0180618 A1 | 6/2016 | Ho et al. |
| 2016/0196755 A1 | 7/2016 | Navot et al. |
| 2016/0196756 A1 | 7/2016 | Prakash et al. |
| 2016/0200438 A1 | 7/2016 | Bokeno et al. |

(56) References Cited

U.S. PATENT DOCUMENTS

| | | | |
|---|---|---|---|
| 2016/0207627 | A1 | 7/2016 | Hoareau et al. |
| 2016/0214717 | A1 | 7/2016 | Silva |
| 2016/0214728 | A1 | 7/2016 | Rossi et al. |
| 2016/0235236 | A1 | 8/2016 | Byers et al. |
| 2016/0236778 | A1 | 8/2016 | Takayama et al. |
| 2016/0239789 | A1 | 8/2016 | Hanks |
| 2016/0239803 | A1 | 8/2016 | Borley et al. |
| 2016/0257401 | A1 | 9/2016 | Buchmueller et al. |
| 2016/0258775 | A1 | 9/2016 | Santilli et al. |
| 2016/0266578 | A1 | 9/2016 | Douglas et al. |
| 2016/0282126 | A1 | 9/2016 | Watts et al. |
| 2016/0299233 | A1 | 10/2016 | Levien et al. |
| 2016/0321503 | A1 | 11/2016 | Zhou |
| 2016/0334229 | A1 | 11/2016 | Ross et al. |
| 2016/0340021 | A1 | 11/2016 | Zhang et al. |
| 2016/0364660 | A1 | 12/2016 | Brown |
| 2016/0364679 | A1 | 12/2016 | Cao |
| 2016/0364823 | A1 | 12/2016 | Cao |
| 2016/0364989 | A1 | 12/2016 | Speasl et al. |
| 2017/0011333 | A1 | 1/2017 | Greiner et al. |
| 2017/0011340 | A1 | 1/2017 | Gabbai |
| 2017/0032315 | A1 | 2/2017 | Gupta et al. |
| 2017/0087999 | A1 | 3/2017 | Miller et al. |
| 2017/0096222 | A1 | 4/2017 | Spinelli et al. |
| 2017/0098378 | A1 | 4/2017 | Soundararajan et al. |
| 2017/0100837 | A1 | 4/2017 | Zevenbergen et al. |
| 2017/0101017 | A1 | 4/2017 | Streett |
| 2017/0113352 | A1 | 4/2017 | Lutz et al. |
| 2017/0147975 | A1 | 5/2017 | Natarajan et al. |
| 2017/0154347 | A1 | 6/2017 | Bateman |
| 2017/0164319 | A1 | 6/2017 | Skaaksrud et al. |
| 2017/0167881 | A1 | 6/2017 | Rander et al. |
| 2017/0193442 | A1 | 7/2017 | Ekkel et al. |
| 2017/0199522 | A1 | 7/2017 | Li et al. |
| 2017/0255896 | A1 | 9/2017 | Dyke |
| 2017/0286905 | A1 | 10/2017 | Richardson et al. |
| 2017/0300855 | A1 | 10/2017 | Lund et al. |
| 2017/0305526 | A1 | 10/2017 | Thomassey |
| 2017/0308098 | A1 | 10/2017 | Yu et al. |
| 2017/0316379 | A1 | 11/2017 | Lepek et al. |
| 2017/0330145 | A1 | 11/2017 | Studnicka et al. |
| 2017/0345245 | A1 | 11/2017 | Torresani et al. |
| 2017/0372256 | A1 | 12/2017 | Kantor et al. |
| 2018/0024554 | A1 | 1/2018 | Brady et al. |
| 2018/0088586 | A1 | 3/2018 | Hance et al. |
| 2018/0127211 | A1 | 5/2018 | Jarvis et al. |
| 2018/0137454 | A1 | 5/2018 | Kulkarni et al. |
| 2018/0203464 | A1 | 7/2018 | Yu et al. |
| 2021/0094686 | A1* | 4/2021 | Metzner ............... G08B 19/00 |
| 2022/0404460 | A1* | 12/2022 | Liu ....................... G01S 17/89 |

FOREIGN PATENT DOCUMENTS

| | | | | | |
|---|---|---|---|---|---|
| CN | 118274794 | A | * | 7/2024 | |
| DE | 102011086497 | A1 | | 5/2013 | |
| FR | 2692064 | A1 | | 12/1993 | |
| JP | 2004126800 | A | | 4/2004 | |
| JP | 2011211025 | A | | 10/2011 | |
| WO | 2013148123 | A1 | | 10/2013 | |
| WO | 2017064202 | A1 | | 4/2017 | |
| WO | 2018156991 | A1 | | 8/2018 | |
| WO | WO-2021186507 | A1 | * | 9/2021 | ............. B64C 39/02 |
| WO | WO-2022117411 | A1 | * | 6/2022 | ............ B64C 39/024 |

OTHER PUBLICATIONS

Original and machine translation of CN111103894A (Year: 2024).*
Original and machine translation of CN118274794A (Year: 2020).*
Original and machine translation of WO2021186507A1 (Year: 2021).*
Original and machine translation of WO2022117411A1 (Year: 2022).*
Bullock et al., "Analysis of the Use of Digital Road Maps in Vehicle Navigation," 1994, IEEE, p. 494-501 (Year: 1994).
DHL Trend Research, "Self-Driving Vehicles in Logistics," Dec. 2014, Markus Kuckelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.
DHL Trend Research, "Unmanned Aerial Vehicles in Logistics: a DHL perspective on implications and use cases for the logistics industry," 2014, Markus Kuckelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Hawas et al., "Infrastructureless Inter-Vehicular Real-Time Route Guidance," 2008, IEEE, p. 1213-1219 (Year: 2008).
Kais, Mikael et al., "An Intelligent architecture for automated transportation in our cities", 2001 European Control Conference (ECC), Porto, Portugal, Sep. 4-7, 2001, pp. 277-282 (Year: 2001).
Kladis et al., "Event-Based Energy Optimum Route Planning in the Context of Unmanned Aerial Vehicles for Multi-Objective Exploration Missions," 2009, IEEE, p. 1281-1286 (Year: 2009).
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.
Mike Murphy, "Google wants to deliver packages from self-driving trucks," published Feb. 9, 2016, URL: https://qz.com/613277/google-wants-to-deliver-packages-from-self-driving-trucks/, 4 pages.
Nanohawk Aeraccess: "Unmanned Aerial Vehicle—Aeraccess—Nanohawk—Webarchive Jun. 16, 2019", Jun. 16, 2019 (Jun. 19, 2019), pp. 1-3, XP055759013, URL: https://web.archive.org/web/20190616235755/http://www.aeraccess-group.com/product/indoor/nanohawk [Retrieved from the Internet: Dec. 10, 2020]; the whole document.
Navaravong et al., "Formation Reconfiguration for Mobile Robots with Network Connectivity Constraints," 2012, IEEE, p. 18-24 (Year: 2012).
Parent, Michel et al., "Intelligent Transportation in Cities with CTS", The IEEE 5th International Conference on Intelligent Transportation Systems, Sep. 3-6, 2002, Singapore, pp. 826-830 (Year: 2002).
Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.
Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.
URL: https://web.archive.org/web/20160804001046/https://www.starship.xyz/, download date: Aug. 4, 2016, 21 pages.

* cited by examiner

UPPER GLOBAL MAP CONSTRUCTED FROM SENSOR RETURNS

LOWER GLOBAL MAP CONSTRUCTED FROM SENSOR RETURNS

AERIAL VEHICLE USES GLOBAL MAPS TO CALCULATE OFFSETS $$\text{COST}_U(\Delta) = \sum_{i=1}^{m} (\log((G_i - (I_i + Z_{PREVIOUS} + \Delta))^2 + 1)) \cdot m$$

792

$$\text{COST}_L(\Delta) = \sum_{j=1}^{n} (\log((G_j - (I_j - Z_{PREVIOUS} - \Delta))^2 + 1)) \cdot n$$

794

$$\text{COST}(\Delta) = \alpha \cdot \text{COST}_U(\Delta) + (1-\alpha) \cdot \text{COST}_L(\Delta)$$

795

$$Z = Z' + \Delta$$

790
715-2   715-1

ADJUSTMENT TO ALTITUDE CALCULATED BASED ON OFFSET
CALCULATED ACCORDING TO COST FUNCTIONS

FIG. 7D

AERIAL VEHICLE PROGRAMMED WITH UPPER AND LOWER GLOBAL MAPS OF INDOOR SPACE

LIMITED UPDATES TO GLOBAL MAP AT $P_1$

LOWER GLOBAL MAP UPDATED AT $P_2$ TO REFLECT PRESENCE OF OBSTACLE

INDOOR ALTITUDE DETERMINATION FOR AERIAL VEHICLES

BACKGROUND

An aerial vehicle that operates outdoors may determine information regarding its position in three-dimensional space according to any number of techniques, and based on many types of information or data that may be obtained from any source. For example, an aerial vehicle may determine a position in three-dimensional space using a position sensor, e.g., a Global Positioning System ("GPS") receiver that captures signals from one or more satellites or other sources, as well as an inertial measurement unit (or "IMU"), one or more altimeters, barometers, or other components.

An aerial vehicle that operates indoors, however, may not typically rely on such sensors or techniques to accurately determine an altitude, e.g., distances between the aerial vehicle and floor or ceilings, within an indoor space. For example, most GPS receivers may typically determine positions to within approximately two to five meters, a level of accuracy that is suitable in most outdoor applications but unreliable indoors, where distances between floors and ceilings are often three meters or less. Similarly, because differences in pressure within indoor spaces are minimal, altimeters or other systems that determine altitudes based on pressures are also not typically capable of determining a position of the aerial vehicle with respect to floors or ceilings of indoor spaces to any reliable extent.

BRIEF DESCRIPTION OF THE DRAWINGS

FIGS. 7A through 7D are views of aspects of one system in accordance with embodiments of the present disclosure.

DETAILED DESCRIPTION

As is set forth in greater detail below, the present disclosure is directed to systems and methods for determining altitudes of aerial vehicles operating within indoor spaces. The present disclosure describes, inter alia, aerial vehicles that are outfitted with range sensors that are oriented in opposing directions, viz., with axes of orientation extending above and below the aerial vehicles, and configured to capture data representing distances to surfaces located above and below the aerial vehicles. An aerial vehicle may be programmed with global maps representing distances to surfaces within an indoor space, e.g., a room or other structure of any type or form. The global maps may include upper global maps and lower global maps, each of which may include cells of fixed dimensions and represent distances to surfaces above and below, respectively, a datum or standard level or altitude within the indoor space.

When an altitude and a position of an aerial vehicle operating within an indoor space are determined using one or more sensors, the range sensors operating in opposed directions may capture data (e.g., input frames) regarding distances to surfaces above and below the aerial vehicle, and the data processed into input grids having cells of the same dimensions as cells of an upper global map or a global map. Where cells of an input grid are in common with cells of a global map corresponding to a horizontal position of the aerial vehicle, cost functions representing offsets of altitude above and below the aerial vehicle, respectively, are determined. An overall offset that minimizes differences between cells of the input grids and cells of an upper global map and a lower global map corresponding to the position of the aerial vehicle is calculated, and the altitude determined by the onboard sensors is adjusted based on the offset. Moreover, distance values of cells of input grids that are in common with cells of global maps may be used to update distance values of the cells of the global maps accordingly, while cells of the input grids that are not included in the global maps may be added to the global maps along with their respective distance values.

Figure 1A:
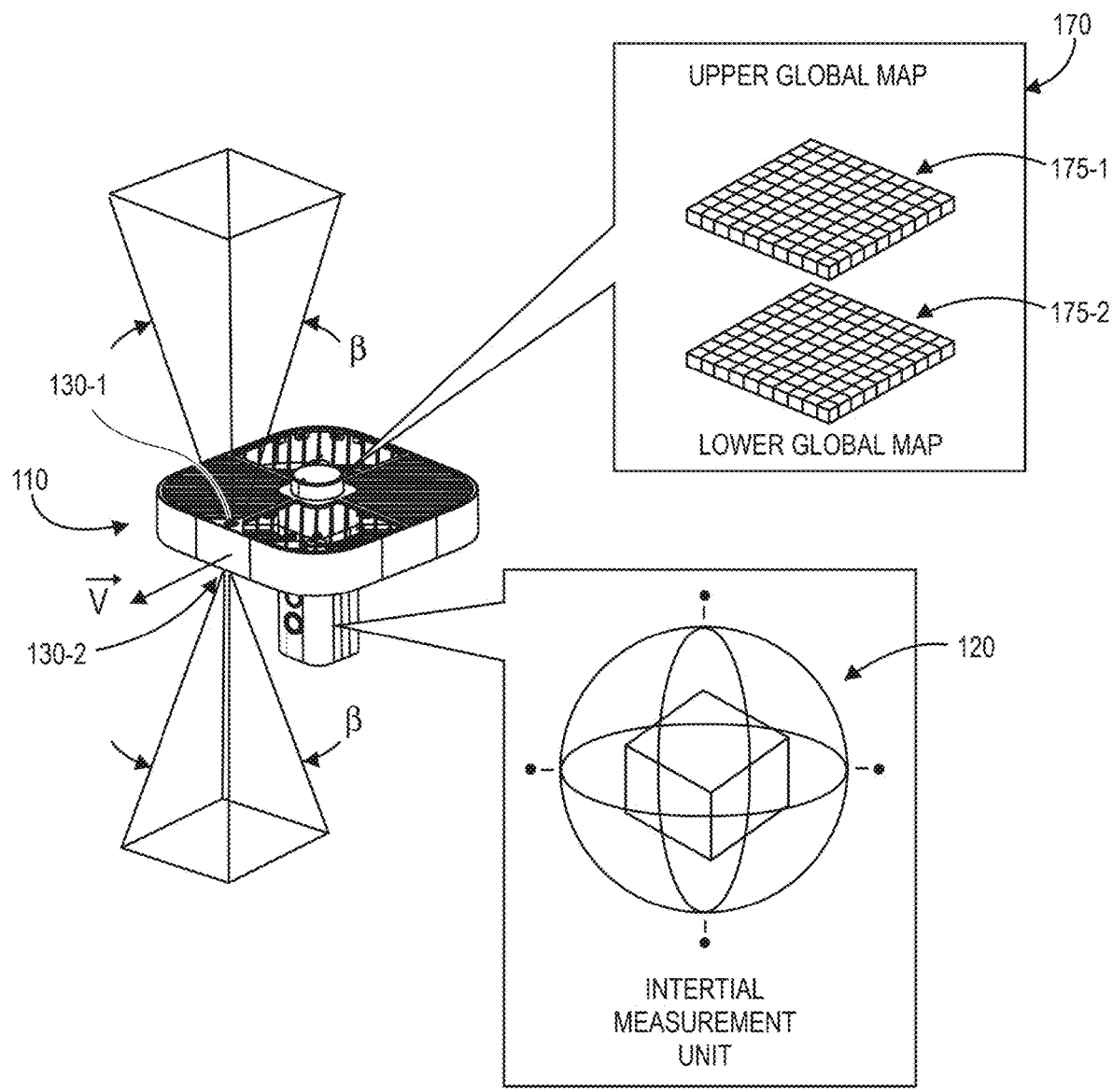
FIGS. 1A through 1G are views of aspects of one system in accordance with embodiments of the present disclosure.

Referring to FIGS. 1A through 1G, views of aspects of one system in accordance with embodiments of the present disclosure are shown. As is shown in FIG. 1A, a drone 110, e.g., an aerial vehicle, travels at a velocity V. The drone 110 is outfitted with an inertial measurement unit 120 (or "IMU"), a range sensor 130-1 and a range sensor 130-2. The inertial measurement unit 120 may be any type or form of onboard device for sensing changes in linear or rotational motion of the aerial vehicle 110, and may include one or more gyroscopes, one or more accelerometers, one or more compasses (or other magnetometer), and a Global Positioning System ("GPS") transceiver.

Gyroscopes of the inertial measurement unit 120 may be any mechanical or electrical device, component, system, or instrument for determining an orientation, e.g., the orientation of the aerial vehicle 110, such as a traditional mechanical gyroscope, or any type or form of electrical component for determining an orientation of the aerial vehicle 110. In some embodiments, the gyroscopes may generate angular rate data in any direction or along or about any axis. Accelerometers of the inertial measurement unit 120 may be any mechanical or electrical devices, components, systems, or instruments for sensing or measuring accelerations, including but not limited to devices having one or more potentiometers, linear variable differential transformers, variable reluctance devices or piezoelectric components. The gyroscopes and/or the accelerometers of the inertial measurement unit 120 may be configured to capture or generate angular rate data or acceleration data, respectively, in any direction or along or about any axis, and at any rate or frequency, such as at frequencies ranging from zero to five hundred Hertz (0-500 Hz) or at frequencies greater than five hundred hertz (500 Hz).

Compasses of the inertial measurement unit 120 may be any devices, components, systems, or instruments adapted to determine one or more directions with respect to a frame of reference that is fixed with respect to the surface of the Earth (e.g., a pole thereof). GPS transceivers of the inertial measurement unit 120 may be any devices, components, systems, or instruments adapted to receive signals (e.g., trilateration data or information) relating to a position of the inertial measurement unit 120 from one or more GPS satellites of a GPS network (not shown), or for reporting the position of the inertial measurement unit 120 determined based on such signals.

In some embodiments, the inertial measurement unit 120 may further include any number of computer components, e.g., one or more processors, memory components and/or transceivers (not shown), or any other components for aiding in the determination of accelerations, velocities, positions and/or orientations.

The range sensors 130-1, 130-2 may be provided at an upper edge and a lower edge of a frame of the aerial vehicle 110, respectively. Each of the range sensors 130-1, 130-2 may comprise illuminators or other light sources (e.g., modulated light sources) that are configured to transmit light along common or parallel axes and in opposite directions, e.g., above and below the aerial vehicle 110, and to capture reflections of the light transmitted thereby off one or more surfaces above or below the aerial vehicle 110, as well as to interpret such reflections in order to generate depth images, range profiles or other sets of distances between the range sensors 130-1, 130-2, and the one or more surfaces, several times per second. Each of the range sensors 130-1, 130-2 may have fields of view that extend at angles β from the range sensors 130-1, 130-2 about axes of orientation of the range sensors 130-1, 130-2.

The aerial vehicle 110 is also programmed with data 170 representing an upper global map 175-1 and a lower global map 175-2, each of which includes a plurality of cells (or elements) having fixed dimensions that contain distance values corresponding to surfaces above and below the aerial vehicle 110. In some implementations, the distance values of each of the cells may be calculated with respect to a datum or fixed altitude or level, which may be associated with an initial or standard position associated with the aerial vehicle, e.g., a dock or other landing or takeoff station or location. Alternatively, the distance values of each of the cells may be calculated with respect to any altitude or level, or any position or plane. The cells (or elements) of each of the upper global map 175-1 and the lower global map 175-2, and the upper global map 175-1 and the lower global map 175-2 themselves, may have any shape or dimensions. For example, the cells of the upper global map 175-1 and the lower global map 175-2 may have a square shape, with sides of ten centimeters (or 10 cm) each, or any may have other shapes or dimensions. Additionally, the cells (or elements) of the upper global map 175-1 and the lower global map 175-2 may be homogenous or heterogenous in nature.

Figure 1B:
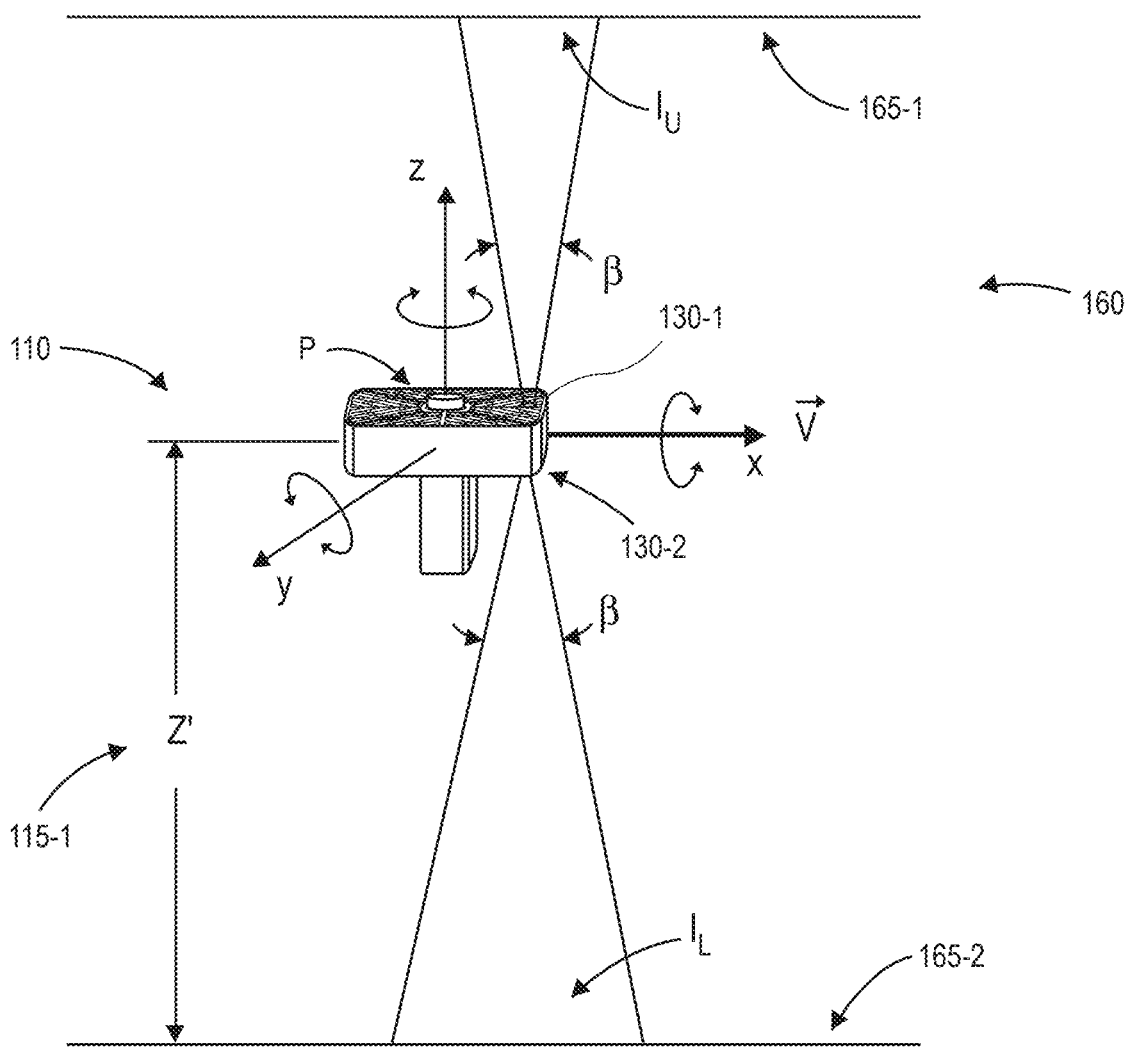

As is shown in FIG. 1B, as the aerial vehicle 110 travels within a room 160 or another indoor space, the aerial vehicle 110 may determine a position P and an altitude 115-1, or z', of the aerial vehicle 110, as well as velocities, accelerations or orientations along or about one or more principal axes using the inertial measurement unit 120 or any other onboard sensors. Additionally, the aerial vehicle 110 may capture range data (or imaging data) representing distances between each of the range sensors 130-1, 130-2 and the respective upper surface 165-1 and lower surface 165-2 of the room 160. In some implementations, the range sensors 130-1, 130-2 may be time-of-flight sensors that transmit light and capture returns of light reflected off portions of the upper surface 165-1 and the lower surface 165-2, respectively, and determine distances or ranges to the respective surfaces 165-1, 165-2 based on durations between transmissions of the light and the capture of the reflections of the light.

The room 160 may be any indoor space such as a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. Additionally, the upper surface 165-1 may be a ceiling or any other covering surface aligned at any angle (e.g., horizontal, or any non-horizontal angle), while the lower surface 165-2 may be a floor or any other traveling surface aligned at any angle (e.g., horizontal, or any non-horizontal angle). In some implementations, the upper surface 165-1 and the lower surface 165-2 may be parallel to one another in their entireties, or in select locations of the respective surfaces. Alternatively, in some other implementations, the upper surface 165-1 and the lower surface 165-2 need not be parallel to one another.

As is shown in FIG. 1B, returns of reflected light from the upper surface 165-1 may form an upper input frame $I_U$ representing distances or ranges to all portions of the upper surface 165-1 that are present within a field of view of the range sensor 130-1. As is also shown in FIG. 1B, returns of reflected light from the lower surface 165-2 may form a lower input frame $I_L$ representing distances or ranges to all portions of the lower surface 165-2 that are present within a field of view of the range sensor 130-2.

Figure 1C:
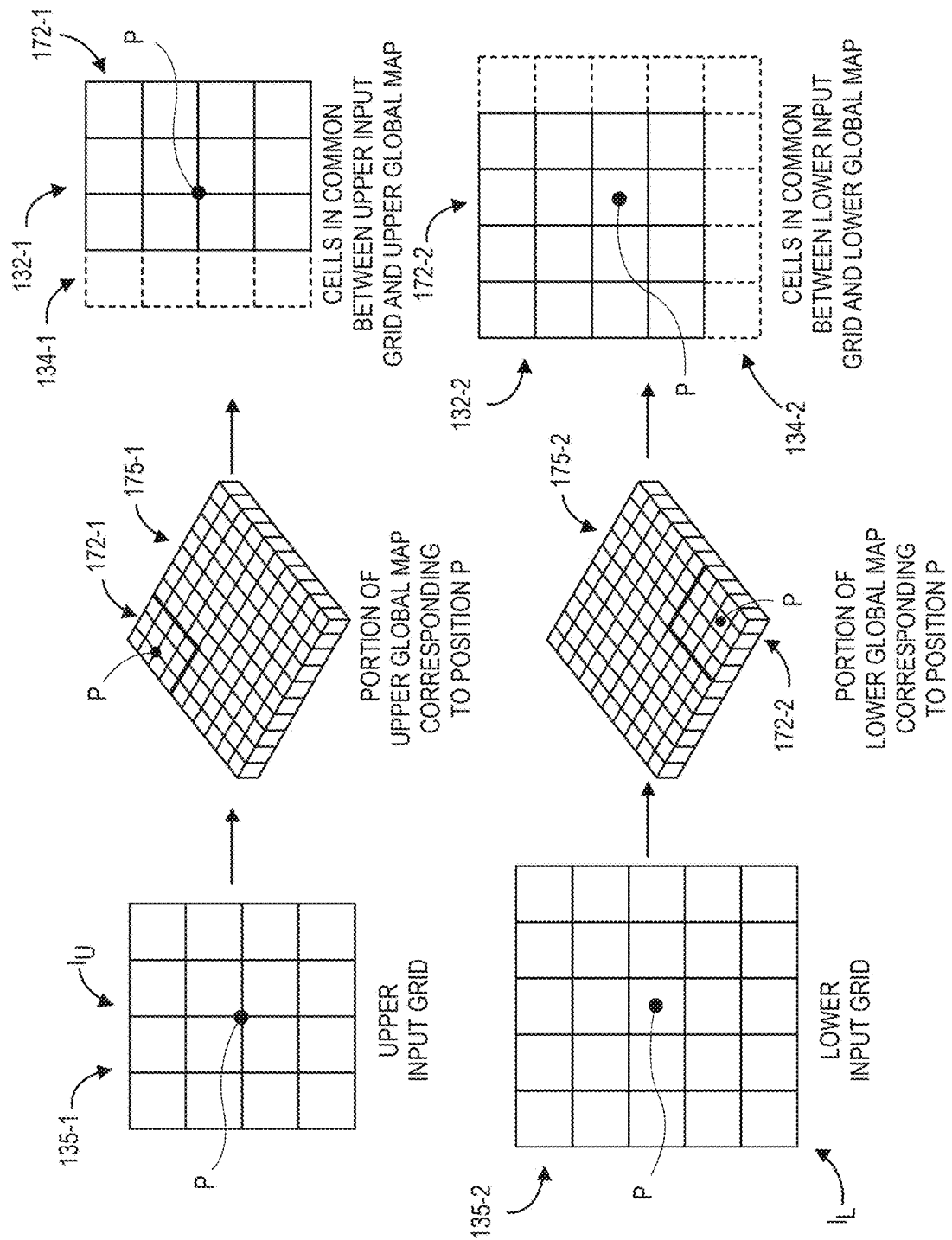

As is shown in FIG. 1C, the input frames representing distances or ranges to portions of surfaces above or below the aerial vehicle 110 may be used to generate input grids, e.g., an upper input grid and a lower input grid, including distance data represented in cells having the same dimensions as the cells of the upper portion 175-1 and the lower global map 175-2. For example, as is shown in FIG. 1C, the upper input frame $I_U$ of FIG. 1C is shown as having been partitioned into a grid having sixteen cells, e.g., a four-by-four grid, while the lower input frame $I_L$ is shown as having been partitioned into a grid having twenty-five cells, e.g., a five-by-five grid. Values assigned to each of the cells in the upper input grid or the lower input grid may represent minimum distances (e.g., nearest or shortest distances) of each of the returns represented within the respective grids, average distances, or any other measure representative of the distances.

As is further shown in FIG. 1C, a set of cells 172-1 corresponding to the position P of the aerial vehicle 110 as determined by the one or more onboard sensors, may be identified from the upper global map 175-1. Based on the position P, a subset of cells 132-1 (viz., twelve cells) of the upper input grid 135-1 that are determined to be in common with cells 172-1 of the upper global map 175-1, and a subset of cells 134-1 (viz., four cells) of the upper input grid 135-1 that are determined to be not in common with any of the cells of the upper global map 175-1 are identified. Likewise, and also based on the position P, a subset of cells 132-2 (viz., sixteen cells) of the lower input grid 135-2 that are determined to be in common with cells 172-2 of the upper global map 175-1, and a subset of cells 134-2 (viz., nine cells) of the lower input grid 135-2 that are determined to be not in common with any of the cells of the lower global map 175-2 may be identified.

Figure 1D:
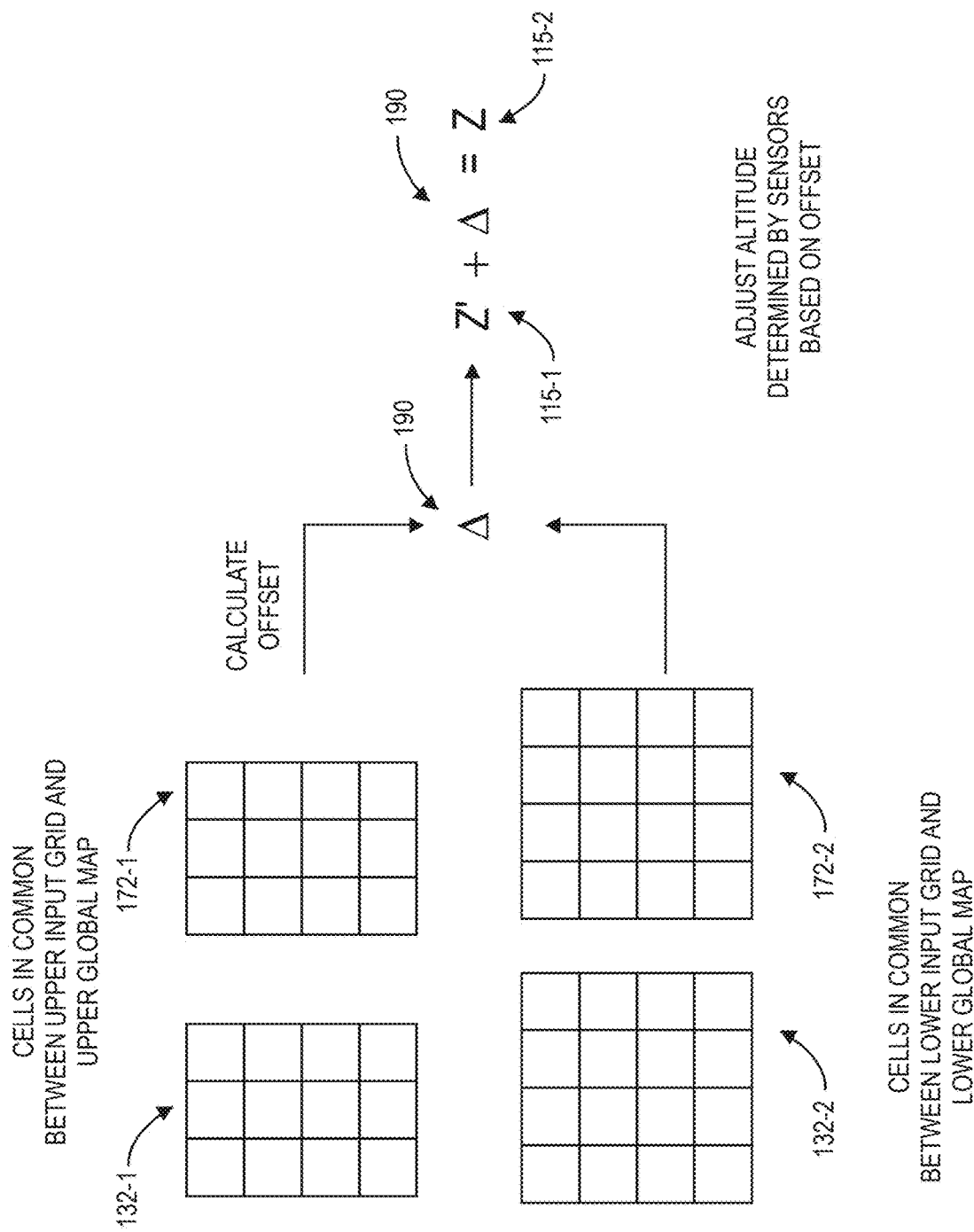

As is shown in FIG. 1D, an offset of altitude 190 may be calculated based on the cells in common between the upper input grid 135-1 and the upper global map 175-1, and also the cells in common between the lower input grid 135-2 and the lower global map 175-2. To calculate the offset of altitude 190, or $\Delta$, an optimization problem may be solved and one or more cost functions may be executed based on differences between the cells or elements in common in each of the input grids and portions of the global map. For example, the cost functions may determine a logarithmic sum of differences between values of cells in the upper portion of the global map and the upper input grid, to minimize the offset in altitude.

In some implementations, a first cost function for determining an offset of altitude, or $\Delta$, based on data captured above the aerial vehicle and a portion of a global map corresponding to surfaces above the aerial vehicle is shown in Equation (1), below:

$$\mathrm{COST}_U(\Delta) = \sum_{i=1}^{m} \left(\log\left((G_i - (I_i + Z_{PREVIOUS} + \Delta))^2 + 1\right)\right) \cdot m \quad (1)$$

where $\Delta$ is the offset of altitude 190, where m is a number of cells in common between an input grid formed from data captured by a range sensor above the aerial vehicle within an indoor space and the upper global map 175-1; where $G_i$ is a cell of the upper global map 175-1, e.g., one of the cells of the upper global map 175-1; where $I_i$ is a cell of the input grid in common with the cell $G_i$, e.g., one of the cells of the upper input grid 135-1 corresponding to the cell $G_i$; and where $Z_{PREVIOUS}$ is a previously calculated altitude of the aerial vehicle 110.

In some implementations, a second cost function for determining an offset of altitude, or $\Delta$, based on data captured below the aerial vehicle and a portion of a global map corresponding to surfaces below the aerial vehicle is shown in Equation (2), below:

$$\mathrm{COST}_L(\Delta) = \sum_{j=1}^{n} \left(\log\left((G_j - (I_j + Z_{PREVIOUS} - \Delta))^2 + 1\right)\right) \cdot n \quad (2)$$

where n is a number of cells in common between an input grid formed from data captured by a range sensor below the aerial vehicle within an indoor space and a portion of a global map of the indoor space corresponding to the input grid; where $G_j$ is a cell of the portion of the lower global map 175-2; and where $I_j$ is a cell of the input grid in common with the cell $G_j$, e.g., one of the cells of the lower input grid 135-1 corresponding to the cell $G_j$; and where $Z_{PREVIOUS}$ is the previously calculated altitude of the aerial vehicle 110.

In some implementations, a third cost function for determining an offset of altitude, or $\Delta$, based on the first and second cost function is shown in Equation (3), below:

$$\mathrm{COST}(\Delta) = \alpha \cdot \mathrm{COST}_U(\Delta) + (1-\alpha) \cdot \mathrm{COST}_L(\Delta) \quad (3)$$

where $\alpha$ is a factor for weighting an effect of the first cost function in determining the offset of altitude 190, and has a value between 0 and 1.

Finally, as is shown in FIG. 1D, an altitude determined by one or more sensors of an aerial vehicle, such as the altitude 115-1 shown in FIGS. 1A and 1B, may be modified by adding the offset of altitude 190 thereto, to determine an altitude 115-2.

Figure 1E:
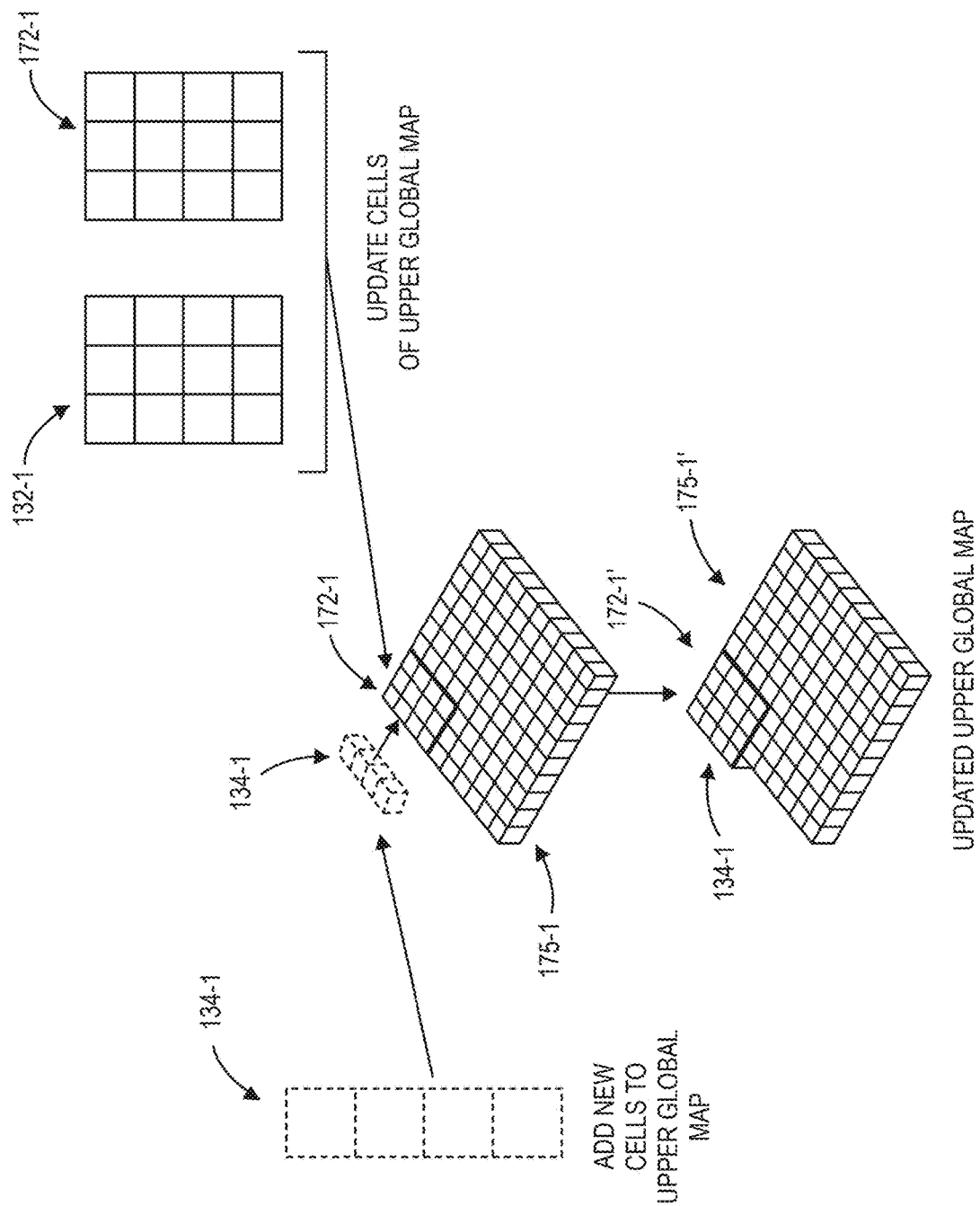

Additionally, the global maps may be updated based on the input grids determined from data captured by the range sensors 130-1, 130-2, at any rate or frequency. As is shown in FIG. 1E, the subset of cells 134-1 of the upper input grid 135-1 that are determined to be not in common with any of the cells of the upper global map 175-1 may be added to the upper global map 175-1, e.g., in a portion adjacent the subset of cells 132-1 of the upper input grid 135-1 that were determined to be in common with the cells 172-1 of the upper global map 175-1, on an edge of the upper global map 175-1 corresponding to the position P. In some implementations, distance values of the subset of cells 134-1 added to the upper global map 175-1 may be determined based on the values of the subset of the cells 134-1 of the input grid 135-1 and the value of the offset of altitude 190, modified with respect to the datum or other altitude or level associated with the other cells of the upper global map 175-1.

Additionally, values of the set of cells 172-1 that were determined to be in common with the subset of cells 132-1 of the upper input grid 135-1 may be updated based on the original values of the set of cells 172-1 and the values of the subset of cells 132-1, modified with reference to the datum or other altitude or level associated with the other cells of the upper global map 175-1. For example, in some implementations, an updated upper global map 175-1' may include not only the subset of cells 134-1 and their associated distance values, as modified with respect to the datum or other altitude or level, but also a set of cells 172-1' in the same locations as the set of cells 172-1, and with values equal to a weighted sum of the original values of the set of cells 172-1 and the values of the subset of cells 132-1. In some implementations, each of the set of cells 172-1' may have a value equal to a sum of ninety-five percent of an original value of one of the set of cells 172-1 and five percent of a value of a corresponding one of the subset of cells 132-1. Alternatively, any ratios or factors other than ninety-five percent or five percent may be applied to original values of cells of a portion of the upper global map 175-1, and values of corresponding cells of input grids determined from data captured by the range sensors 130-1, 130-2 in accordance with implementations of the present disclosure.

Figure 1F:
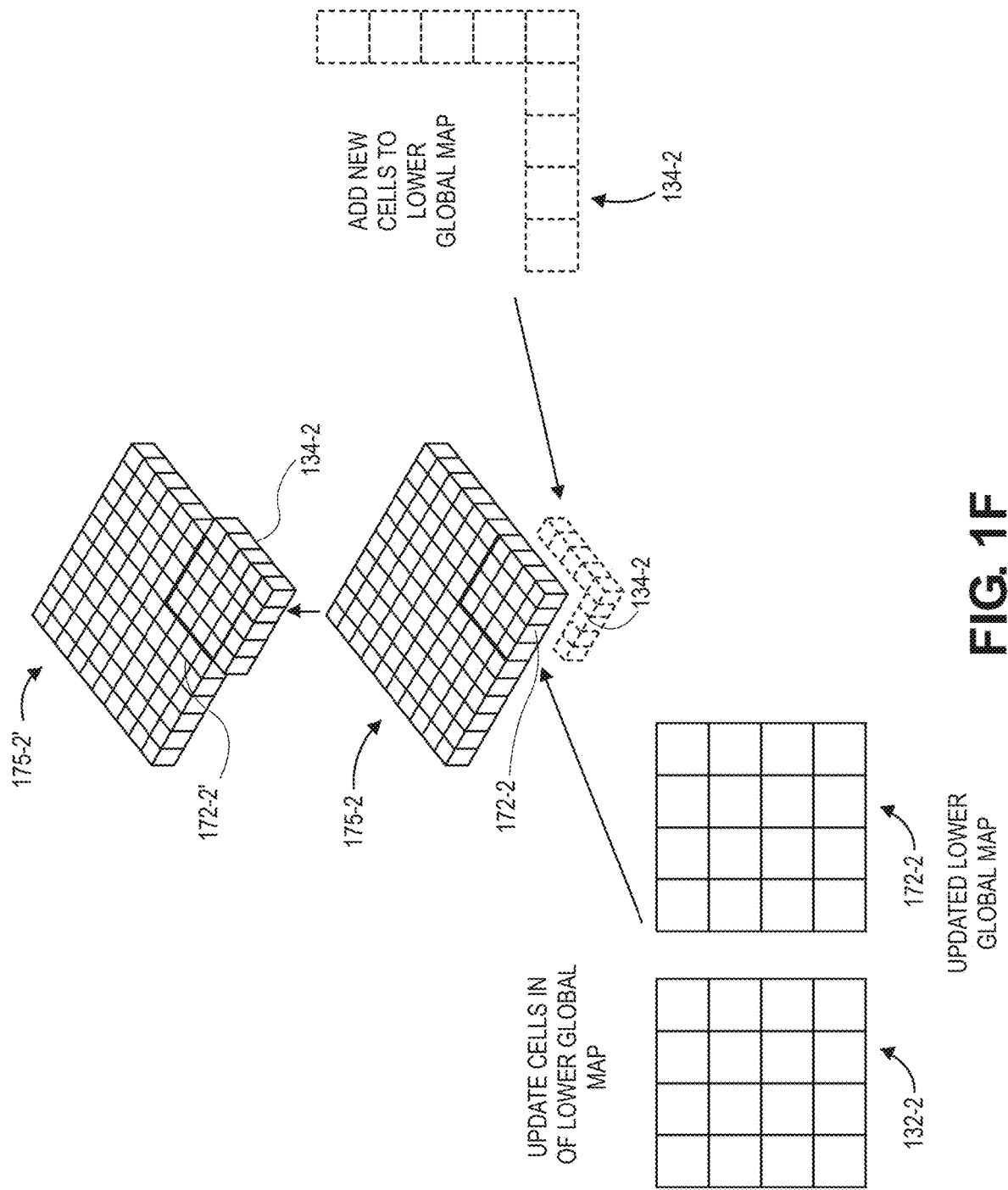

Similarly, as is shown in FIG. 1F, the subset of cells 134-2 of the lower input grid 135-2 that are determined to be not in common with any of the cells of the lower global map 175-2 may be added to the lower global map 175-2, e.g., in a portion adjacent the subset of cells 132-2 of the lower input grid 135-2 that were determined to be in common with the cells 172-2 of the lower global map 175-2, on a corner of the lower global map 175-2 corresponding to the position P. In some implementations, distance values of the subset of cells 134-2 added to the lower global map 175-2 may be determined based on the values of the subset of the cells 134-2 of the input grid 135-2 and the value of the offset of altitude 190, modified with respect to the datum or other altitude or level associated with the other cells of the lower global map 175-2.

Additionally, values of the set of cells 172-2 that were determined to be in common with the subset of cells 132-2 of the lower input grid 135-2 may be updated based on the original values of the set of cells 172-2 and the values of the subset of cells 132-2, modified with reference to the datum or other altitude or level associated with the other cells of the lower global map 175-2. For example, in some implementations, an updated lower global map 175-2' may include not only the subset of cells 134-2 and their associated distance values, as modified with respect to the datum or other altitude or level, but also a set of cells 172-2' in the same locations as the set of cells 172-2, and with values equal to a weighted sum of the original values of the set of cells 172-2 and the values of the subset of cells 132-2. In some implementations, each of the set of cells 172-2' may have a value equal to a sum of ninety-five percent of an original value of one of the set of cells 172-2 and five percent of a value of a corresponding one of the subset of cells 132-2.

Figure 1G:
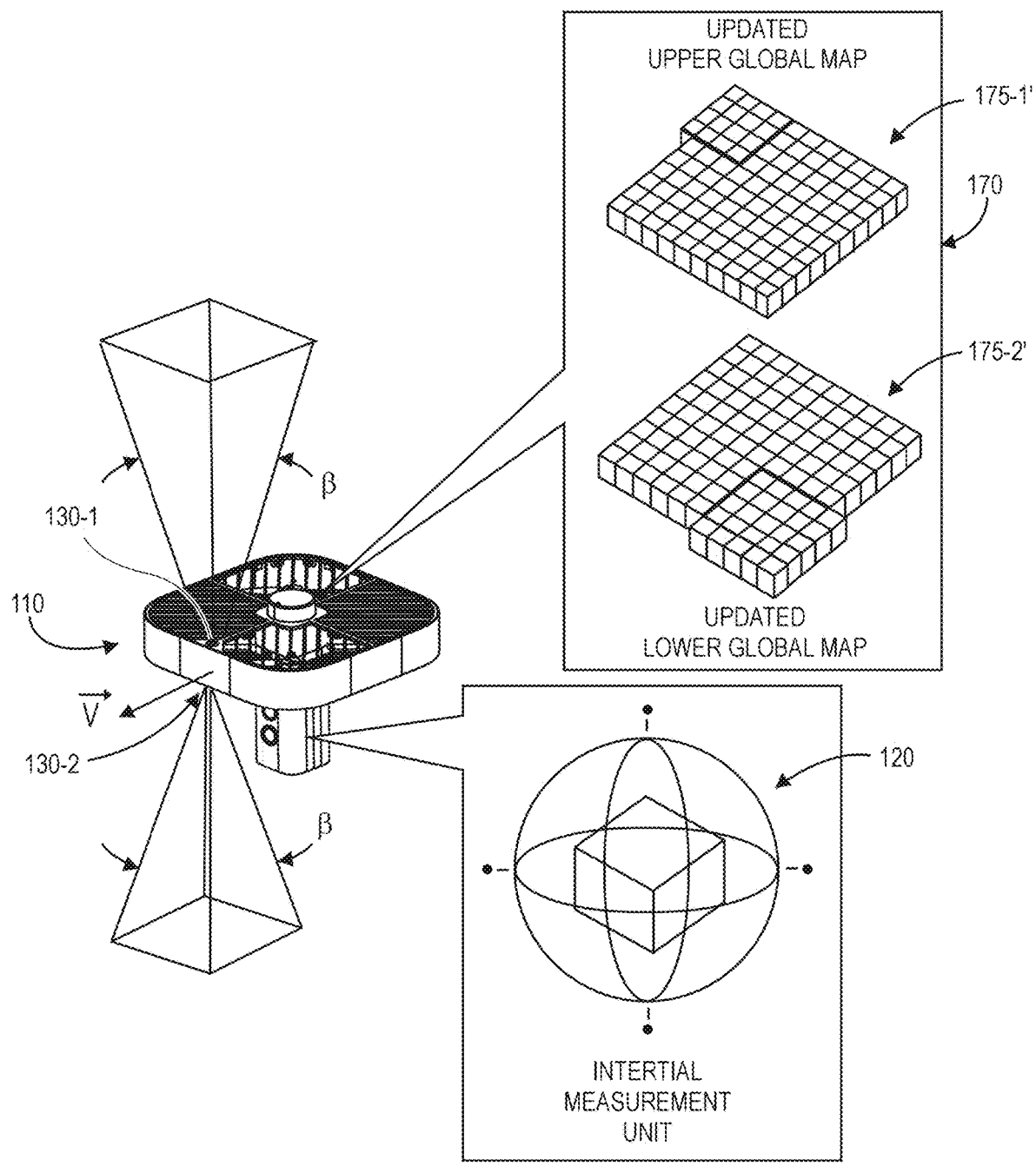

As is shown in FIG. 1G, the aerial vehicle 110 may store the updated upper global map 175-1' and the updated lower global map 175-2' in one or more memory components provided aboard the aerial vehicle 110 and utilize the updated upper global map 175-1' and the updated lower global map 175-2' for any purpose. For example, the aerial vehicle 110 may utilize the updated upper global map 175-1' or the updated lower global map 175-2' during subsequent travel throughout the room 160, or transmit information or data regarding the updated global map 175-1' or the updated global map 175-2' to one or more external devices or systems for any purpose.

In accordance with one or more preferred implementations, a time-of-flight (or "TOF") sensor is utilized to generate distance data. In accordance with one or more preferred implementations, a time of flight sensor utilizes a series of timed pulses, an amplitude modulated pulse, on/off keying, or another approach to facilitate distance determination.

Figure 9:
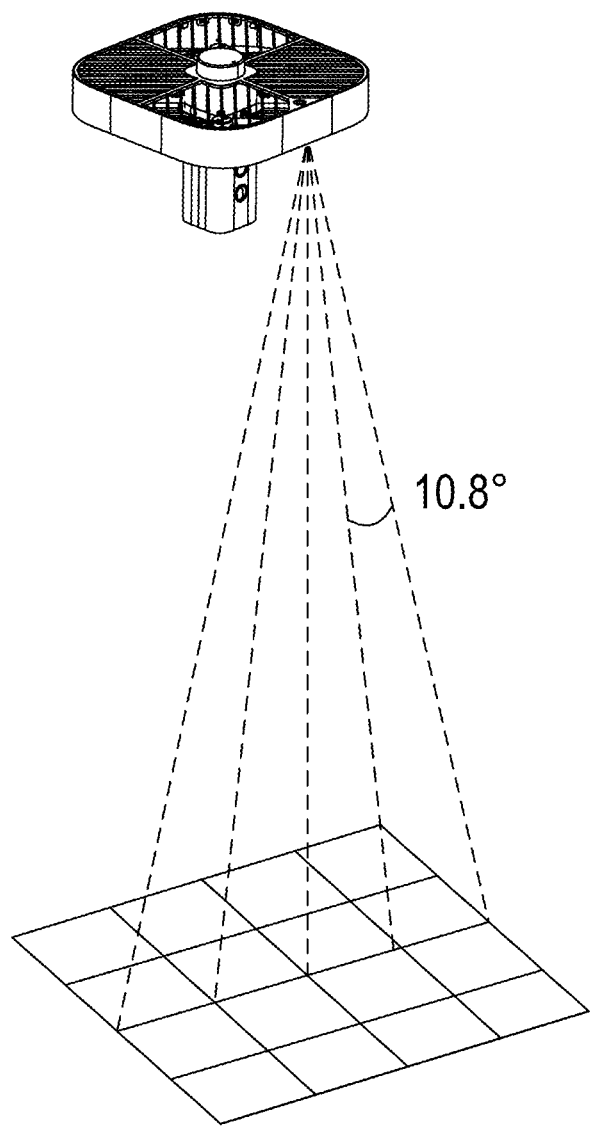
FIG. 9 is a view of aspects of one system in accordance with embodiments of the present disclosure.
Figure 10:
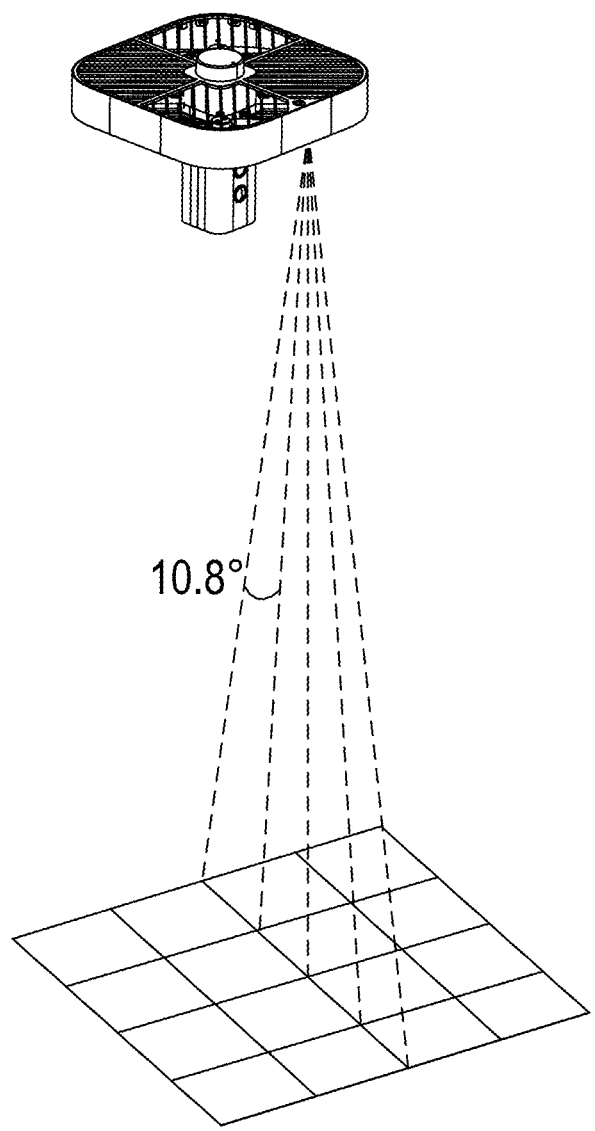
FIG. 10 is a view of aspects of one system in accordance with embodiments of the present disclosure.
Figure 11:
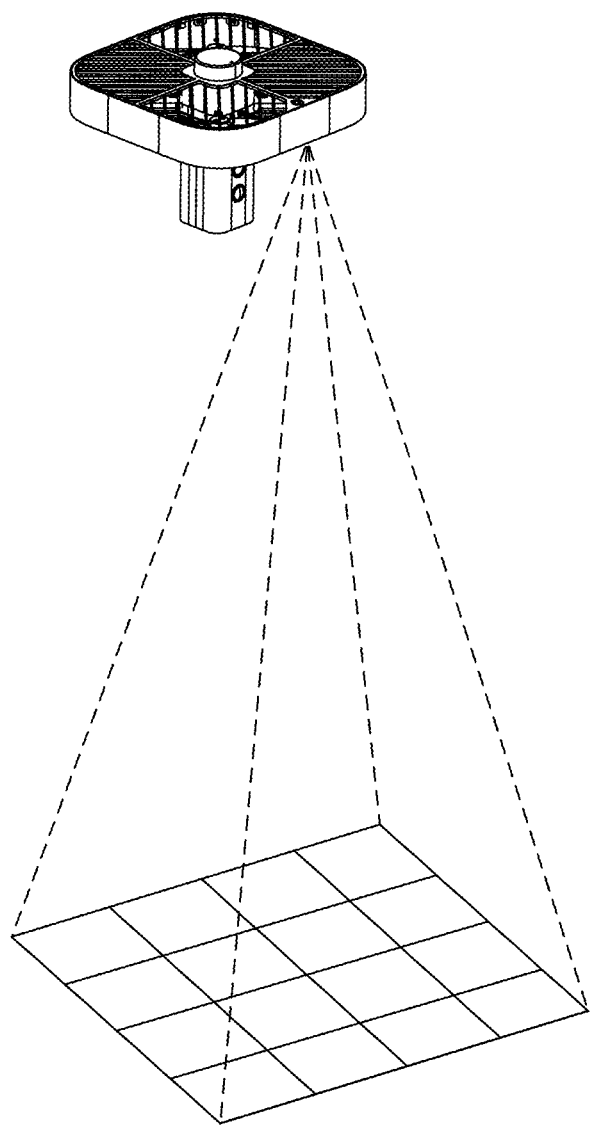
FIG. 11 is a view of aspects of one system in accordance with embodiments of the present disclosure.

In accordance with one or more preferred implementations, a time-of-flight sensor has a 43.2 degree x-axis field of view and a 43.2 degree y-axis field of view. In accordance with one or more preferred implementations, this x-axis field of view is split into four portions, each 10.8 degrees wide, and this y-axis field of view is split into four portions, each 10.8 degrees wide, such that a 4×4 grid is defined, as illustrated in FIGS. 9-11.

Figure 12:
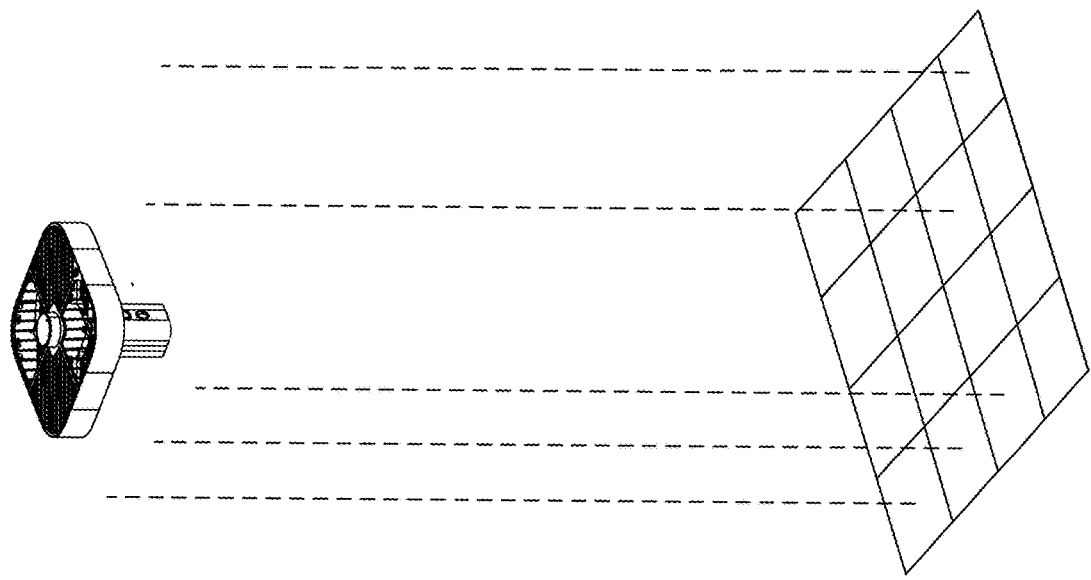
FIG. 12 is a view of aspects of one system in accordance with embodiments of the present disclosure.

In accordance with one or more preferred implementations, a sensor unit provides 16 projected distance values, with each projected distance value indicating a distance straight up/down to a hypothetical plane level with the sensor, as fancifully illustrated in FIG. 12. That is, although light may travel at an angle before being received at the sensor, e.g., as illustrated by the solid line in FIG. 13, the sensor unit will provide a projected distance value indicating a distance straight up to a hypothetical plan, e.g., as illustrated by the dotted line in FIG. 13.

Figure 14:
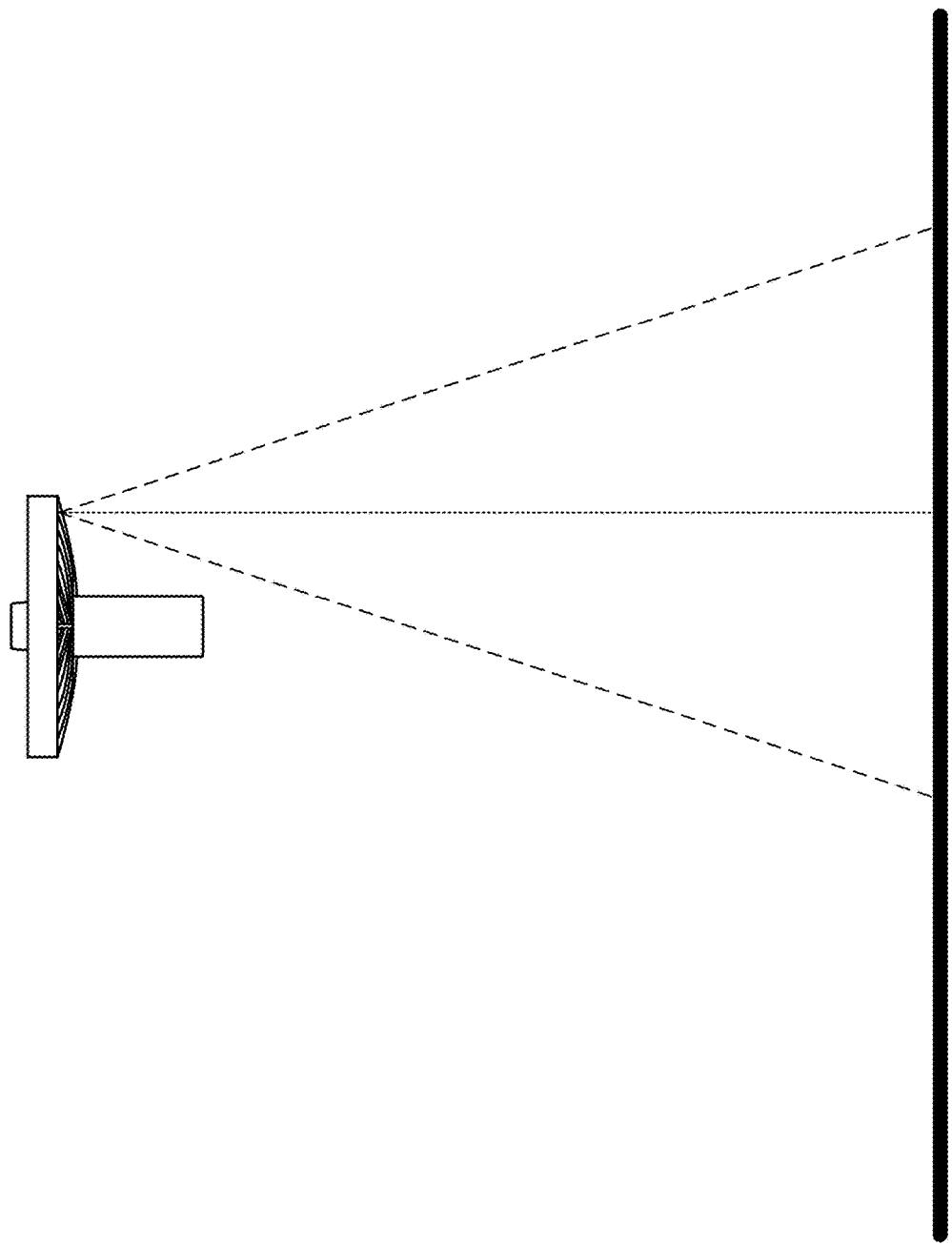
FIG. 14 is a view of aspects of one system in accordance with embodiments of the present disclosure.
Figure 15:
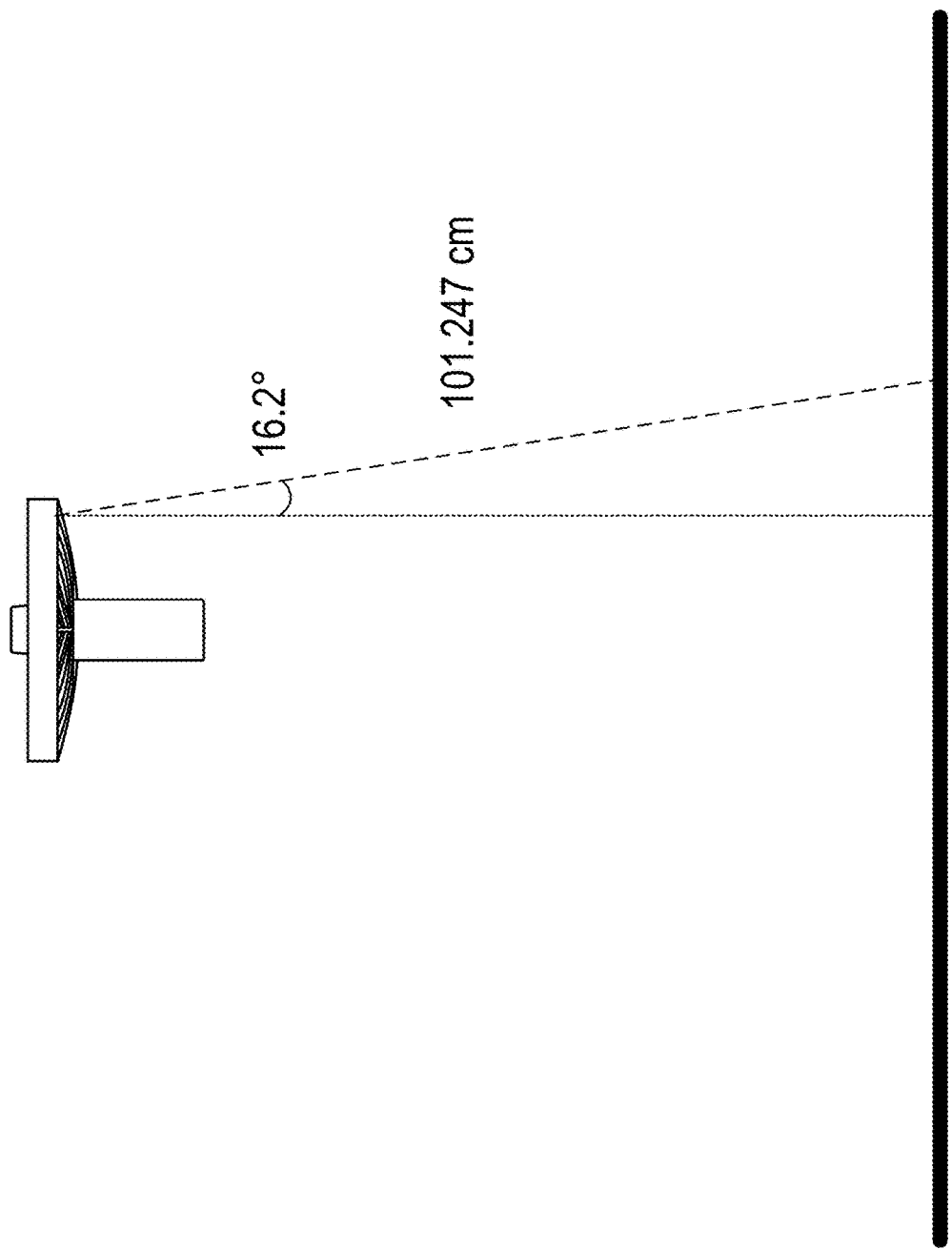
FIG. 15 is a view of aspects of one system in accordance with embodiments of the present disclosure.
Figure 16:
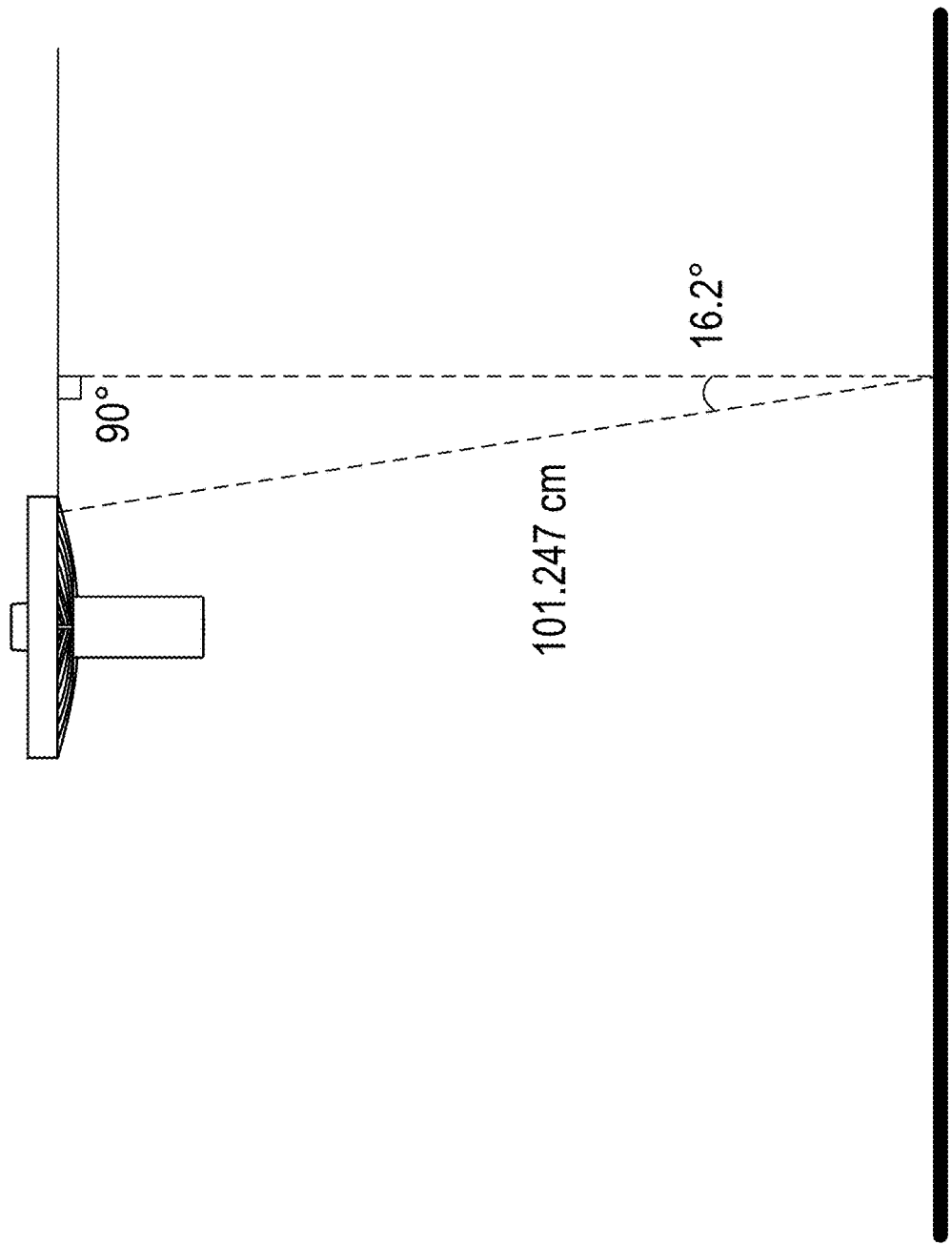
FIG. 16 is a view of aspects of one system in accordance with embodiments of the present disclosure.
Figure 17:
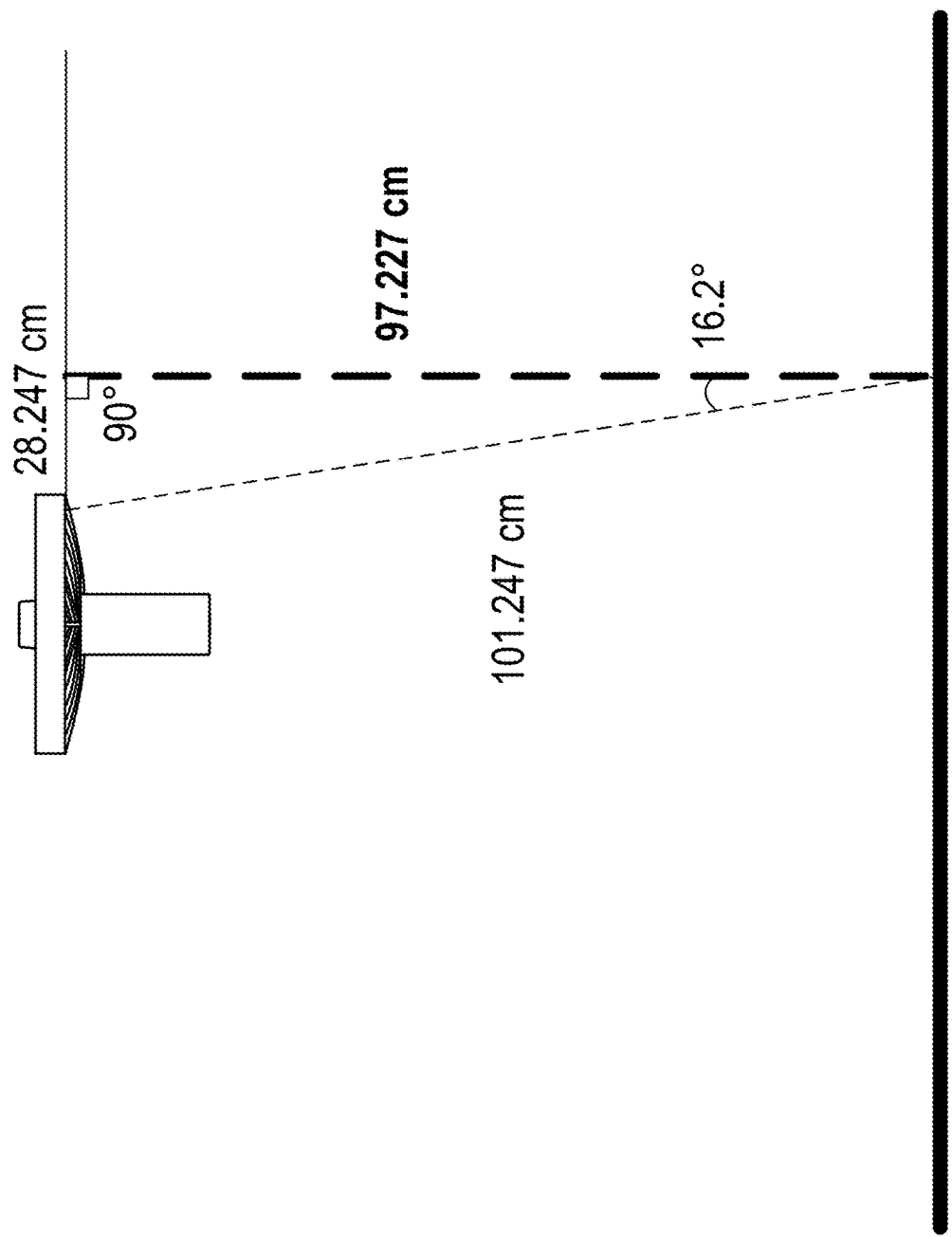
FIG. 17 is a view of aspects of one system in accordance with embodiments of the present disclosure.

For illustrative purposes, consider a basic example of a drone traveling with zero pitch, as illustrated in FIG. 14. FIG. 15 fancifully illustrates an original distance measurement generated by a sensor unit corresponding to a sensor grid square having a central point displaced 16.2 degrees along a y-axis of the drone. For clarity, it is assumed that the central point of the grid square is disposed along the y-axis and not displaced at all with respect to an x direction, although it will be appreciated that in the scenario of a 4×4 grid, there would be some displacement. The geometric operations required become more complex for the three-dimensional example, so the simplified example is utilized here for clarity. FIGS. 16-17 fancifully illustrate calculation of a projected vertical distance measurement from a center of the hypothetical sensor grid square to a plane level with the sensor unit.

Figure 13:
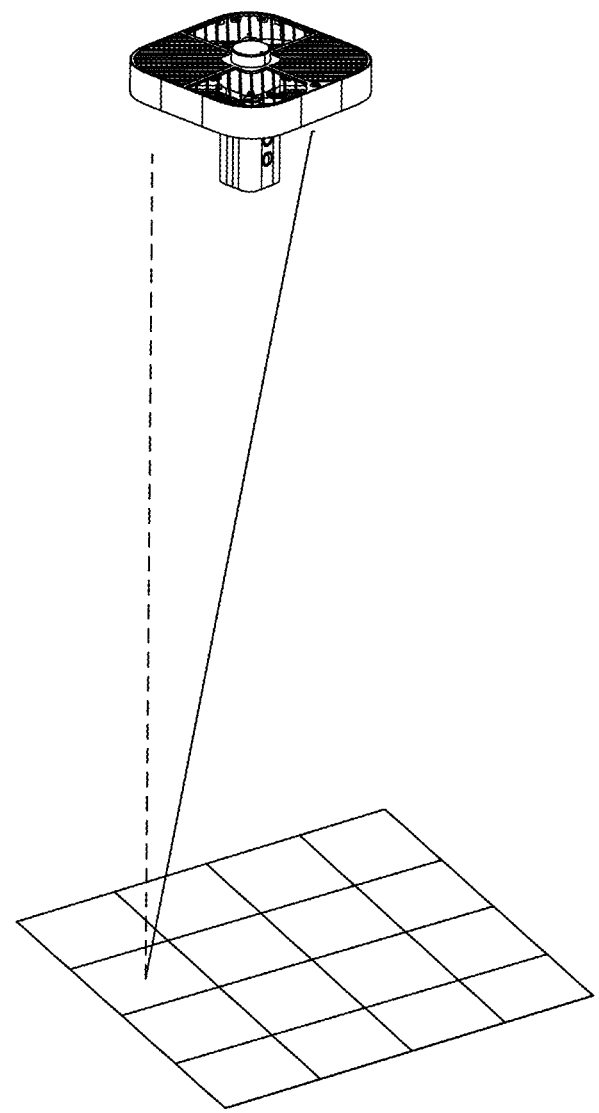
FIG. 13 is a view of aspects of one system in accordance with embodiments of the present disclosure.

In accordance with one or more preferred implementations, a sensor unit may instead simply provide original distance values indicating a non-projected distance (e.g., a distance value corresponding to the dotted line in FIG. 13).

In instances in which a sensor unit provides projected distance values, for each projected distance value provided by the sensor unit, the system determines an original underlying distance value and angle. In order to do so, each distance value is assumed to correspond to a square area that is a level plane. Although each distance value in reality is based on light that may have traveled at various angles, the sensor unit's distance value is assumed to correspond to light from a center point of the square area to the sensor. The system operates on the hypothetical that each distance value corresponds to a hypothetical original light ray that traveled from a center point of a square area. The angle for each distance value is determined based on dividing the 43.2 degree x-axis field of view and the 43.2 degree y-axis field of view equally to create a 4×4 grid of squares, with the center of the grid corresponding to the sensor location. The angles are determined based simply on dividing the 43.2 degree field of view for each axis into equal portions to determine an angle value for the center points, e.g., if the sensor is (0,0), then one angle would be (5.4, 5.4), and another would be (16.2, 16.2). The length of the hypothetical original light ray is determined based on the angle of the hypothetical light ray (which extends from a point to the sensor) and the sensor unit projected distance value (which extends straight up/down from the same point).

In accordance with one or more preferred implementations, angle values are determined for a given x-axis and y-axis field of view. In accordance with one or more preferred implementations, a set of angle values is determined for each central point of a grid square for sensor data, for example relative to a hypothetical vertical line extending from a sensor at (0 degrees, 0 degrees), e.g., [(−16.2 degrees, −16.2 degrees), (−16.2 degrees, −5.4 degrees), (−16.2 degrees, 5.4 degrees), (−16.2 degrees, 16.2 degrees), (−5.4 degrees, −16.2 degrees), (−5.4 degrees, −5.4 degrees), (−5.4 degrees, 5.4 degrees), (−5.4 degrees, 16.2 degrees), (5.4 degrees, −16.2 degrees), (5.4 degrees, −5.4 degrees), (5.4 degrees, 5.4 degrees), (5.4 degrees, 16.2 degrees), (16.2 degrees, −16.2 degrees), (16.2 degrees, −5.4 degrees), (16.2 degrees, 5.4 degrees), (16.2 degrees, 16.2 degrees)]. In accordance with one or more preferred implementations, angle values are determined for use with each grid square, e.g., angle values indicating angles to corners of the grid square with respect to an angle to the central point of a grid square to, e.g., [(−5.4, −5.4), (−5.4, 5.4), (5.4, −5.4), (5.4, 5.4)], or angle values indicating angles to other corners of a grid square with respect to an angle to a first corner of a grid square.

Figure 18:
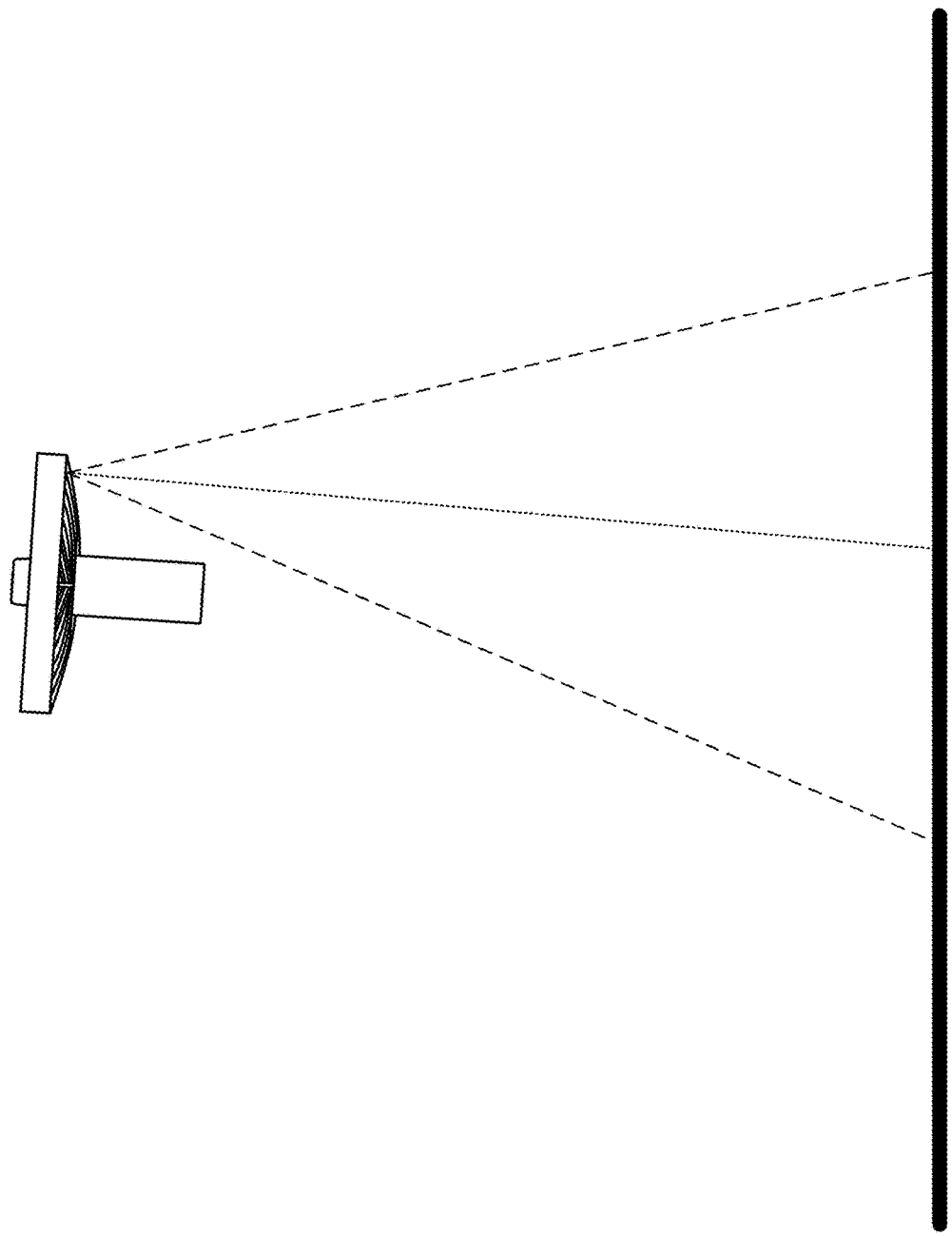
FIG. 18 is a view of aspects of one system in accordance with embodiments of the present disclosure.
Figure 19:
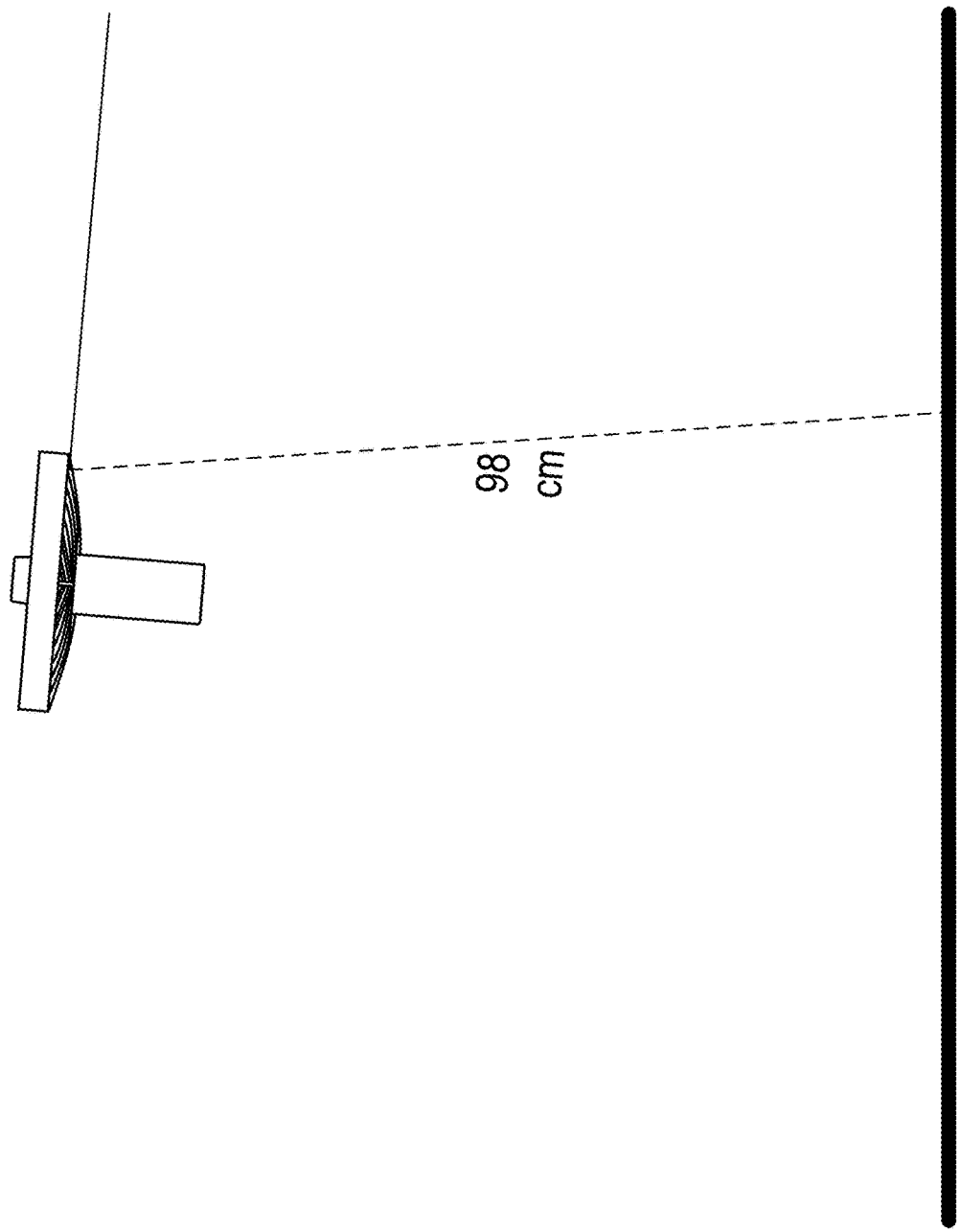
FIG. 19 is a view of aspects of one system in accordance with embodiments of the present disclosure.
Figure 20:
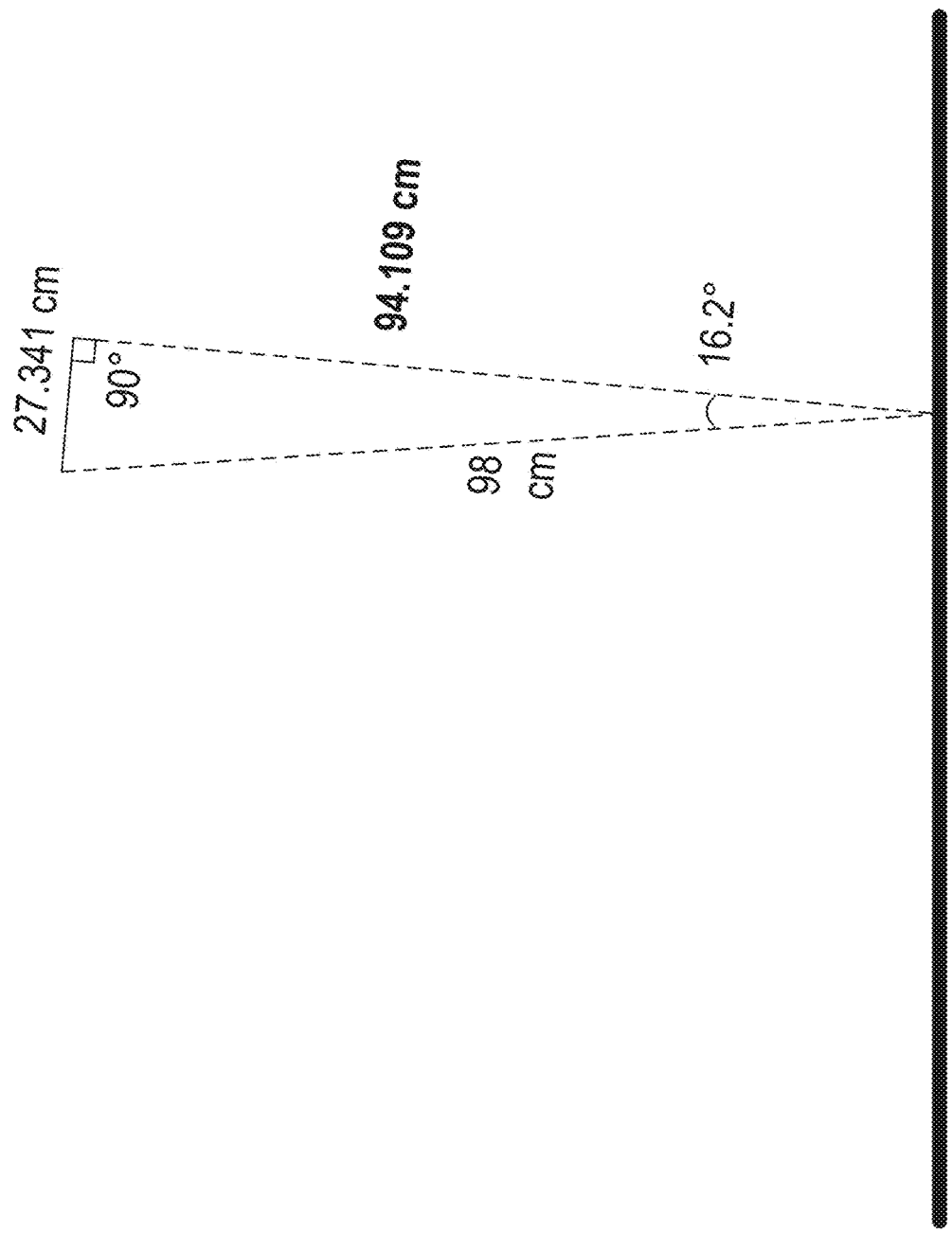
FIG. 20 is a view of aspects of one system in accordance with embodiments of the present disclosure.
Figure 21:
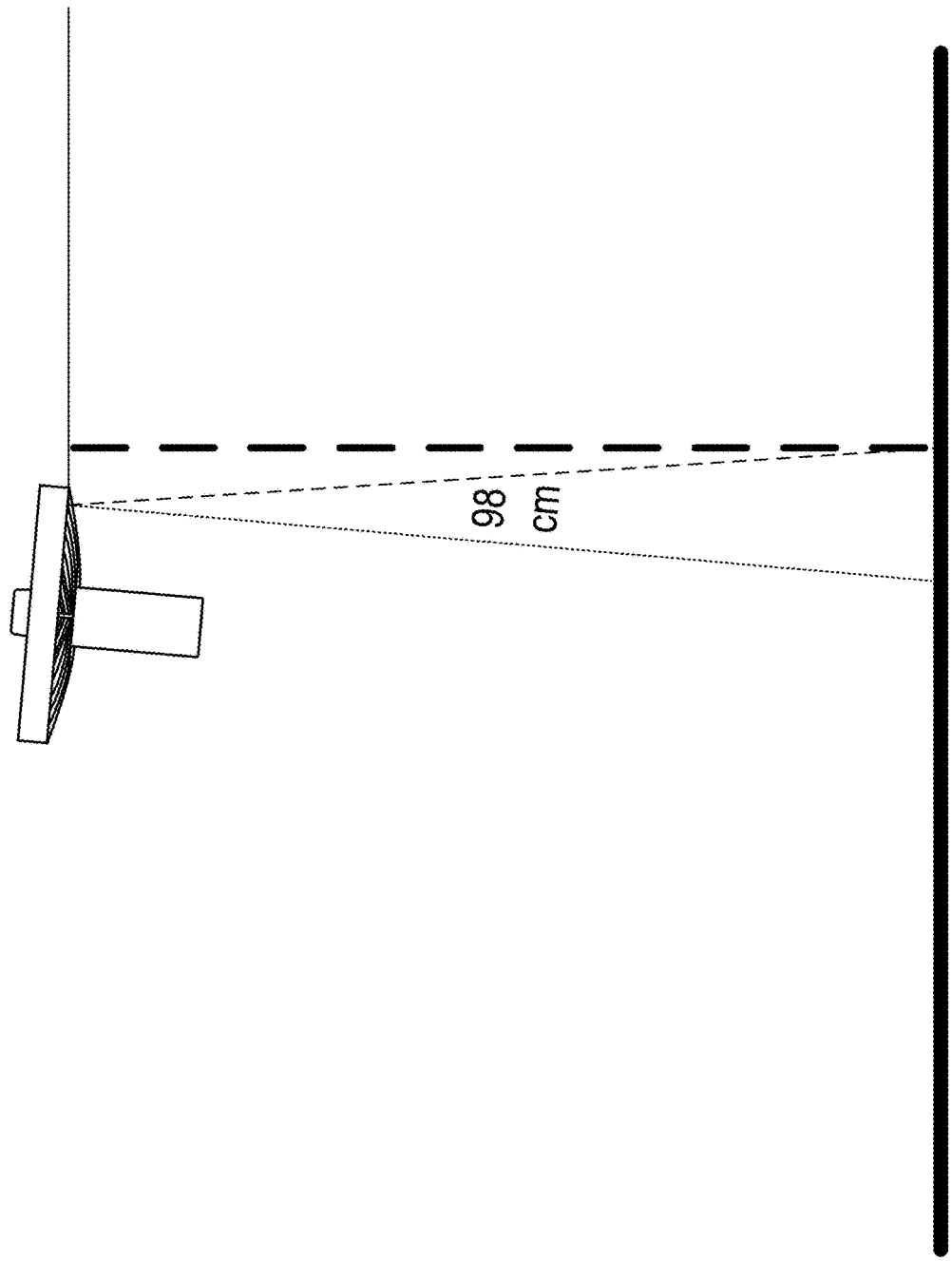
FIG. 21 is a view of aspects of one system in accordance with embodiments of the present disclosure.
Figure 22:
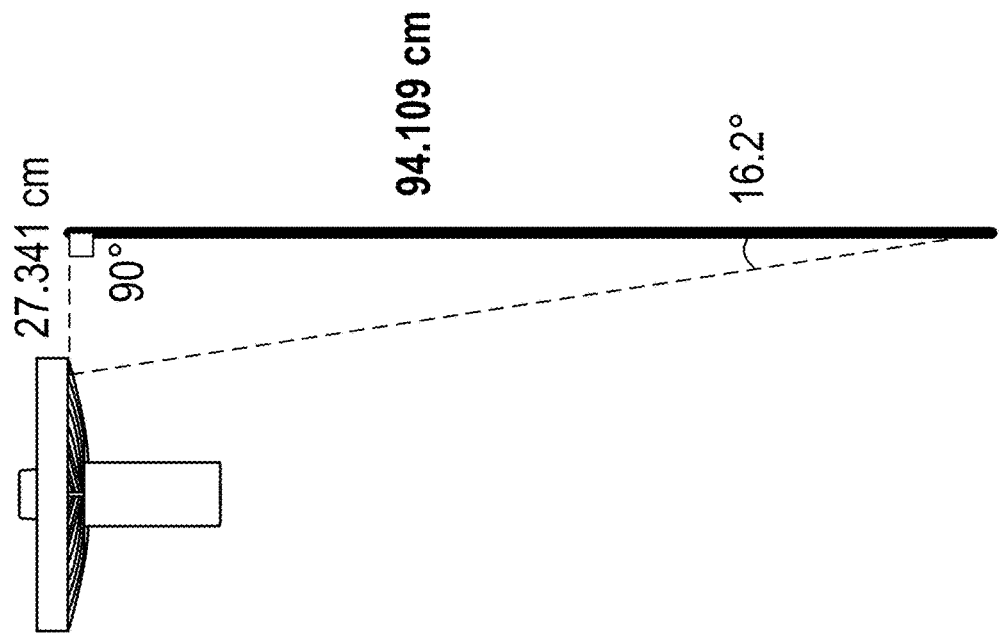
FIG. 22 is a view of aspects of one system in accordance with embodiments of the present disclosure.
Figure 23:
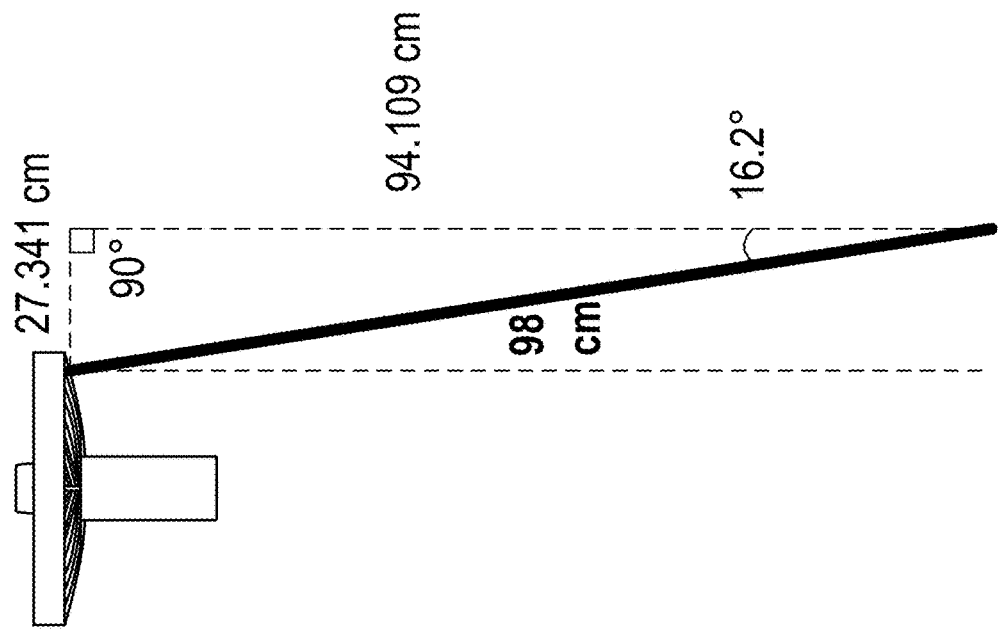
FIG. 23 is a view of aspects of one system in accordance with embodiments of the present disclosure.
Figure 24:
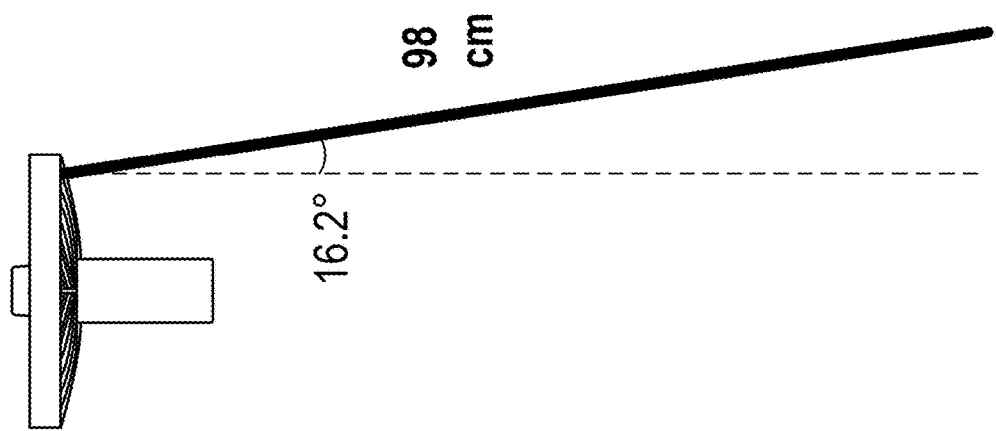
FIG. 24 is a view of aspects of one system in accordance with embodiments of the present disclosure.

Returning the simplified example of FIGS. 14-17, now consider the same drone traveling along with a non-zero pitch value, as illustrated in FIG. 18. The projected measurement, based on the same calculations as used for FIGS. 14-17, would provide a misleading value, as illustrated in FIGS. 19-21. Accordingly, the projection needs to be backed out of this projected value, as illustrated in FIGS. 22-24.

The result of this first part is a new set of (length, angle) data representing lengths and angles for original hypothetical light rays in a 4×4 grid (or a different sized grid, e.g., a 3×4 grid in the hypothetical example of FIGS. 18-24).

The generated set of corrected (length, angle) data is next used to generate corrected projected distance values. In particular, corrected projected distance values are generated based on pitch/roll data, e.g., from a flight controller. Each (length, angle) pair is used to calculate a new distance value for a distance extending straight up/down to a plane level with the sensor.

Figure 25:
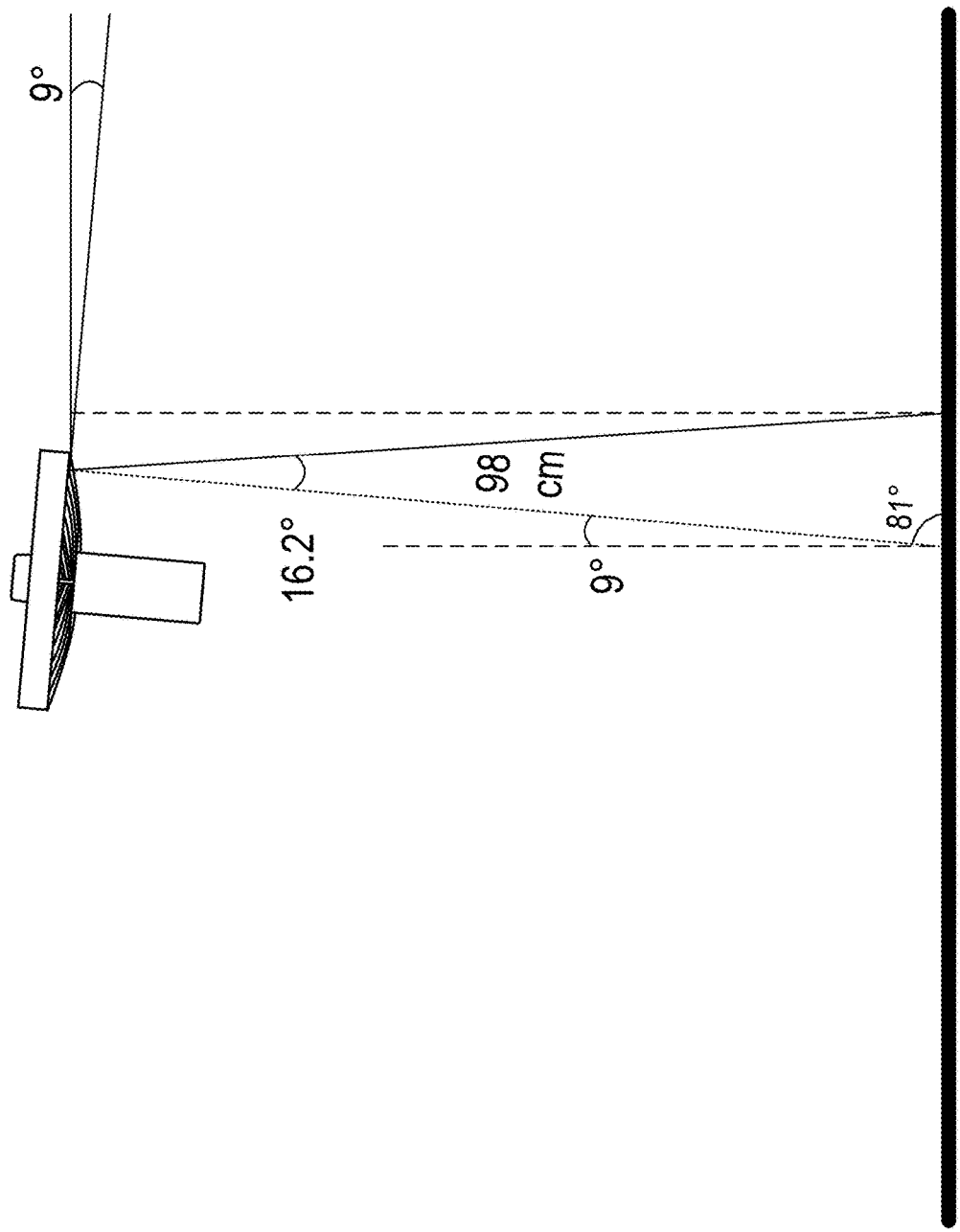
FIG. 25 is a view of aspects of one system in accordance with embodiments of the present disclosure.
Figure 26:
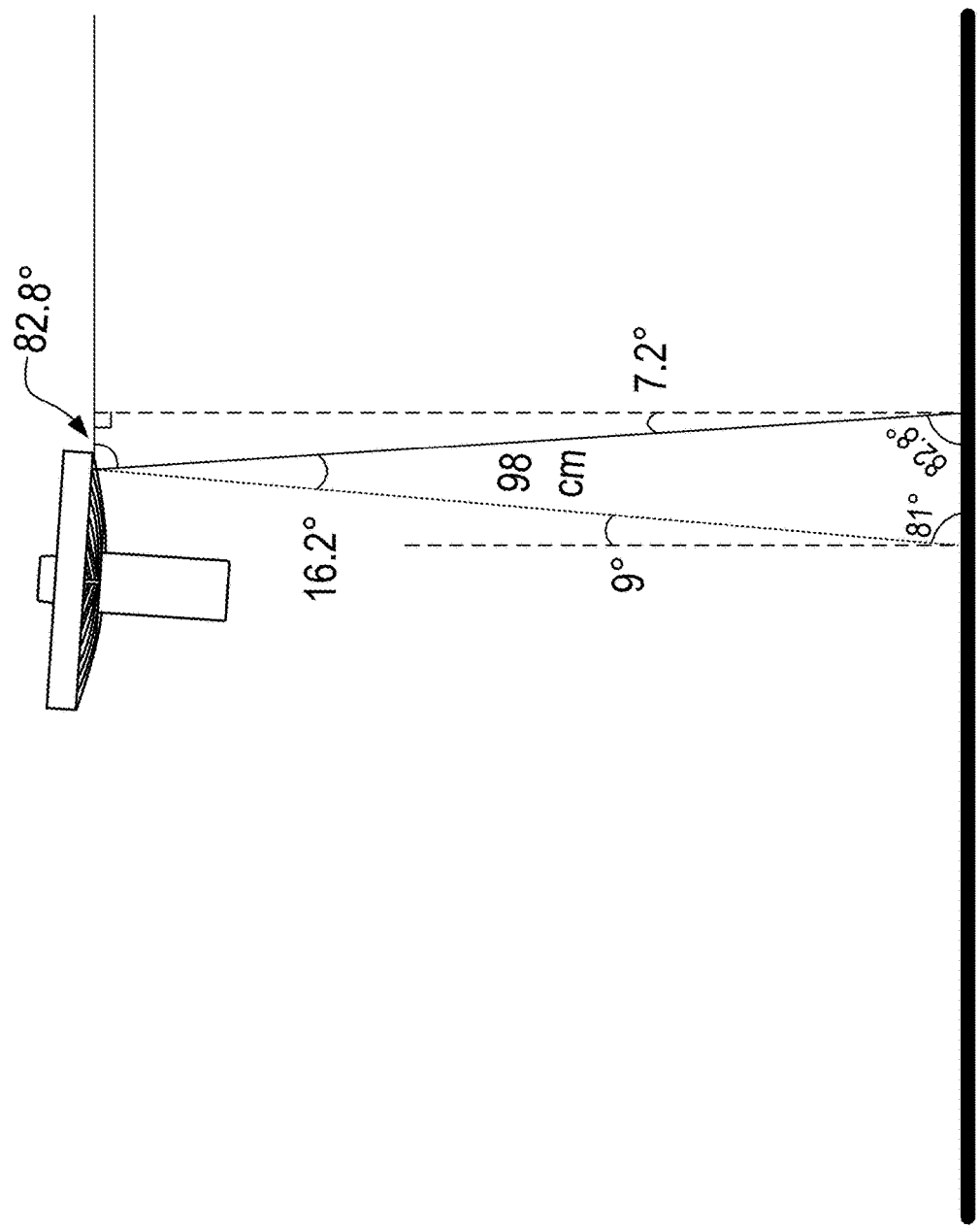
FIG. 26 is a view of aspects of one system in accordance with embodiments of the present disclosure.
Figure 27:
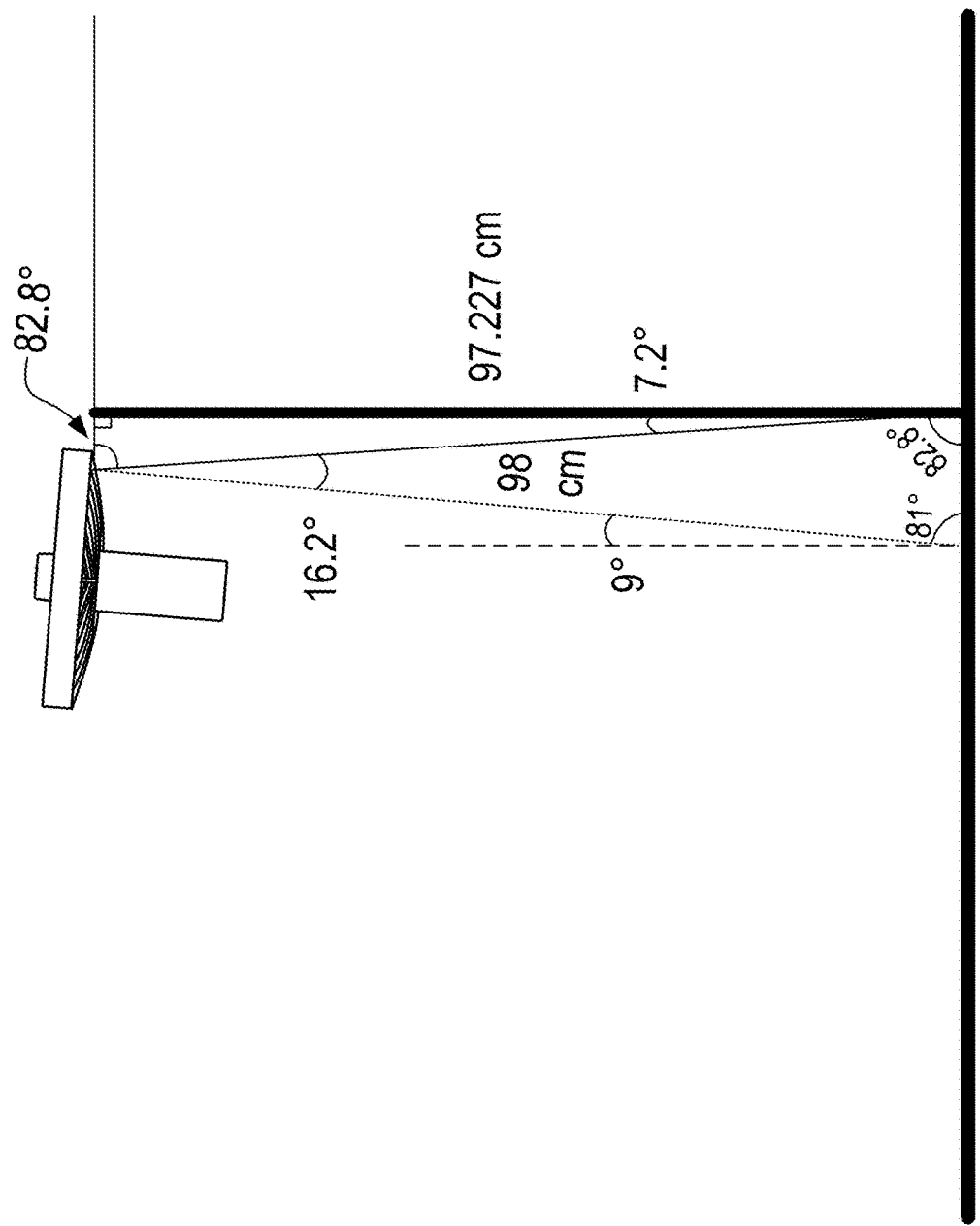
FIG. 27 is a view of aspects of one system in accordance with embodiments of the present disclosure.

For example, returning to the simplified example of FIGS., 18-24, FIGS. 25-27 fancifully illustrate calculation of an adjusted projected distance value determined based on a pitch value of 9 degrees provided by the flight controller or other pose data. This adjusted projected distance value indicates a distance straight up/down to a hypothetical plane level with the sensor.

Figure 28:
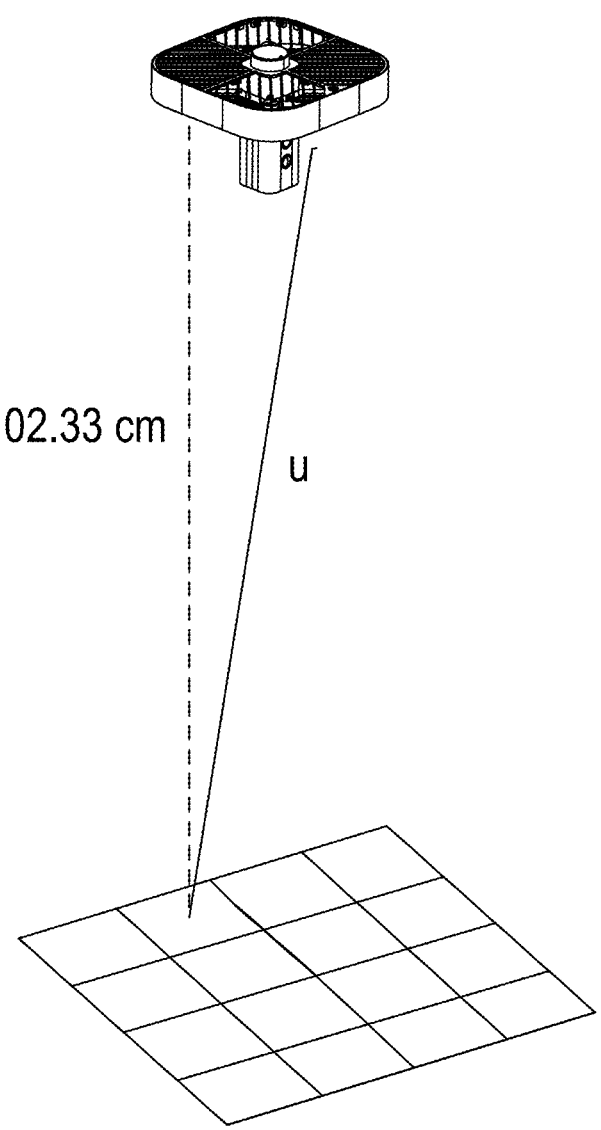
FIG. 28 is a view of aspects of one system in accordance with embodiments of the present disclosure.
Figure 29:
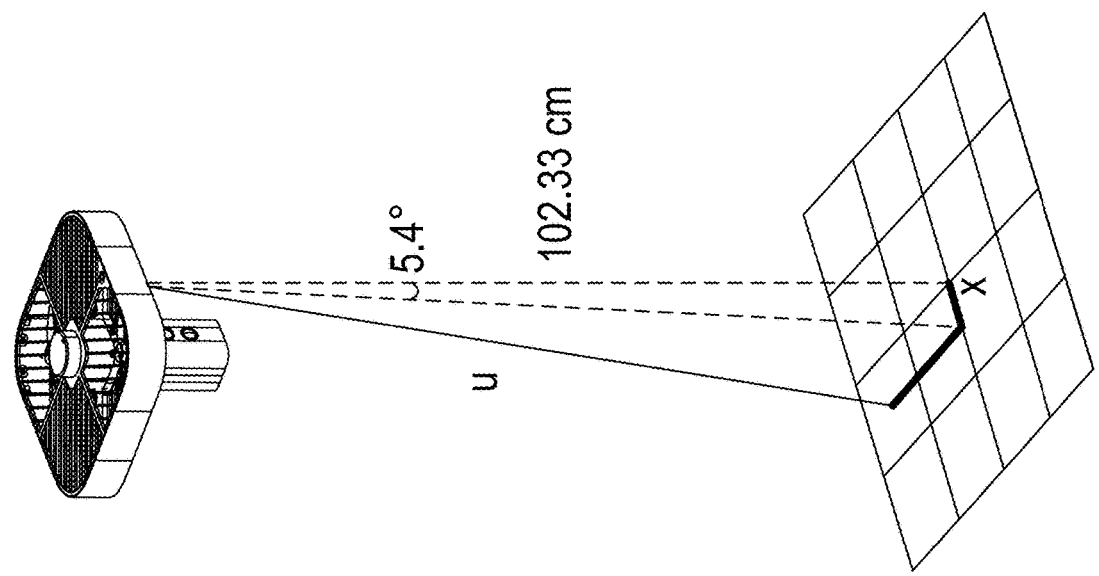
FIG. 29 is a view of aspects of one system in accordance with embodiments of the present disclosure.
Figure 30:
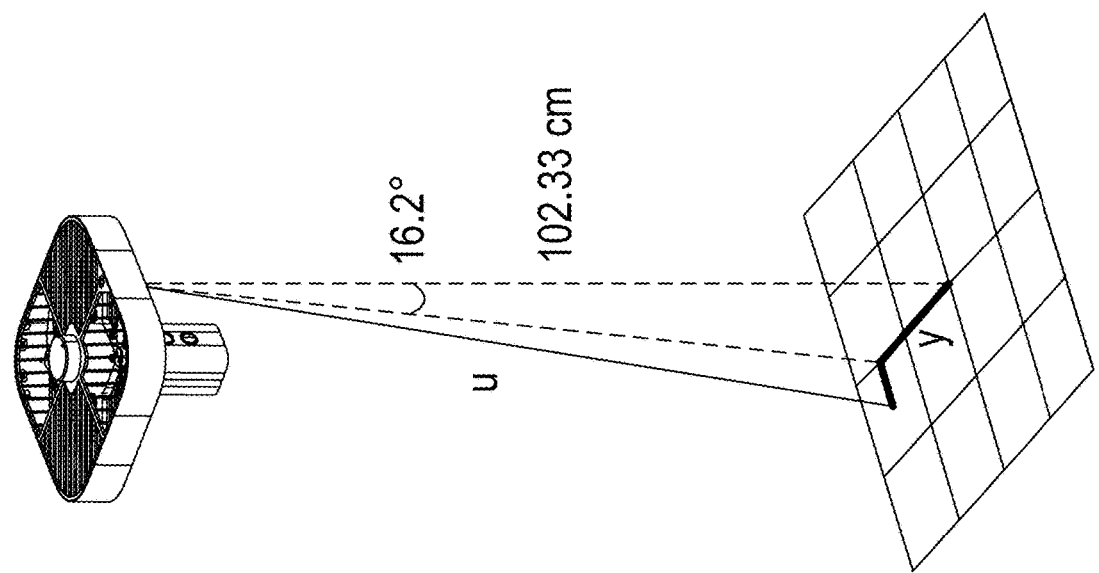
FIG. 30 is a view of aspects of one system in accordance with embodiments of the present disclosure.
Figure 31:
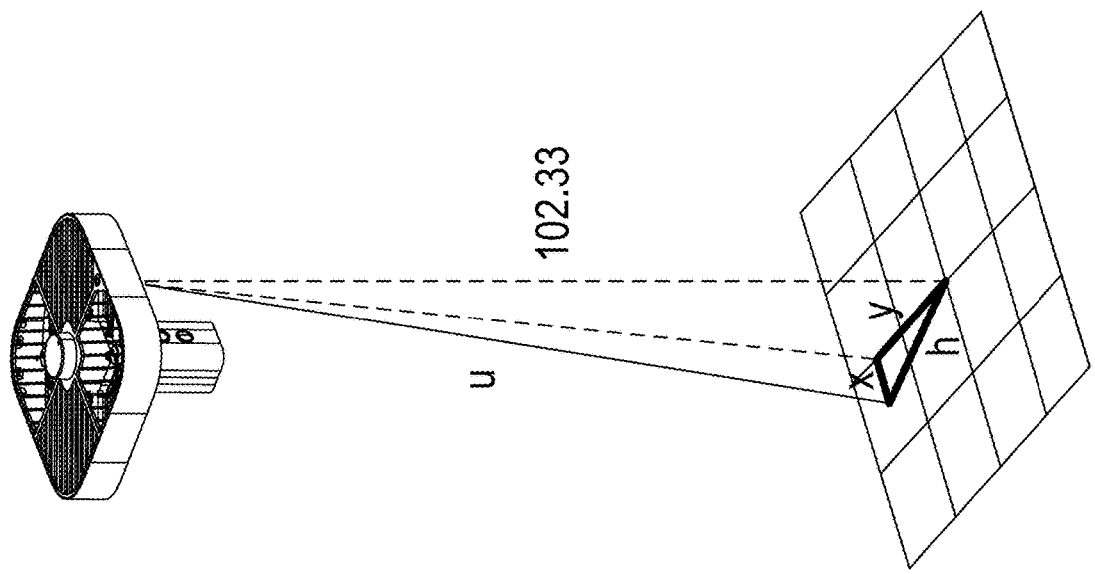
FIG. 31 is a view of aspects of one system in accordance with embodiments of the present disclosure.
Figure 32:
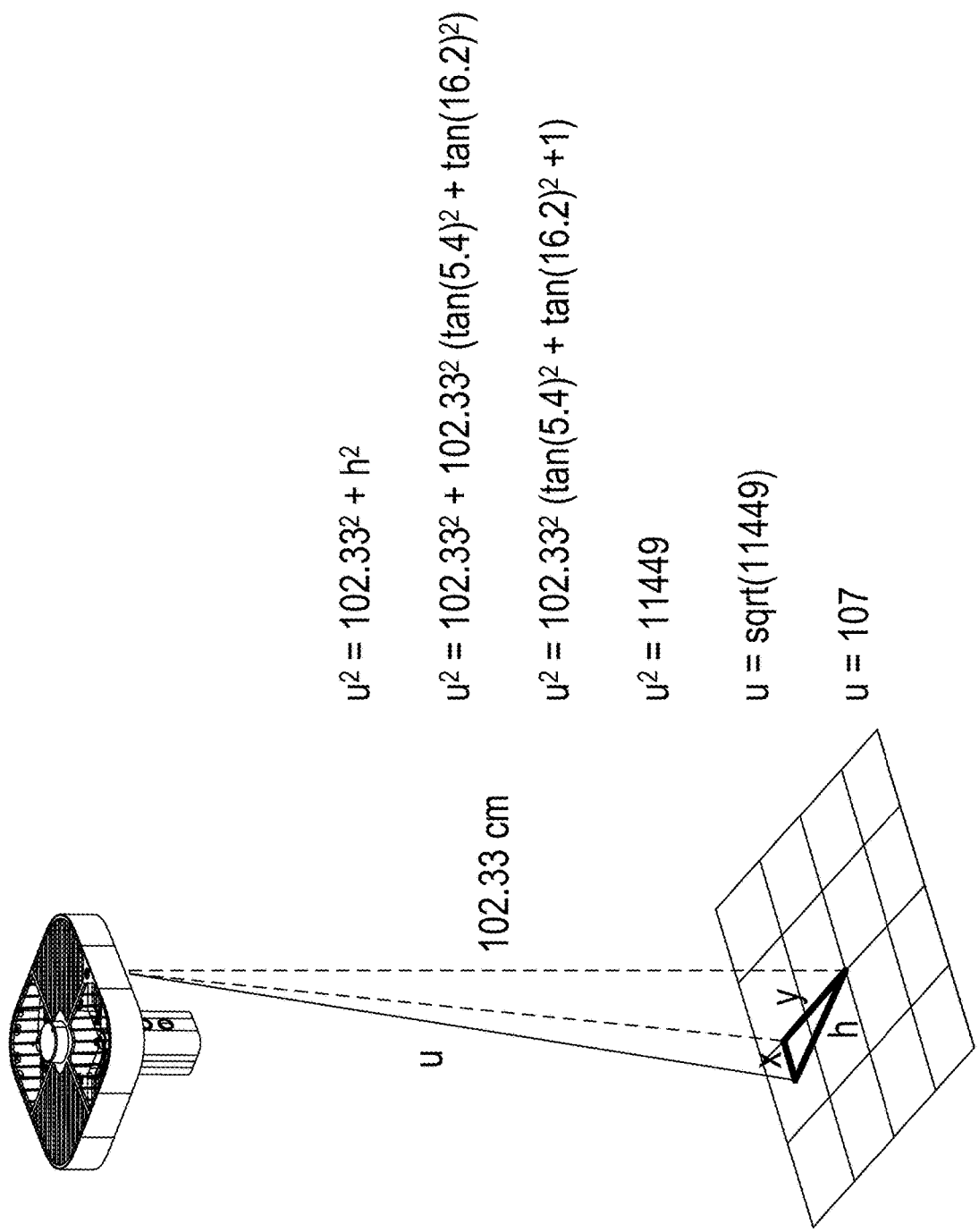
FIG. 32 is a view of aspects of one system in accordance with embodiments of the present disclosure.
Figure 33:
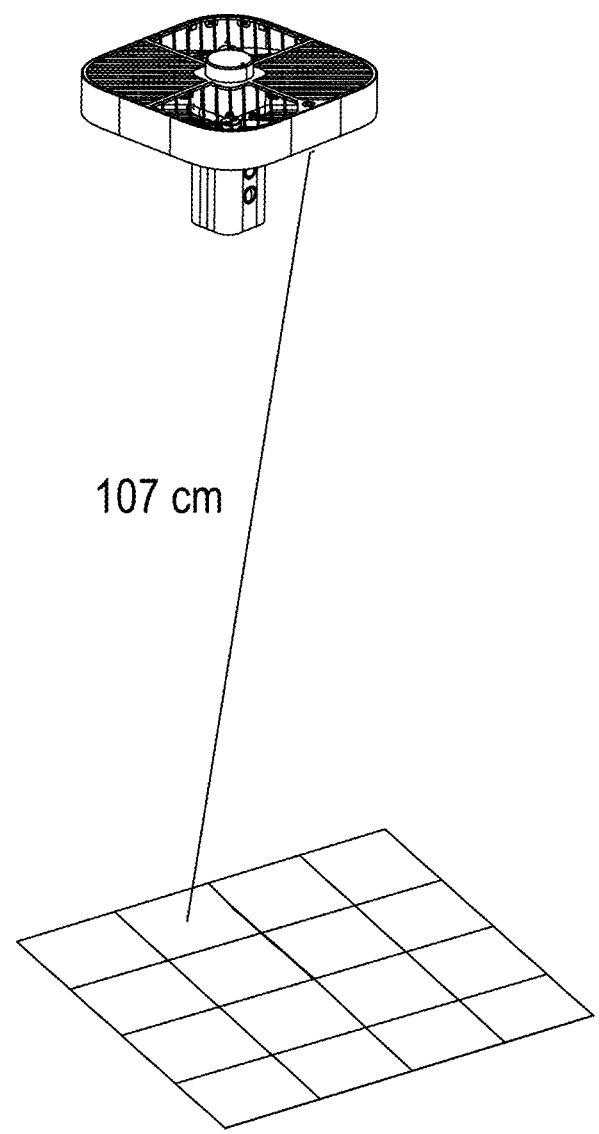
FIG. 33 is a view of aspects of one system in accordance with embodiments of the present disclosure.
Figure 34:
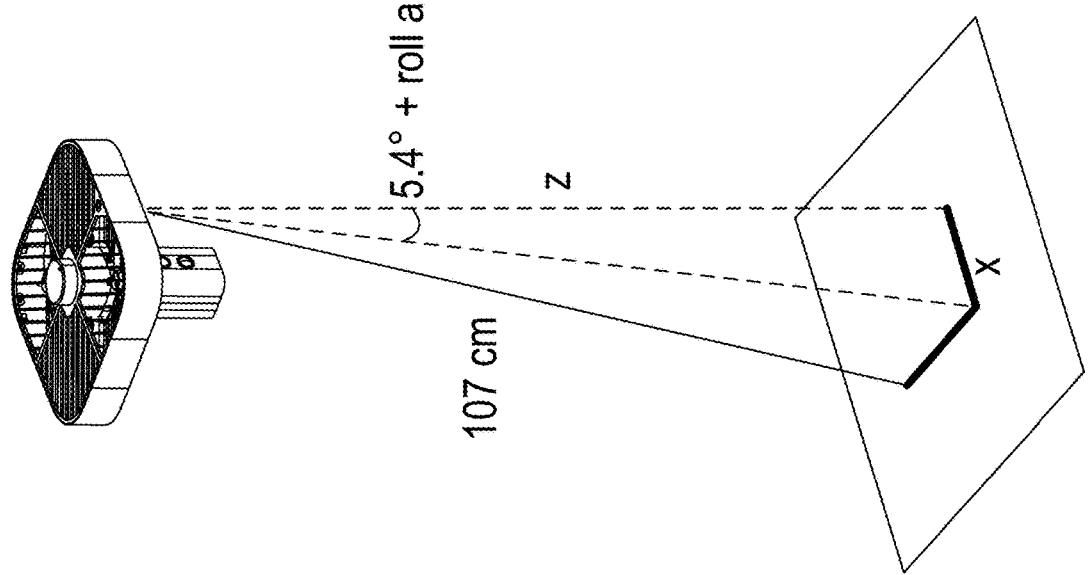
FIG. 34 is a view of aspects of one system in accordance with embodiments of the present disclosure.
Figure 35:
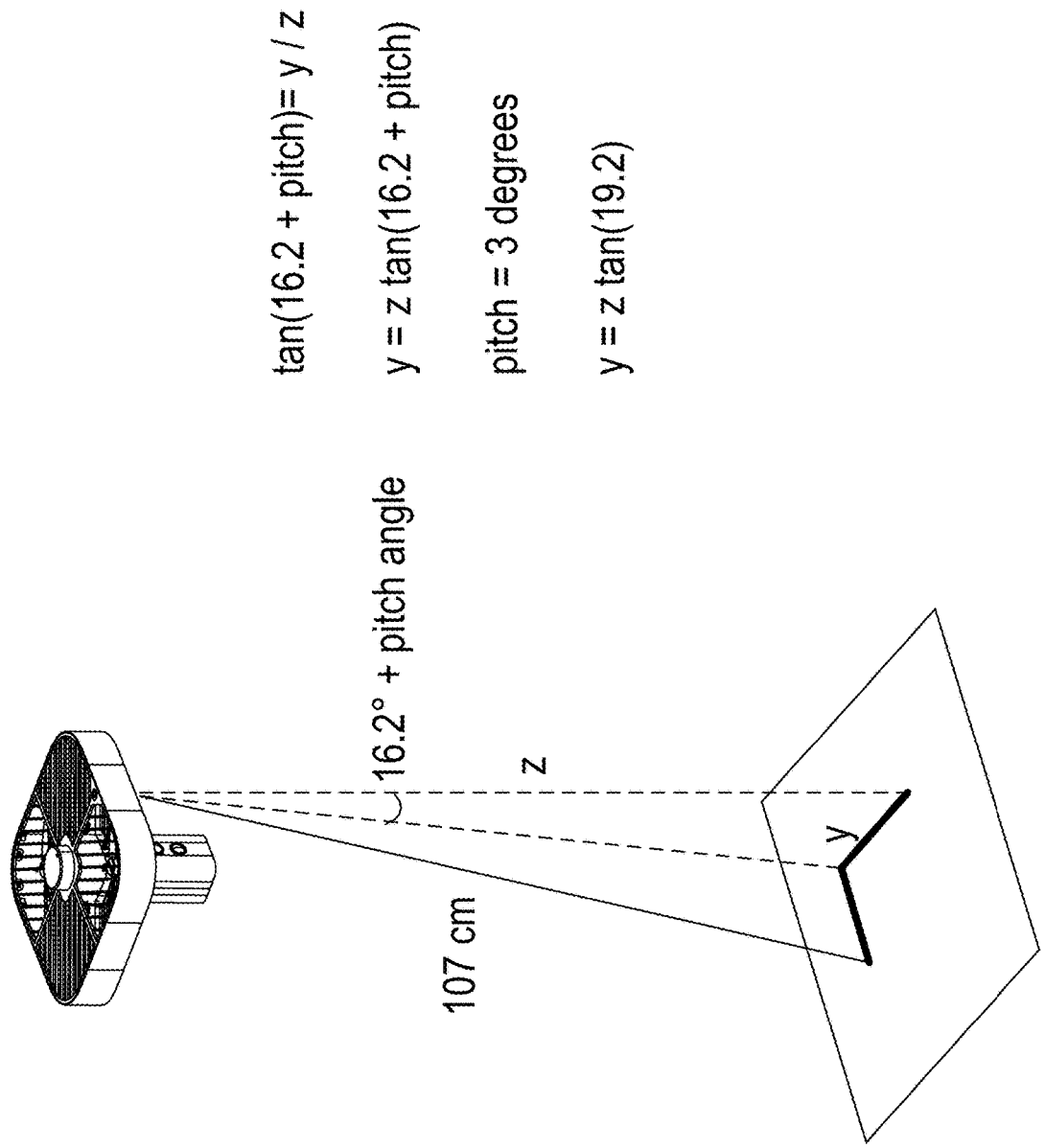
FIG. 35 is a view of aspects of one system in accordance with embodiments of the present disclosure.
Figure 36:
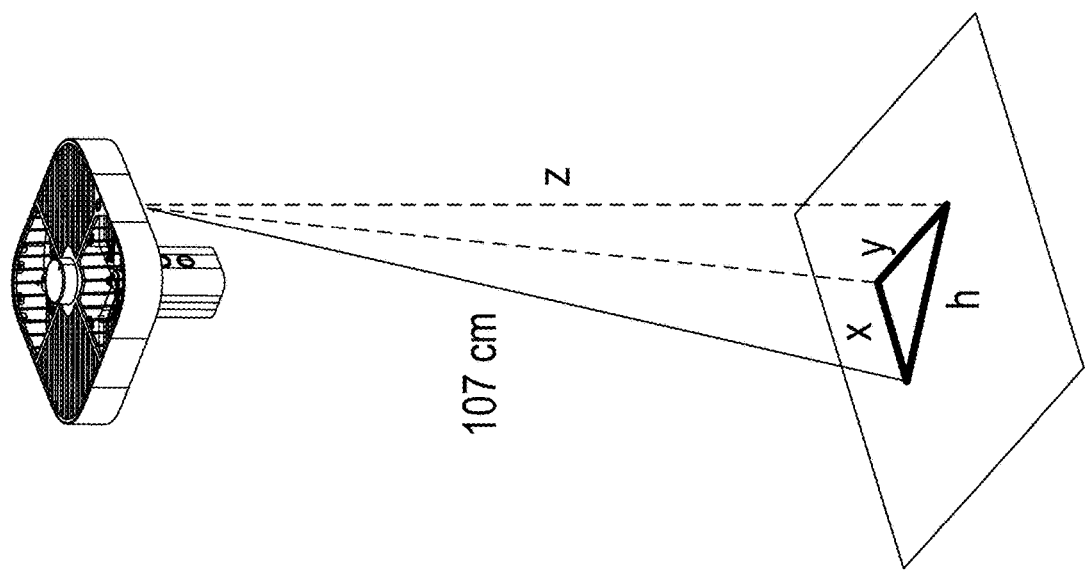
FIG. 36 is a view of aspects of one system in accordance with embodiments of the present disclosure.
Figure 37:
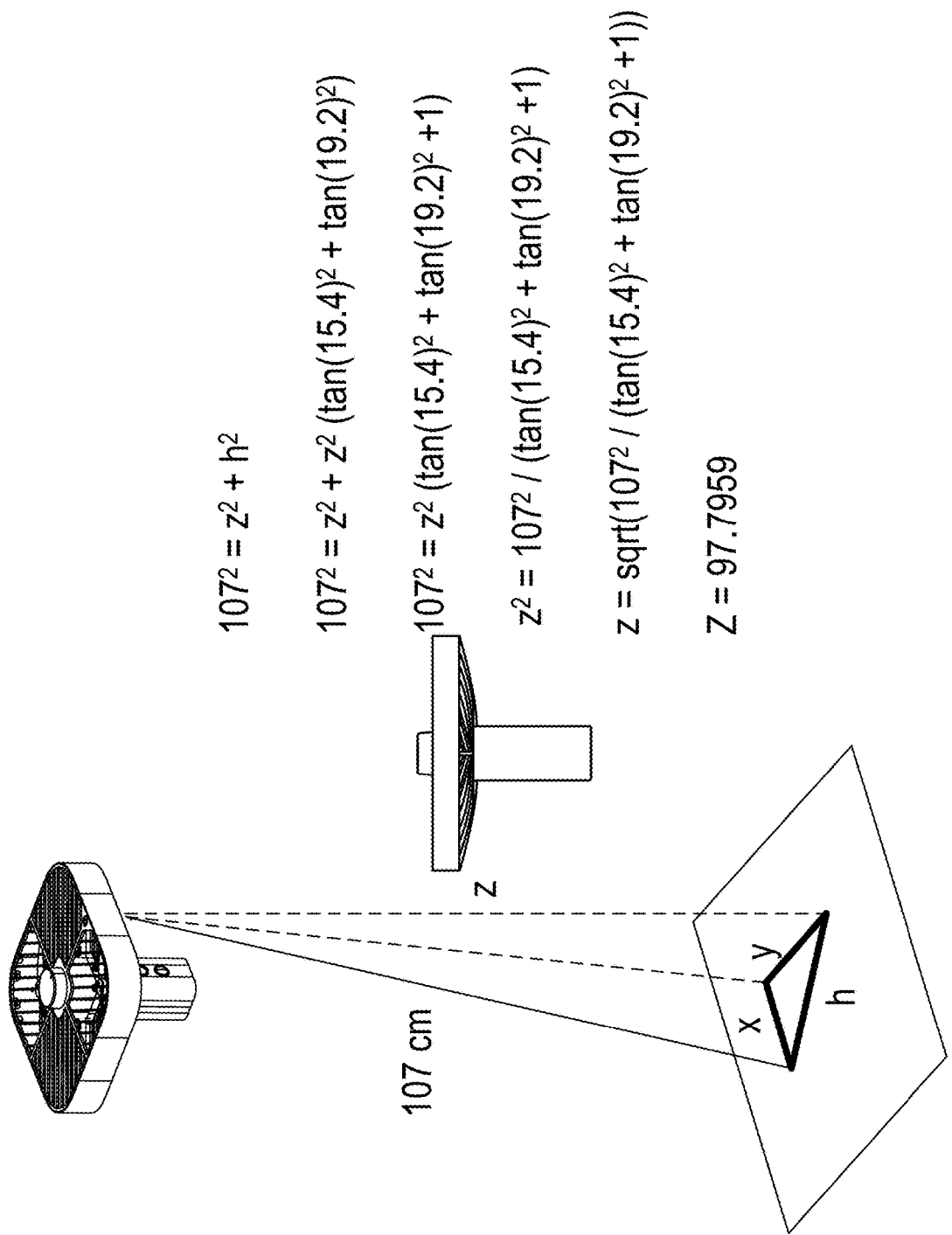
FIG. 37 is a view of aspects of one system in accordance with embodiments of the present disclosure.

FIGS. 28-37 fancifully illustrate this type of approach applied to a three-dimensional example utilizing 4×4 TOF data corresponding to a 43.2 degree x-axis field of view and a 43.2 degree y-axis field of view. Starting from a projected distance value as illustrated in FIG. 28, an unprojected distance value is calculated as illustrated in FIGS. 28-33. Then, an adjusted projected distance value is calculated based on pitch and roll data, as fancifully illustrated in FIGS. 34-38.

Figure 38:
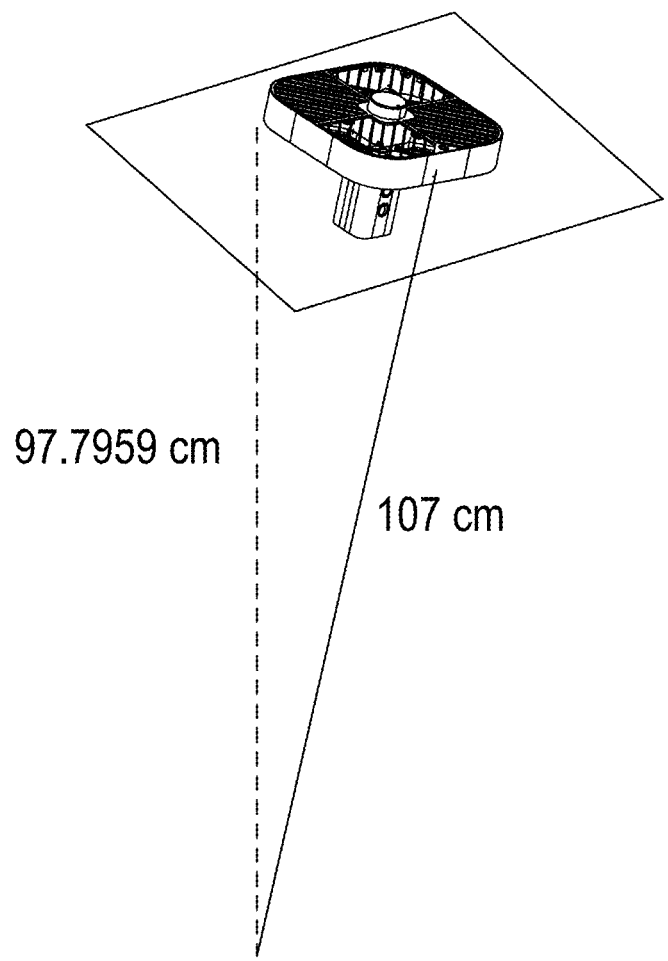
FIG. 38 is a view of aspects of one system in accordance with embodiments of the present disclosure.
Figure 39:
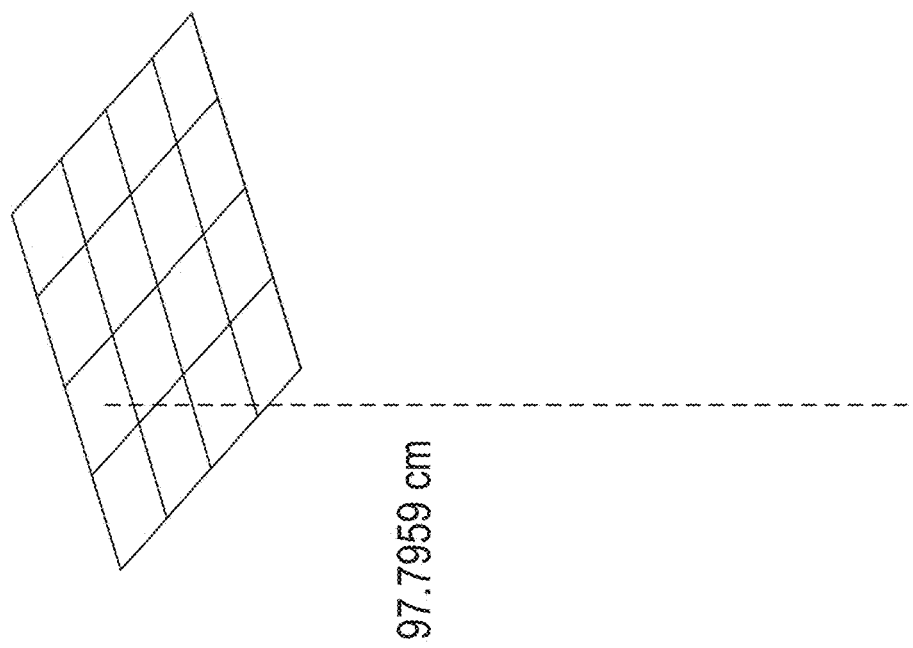
FIG. 39 is a view of aspects of one system in accordance with embodiments of the present disclosure.

Although sometimes illustrated herein with a sensor grid disposed above or below a drone or sensor unit, perhaps a more accurate visualization of what is represented by distance values in a 4×4 grid or matrix generated based on TOF data is that the distance values represent distances of a grid for a plane associated with the sensor unit, with the distances being distance values to a surface above or below, as fancifully illustrated in FIGS. 38-39.

At this point, the system has generated a corrected set of 16 distance values, with each distance value indicating a distance extending straight up/down to a plane level with the sensor. Each distance value is assumed to correspond to a square area that is a level plane. For each distance value, either the distance value, or the previously determined corrected (length, angle) pair for that distance value (which is assumed to extend from a center point of the square area), is used to determine a size (or corners) of the square area that the distance value corresponds to. The length and angle to the sensor of the (length, angle) pair can be used together with knowledge of the angle to the sensor from corners of the length angle pair to determine a position of corners of the square area. The (x,y) position of corners of each square area is determined, e.g. with a position of the sensor in a local (x,y) coordinate system being considered as (0,0).

The result is that the system has both (i) a corrected set of 16 distance values, with each distance value indicating a distance extending straight up/down from a square area to a plane level with the sensor, and (ii) the (x,y) position of corners of each square area defined with respect to the coordinate system relative to a current location of the sensor.

Next, smaller grid cells are overlaid on top of these square areas for the 16 distance values defined with respect to the local coordinate system relative to a current location of the sensor.

In accordance with one or more preferred implementations, the (x,y) positions of corners are used to define 10 cm×10 cm grid cells using the same local coordinate system, and grid cells within a square area are assigned the distance value for that square area. In accordance with one or more preferred implementations, grid cells that lie partially within a square area are either dropped, or are assigned a distance value if they meet some threshold (e.g., 51% of the cell is in the area).

The result is a set of (x,y) positions for these cells (which can be characterized as cells of an input grid) in a first local coordinate system relative to the sensor.

Next, the (x,y) positions of these cells in the first local coordinate system relative to the sensor, and an (x,y) position of the sensor in a second global coordinate system utilized for a global map, together with yaw information for the drone, is utilized to translate (x,y) positions for these cells in the first local coordinate system to (x,y) positions for these cells in the second coordinate system.

Next, the (x,y) positions of corners of the cells (or at least one (x,y) position of one corner of a cell) are used to compare the cells to cells of a global map. In accordance with one or more preferred implementations, this process is an approximation as there is usually not a direct correspondence.

In accordance with one or more preferred implementations, an intersection function is utilized, with each cell of the input grid being deemed to be a cell in common with a cell of the global map if there is an intersection. In accordance with one or more preferred implementations, an intersection function is utilized, with each cell of the input grid being deemed to be a cell in common with a cell of the global map if there is an intersection greater than a threshold value, e.g., greater than an intersection value calculated in centimeters squared, or greater than a percentage with respect to an area of one of the cells.

Once the cells in common between an input grid and a global map have been identified, they are used for comparison as described herein.

The systems and methods of the present disclosure are directed to the operation of aerial vehicles (e.g., unmanned aerial vehicles, or drones) within indoor spaces, and determining altitudes of the aerial vehicles within such indoor spaces. The aerial vehicles of the present disclosure may be of any type or form, and may include but need not be limited to low-power drones that may be configured for traveling or performing tasks during operations within indoor spaces.

In some implementations, an aerial vehicle may be outfitted or equipped with one or more modules, e.g., hardware components or software applications to be executed by one or more hardware components. Such modules may include an obstacle detection module that may assess relative positions of obstacles in a given environment, using temporal information to fuse data received from range sensors provided aboard the aerial vehicle, e.g., a rotating two-dimensional LIDAR sensor and time-of-flight sensors provided in fixed orientations with respect to a fuselage or other component of the aerial vehicle. Additionally, a range map, a point cloud or another representation may be subject to pixelization to determine whether any obstacles are present, and to minimize computation resources and processing power.

The aerial vehicles of the present disclosure may be outfitted with one or more processors, components, transceivers, sensors or other systems for engaging in communications with aspects of a facility (e.g., appliances, lighting, environmental or other systems), as well as any persons within the facility. For example, an aerial vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth, radio frequency identification (or "RFID"), near-field communication (or "NFC") readers, or any other type of systems or protocols. For example, the aerial vehicles may further include any number of audio or video sensors, including but not limited to one or more imaging devices (e.g., digital cameras) and/or microphones, or any other type of sensors, embedded or incorporated therein.

Additionally, an aerial vehicle may further include any number of sensors, such as imaging devices (e.g., cameras configured to capture visual or depth data), temperature sensors, magnetometers, Wi-Fi receivers, Bluetooth receivers, or others, and may be programmed or configured to travel throughout one or more spaces of a facility and to capture data using such sensors. Based on the captured data, an environment map of such spaces or the facility may be generated. The environment map may identify or depict one or more boundaries (e.g., walls, ceilings, floors) or other aspects of such spaces, as well as the respective dimensions of such spaces, or the respective surfaces or textures of such boundaries. In some embodiments, an aerial vehicle may autonomously travel throughout one or more spaces of a facility in order to capture data using one or more sensors, and such data may be utilized in generating an environment map of the spaces of the facility. In some other embodiments, an aerial vehicle may be transported (e.g., carried) or escorted by a human actor throughout such spaces, and may capture data using one or more sensors as the aerial vehicle is transported or escorted throughout such spaces. Data captured as the aerial vehicle is escorted may be utilized in generating an environment map of the spaces of the facility. Additionally, in some embodiments, the aerial vehicle may selectively operate one or more propulsion motors as the aerial vehicle is transported or otherwise escorted throughout such spaces, in order to maintain altitude and/or tilt control. Furthermore, in some embodiments, data captured by the aerial vehicle as the aerial vehicle travels throughout the spaces of the facility may be adjusted to account for presence of one or more body parts of a human actor that is transporting or otherwise escorting the aerial vehicle through the facility.

In accordance with some embodiments of the present disclosure, an aerial vehicle may be configured to operate along with one or more stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

Moreover, aerial vehicles of the present disclosure may be configured for use or operation within facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

Figure 2:
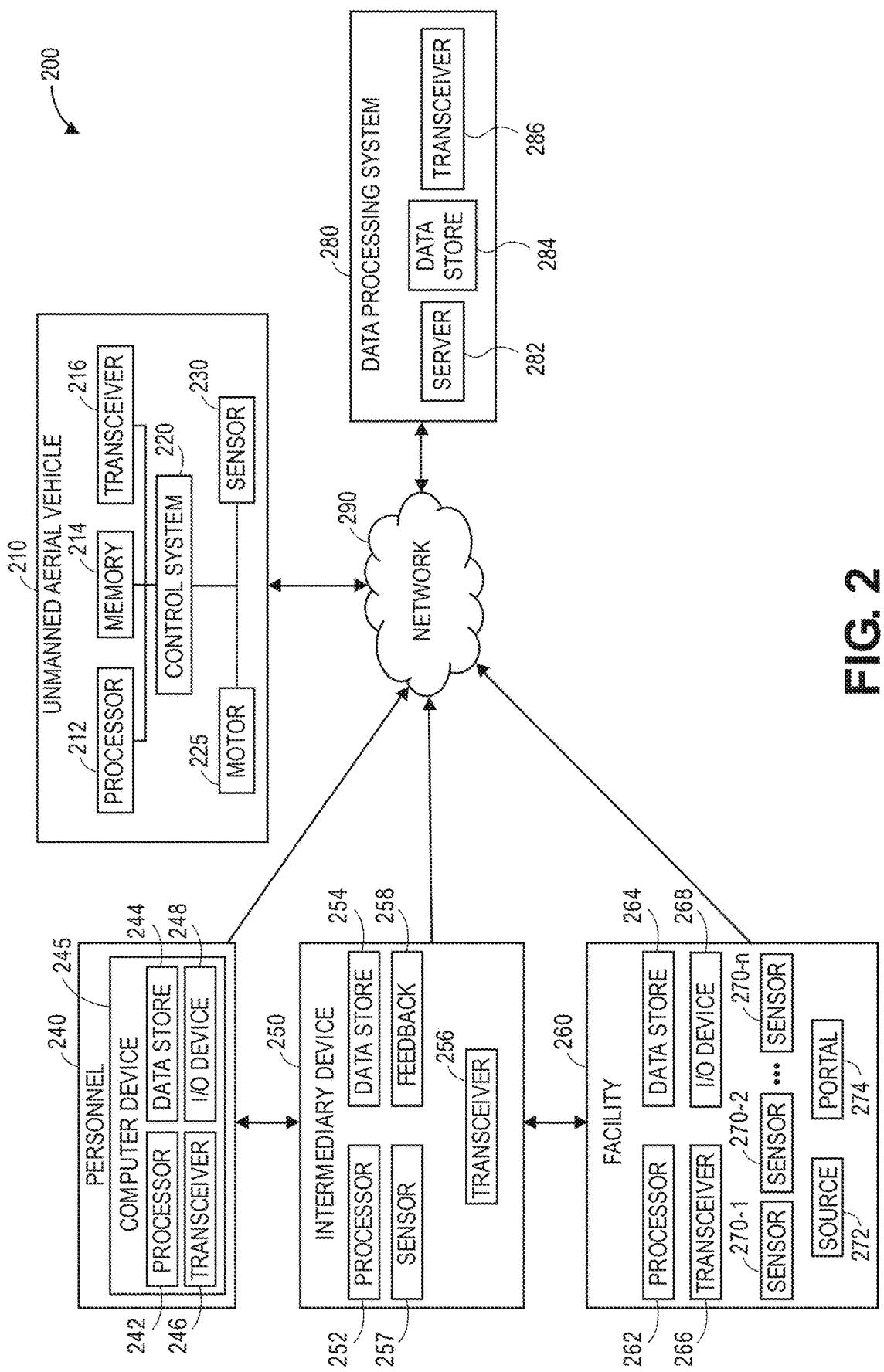
FIG. 2 is a block diagram of one system in accordance with embodiments of the present disclosure.

Referring to FIG. 2, a block diagram of components of one system including an unmanned aerial vehicle 210 in accordance with embodiments of the present disclosure is shown. The system 200 includes the unmanned aerial vehicle 210, personnel 240, an intermediary device 250, a facility 260 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A through 1G.

The unmanned aerial vehicle 210 may be an aerial vehicle (e.g., a drone), that may be programmed or configured to autonomously perform one or more operations within spaces of a facility. As is shown in FIG. 2, the unmanned aerial vehicle 210 includes a processor 212, a memory 214 and a transceiver 216. The unmanned aerial vehicle 210 further includes a control system 220, one or more motors 225, and one or more sensors 230.

The processor 212 may be configured to perform any type or form of computing function associated with the operation of the unmanned aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the unmanned aerial vehicle 210. The processor 212 may be configured to control any aspects of the operation of the unmanned aerial vehicle 210 and any computer-based components thereon, including but not limited to the motors 225 or the sensors 230. For example, the processor 212 may control the operation of one or more control systems or modules, such as the control system 220, for generating instructions for conducting operations of one or more of the motors 225 or the sensors 230. Such control systems or modules may be associated with one or more other computing devices or machines, and may communicate with the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the unmanned aerial vehicle 210 further includes one or more memory or storage components 214 (such as databases or data stores) for storing any type of information or data, e.g., instructions for operating the unmanned aerial vehicle 210, or information or data captured during operations of the unmanned aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the unmanned aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the unmanned aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 225 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the USB standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the unmanned aerial vehicle 210 and for engaging with or releasing items, as desired. For example, the control system 220 may be configured to cause or control the operation of one or more of the motors 225, e.g., to cause one or more of the motors 225 to operate at desired speeds, in order to guide the unmanned aerial vehicle 210 along a desired course, at a desired speed, or at a desired altitude, as appropriate. The control system 220 may further control any other aspects of the unmanned aerial vehicle 210, including but not limited to the operation of one or more steering or braking systems, or one or more control surfaces such as wings, rudders, flaperons, elevons, elevators, ailerons, flaps, brakes or slats, within desired ranges. In some embodiments, the control system 220 may be integrated with one or more of the processor 212, the memory 214 and/or the transceiver 216.

The motors 225 may be any type or form of motor (e.g., electric, gasoline-powered or any other type of motor) capable of generating sufficient rotational speeds of one or more propellers or other components to provide thrust and/or lift forces to the unmanned aerial vehicle 210 and any payload engaged thereby. In some embodiments, one or more of the motors 225 may be a brushless direct current ("DC") multi-phase motor such as an outrunner brushless motor or an inrunner brushless motor.

The unmanned aerial vehicle 210 may include any number of such motors 225 of any kind. For example, one or more of the motors 225 may be aligned or configured to operate with different capacities or ratings, or at different speeds, or coupled to any number of wheels or propellers having different sizes and shapes. Additionally, one or more of the motors 225 may be an electric motor, e.g., a brushless DC multi-phase motor, and one or more of the motors 225 may be a gasoline-powered motor.

The unmanned aerial vehicle 210 may also include any number of sensors 230 or other components or other features for capturing data within a vicinity of the unmanned aerial vehicle 210, including but not limited to one or more imaging devices (e.g., digital cameras), Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box corresponding to a motor 225 and a single box corresponding to a sensor 230, those of ordinary skill in the pertinent arts will recognize that the unmanned aerial vehicle 210 may include any number of motors 225 or sensors 230 in accordance with the present disclosure.

The personnel 240 (or operators, or users, or other persons) may be any individual or entity associated with the facility 260. For example, the personnel 240 may be any individual or entity having a permanent or temporary right of occupation, possession or ownership of all or any portion of the facility 260, including but not limited to a resident, a tenant, an employee, or a contractor, or any other individual designated by an owner, a resident, a tenant, an employee or a contractor of the facility 260. The personnel 240 may utilize any number of computing devices 245 (e.g., a smartphone, a tablet computer, a laptop computer, a desktop computer, or computing devices provided in wristwatches, televisions, set-top boxes, automobiles or any other appliances or machines), or any other machines. As is shown in FIG. 2, the computer device 245 may include one or more processors 242, data stores (e.g., databases) 244, transceivers 246 (e.g., transmitters and/or receivers) and I/O devices 248 (e.g., keyboards, keypads, mice, styluses, touchscreens, RFID readers, or other devices).

The intermediary device 250 includes one or more processors 252, data stores 254, transceivers 256, sensors 257 and/or feedback devices 258. The transceivers 256 may be configured to receive or transmit electrical power to or from the unmanned aerial vehicle 210, or to receive or transmit information or data to or from the unmanned aerial vehicle 210, the personnel 240, the facility 260 and/or the data processing system 280, or any other computing device over the network 290.

Moreover, in some embodiments, the intermediary device 250 may be configured to receive and/or interpret signals received from any systems or sensors within or without the facility 260, and to determine, with one or more measures of a level of confidence (e.g., a confidence score), whether a predetermined event or condition has occurred or is present within the one or more spaces. In some embodiments, the intermediary device 250 may transmit one or more sets of instructions to such systems or sensors, or to establish one or more settings or conditions of such systems or sensors. Any of the applications or functions described herein as being executed or performed by the data processing system 280 herein may be executed or performed by the intermediary device in accordance with embodiments of the present disclosure.

Additionally, the intermediary device 250 may further include any type of power source for providing electrical power, e.g., alternating current ("AC") or DC power, or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The intermediary device 250 may also include any type, size or form of other power source, e.g., other than a battery, including but not limited to one or more fuel cells or solar cells.

The intermediary device 250 may be or include any computer-related machine that is configured to control the operation of one or more aspects of the facility 260 on behalf of the personnel 240. For example, the intermediary device 250 may be configured to control the capture of information or data within the facility 260 by one or more sensors 270-1, 270-2 . . . 270-n, or to grant or restrict access to the facility 260 by operating (e.g., locking, unlocking, opening, closing) one or more of the portals 274. Alternatively, the intermediary device 250 may be configured to activate any other systems that may be associated with the facility 260 (e.g., lighting and/or environmental systems). In this regard, the intermediary device 250 may receive information, data and/or instructions from one or more of the personnel 240, e.g., by way of the computer device 245, in the form of a direct inter-device connection or over the network 290. In some embodiments, the intermediary device 250 may be a general purpose computer device or system, or a special purpose computer device or system, provided within or in association with the facility 260, and configured to execute one or more applications or functions associated with operations occurring within the facility 260.

In some embodiments, the intermediary device 250 may be a charging station, e.g., a system including a set of one or more contacts for transferring electrical power to the unmanned aerial vehicle 210 or any other component, or for receiving electrical power from the unmanned aerial vehicle 210 or any other component, via a corresponding set of one or more contacts provided on one or more portions of the unmanned aerial vehicle 210. In some embodiments, the intermediary device 250 may be a docking station, e.g., a system including one or more physical or structural features for engaging with or providing support to the unmanned aerial vehicle 210 or any other component, such as to maintain the unmanned aerial vehicle 210 in a specific location, position or orientation. In some embodiments, the intermediary device 250 may be a charging dock, e.g., a system having one or more features of a charging station and/or a docking station as described herein. In some embodiments, the intermediary device 250 may be a smart speaker, a personal assistant device, a home security system component, or any other like machine associated with the facility 260. Alternatively, or additionally, in some embodiments, the intermediary device 250 may include any number or set of features of a charging station, a docking station, a charging dock, a smart speaker, a personal assistant device, a home security system component, or any other machine or component.

The sensors 257 may be any type or form of sensors having any components or features for determining one or more attributes of the intermediary device 250 and/or the facility 260, including extrinsic information or data or intrinsic information or data. Such sensors 257 may be installed in the same common unit as the one or more processors 252, data stores 254, transceivers 256 and/or feedback devices 258, or in one or more units provided in association with (and in communication with) such components, subject to functional or spacing limitations or constraints.

In some embodiments, the sensors 257 may include one or more thermometers, barometers, hygrometers, anemometers, current sensors, voltage sensors, resistance sensors or any other type or form of sensor. In some other embodiments, the sensors 257 may include one or more air monitoring sensors (e.g., oxygen, ozone, hydrogen, carbon monoxide or carbon dioxide sensors), acoustic sensors (e.g., microphones, piezoelectric sensors, vibration sensors), infrared sensors, ozone monitors, pH sensors, magnetic anomaly detectors, metal detectors, radiation sensors (e.g., Geiger counters, neutron detectors, alpha detectors) or the like, as well as one or more imaging devices (e.g., digital cameras). In some embodiments, information or data captured by one or more of the sensors 257 may be used to authenticate one or more individuals or entities at the facility 260, including but not limited to the personnel 240, or any other individual or entity.

The intermediary device 250 may further include one or more feedback devices 258. The feedback devices 258 may be any component configured for returning feedback to the personnel 240, or to any other individuals or entities in or around the facility 260. Such feedback devices 258 may be installed in the same common unit as the one or more processors 252, data stores 254 and/or transceivers 256, or in one or more units provided in association with (and in communication with) such components, subject to functional or spacing limitations or constraints.

In some embodiments, the feedback devices 258 may include one or more individually addressable lighting elements (e.g., LED lights) that may be automatically controlled or configured to emit light in any frequency, intensity or hue. In some other embodiments, the feedback devices 258 may include one or more audio speakers or other physical components that may be automatically controlled or configured to transmit audible messages, signals or sounds. In some other embodiments, the feedback devices 258 may include one or more haptic vibrating elements, e.g., any physical component that may be automatically controlled or configured to generate tactile vibrations of any frequency or intensity.

The facility 260 may be any building, region, structure or other space (e.g., covered or uncovered) to which the automated control of access may be desired, or from within which secure communications may be desired. For example, as is discussed above, the facility 260 may be a home or a business-related structure of any type, kind, shape or form, or any other type of facility. The facility 260 may further include a networked computer infrastructure, including one or more processors 262, data stores (e.g., databases) 264, transceivers 266 (e.g., transmitters and/or receivers) and I/O devices 268 (e.g., keyboards, keypads, mice, styluses, touchscreens, RFID readers, or other devices).

The facility 260 further includes the sensors 270-1, 270-2 . . . 270-n, one or more sources 272 of wireless energy, and one or more portals 274. The sensors 270-1, 270-2 . . . 270-n may take the form of one or more of the sensors 257 described above, and, like such sensors 257, may be any operational and/or environmental sensors having any components or features for determining one or more attributes of the facility 260, including extrinsic information or data or intrinsic information or data. The sensors 270-1, 270-2 . . . 270-n may further include one or more sensors that are associated with security functions at the facility 260, including one or more door sensors, window sensors, motion sensors, security cameras, or others.

In some embodiments, the I/O devices 268 may be configured to receive and provide information to the personnel 240 or to any other individuals or entities at the facility 260, and may include, but are not limited to, a display, (e.g., a touch-screen display), a scanner, a keypad, a biometric scanner, an audio transducer, one or more speakers, one or more imaging devices such as a video camera, and any other types of input or output devices that may support interaction between the intermediary device 250, the facility 260 and/or the various personnel 240. For example, in one embodiment, the I/O devices 268 may include a touchscreen display and/or a keypad for receiving inputs. In various embodiments, the I/O devices 268 may have capabilities for directly receiving such signals from the personnel 240 or the intermediary device 250 that provides a signal or an instruction to operate one or more of the portals 274.

The sources 272 may be any components within or associated with the facility 260 that are configured to transmit wireless energy in any type or form. For example, one or more of the sources 272 may include a current-carrying conductor of any kind, which may generate and radiate a magnetic field according to Ampere's Law. The sources 272 may further include any device or system that is configured to communicate according to one or more wireless protocols or standards, such as any Wi-Fi or Bluetooth protocol or standard.

The portals 274 may include one or more doors, windows or other access points, as well as any electrometrical components for automatically operating such doors or other access points. Such portals 274 may be used to obtain access to the facility 260, e.g., an external door, or to obtain access to one or more specific spaces within the facility 260, e.g., an internal door, such as one or more rooms within the facility 260. The portals 274 may further include any other systems associated with other openings to the facility 260, such as windows.

The portals 274 may be operated under the control of the unmanned aerial vehicle 210, the processors 262 and/or the intermediary device 250 or, alternatively, the computer device 245 of the personnel 240. For example, each of the portals 274 may be in communication with the one or more processors 262 and/or the intermediary device 250, e.g., Bluetooth® or Wi-Fi, and may transmit or receive one or more signals or instructions associated with their respective operations. Alternatively, any of the portals 274 may be operated based at least in part on manual or automatic inputs provided by the personnel 240 or another authorized individual at the facility 260, e.g., by way of the I/O devices 268. In some embodiments, one or more of the portals 274 may include an electromechanical operating and/or locking mechanism which is designed to automatically open or close a portal, or to lock or unlock the portal, in response to signals or instructions from an authorized device using a wired or wireless protocol. Such instructions may include a password or another authenticator (e.g., a cryptographic key). Additionally, the portals 274 may be associated with the one or more sensors 270-1, 270-2 . . . 270-n, or may include one or more sensors, and may be configured to capture information or data regarding successful or unsuccessful attempts at operation thereof, or any other events occurring at the facility 260.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the unmanned aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location, e.g., in association with the facility 260. In other such embodiments, the data processing system 280 may be provided in one or more alternate or virtual locations, e.g., in a "cloud"-based environment. In still other embodiments, the data processing system 280 may be provided onboard one or more vehicles, including but not limited to the unmanned aerial vehicle 210.

Each of the transceivers 216, 246, 256, 266, 286 or other communications devices, systems or components may be configured to communicate through one or more wired or wireless means, e.g., wired technologies such as Universal Serial Bus (or "USB") or fiber optic cable, or wireless standards or protocols such as Bluetooth® or any Wi-Fi protocol, over the network 290 or directly. The transceivers 216, 246, 256, 266, 286 may further include or be in communication with one or more I/O interfaces, network interfaces or devices, and may be configured to allow information or data to be exchanged between one another, or to or from one or more other computer devices or systems via the network 290.

The transceivers 216, 246, 256, 266, 286 may perform any necessary protocol, timing or other data transformations in order to convert data signals from a first format suitable for use by one component into a second format suitable for use by another component. For example, in some embodiments, the transceivers 216, 246, 256, 266, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHz.

In some embodiments, the transceivers 216, 246, 256, 266, 286 may be configured to transmit or receive Bluetooth® signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth® networks of 3 megabits per second (or 3 Mbps) or more, with a maximum transmission range of 10 to 100 meters or more, and at powers of approximately one milliwatt (mW), or 0.001 watts (W). The transceivers 216, 246, 256, 266, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 246, 256, 266, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pulses transmitted across such frequency spectrums, and at various power levels or power densities.

In some embodiments, the transceivers 216, 246, 256, 266, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 246, 256, 266, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 246, 256, 266, 286 may be configured to communicate within customized frequency spectra, or at dynamic frequencies, in accordance with the present disclosure. For example, in some embodiments, one or more of the transceivers 216, 246, 256, 266, 286 may be configured to communicate according to a proprietary standard or protocol, or within a proprietary frequency spectrum.

In some embodiments, the transceivers 216, 246, 256, 266, 286 may include support for devices attached through various types of peripheral buses, e.g., variants of the PCI standard or the USB standard. In some other embodiments, functions of the transceivers 216, 246, 256, 266, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The unmanned aerial vehicle 210, the personnel 240, the intermediary device 250, the facility 260 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the unmanned aerial vehicle 210, the computer device 245, the intermediary device 250, the facility 260 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the unmanned aerial vehicle 210, the computer device 245, the intermediary device 250, the facility 260 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212, the computer device 245, the intermediary device 250, the facility 260 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
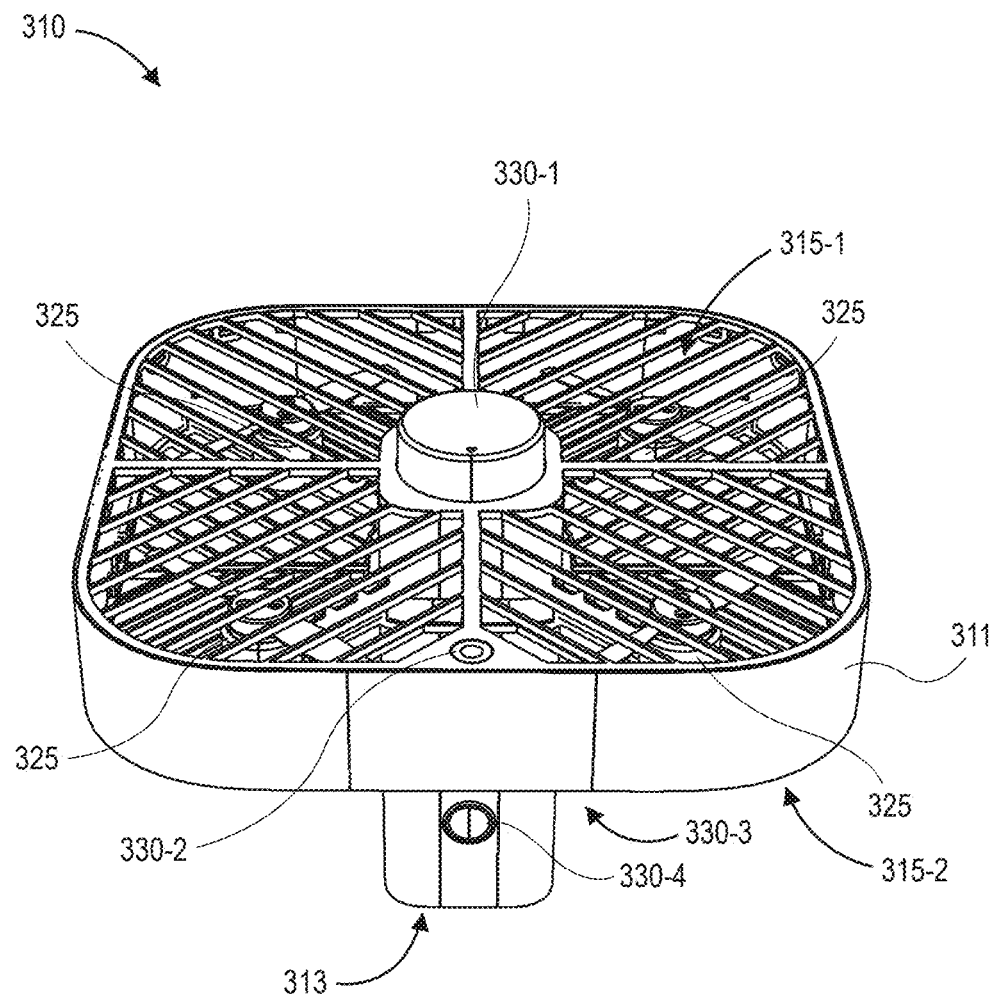
FIGS. 3A through 3C are views of aspects of one system in accordance with embodiments of the present disclosure.
Figure 3B:
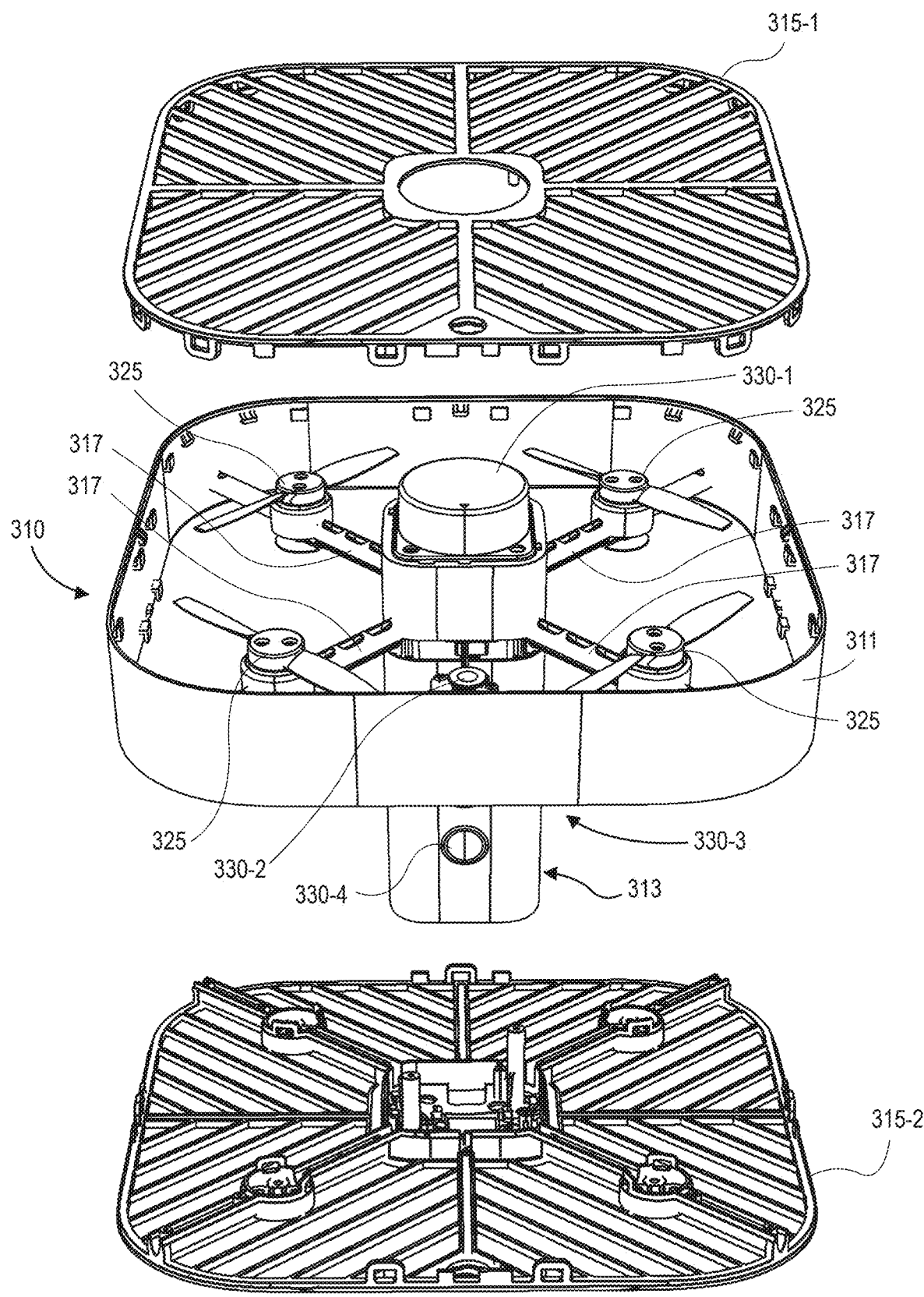
Figure 3C:
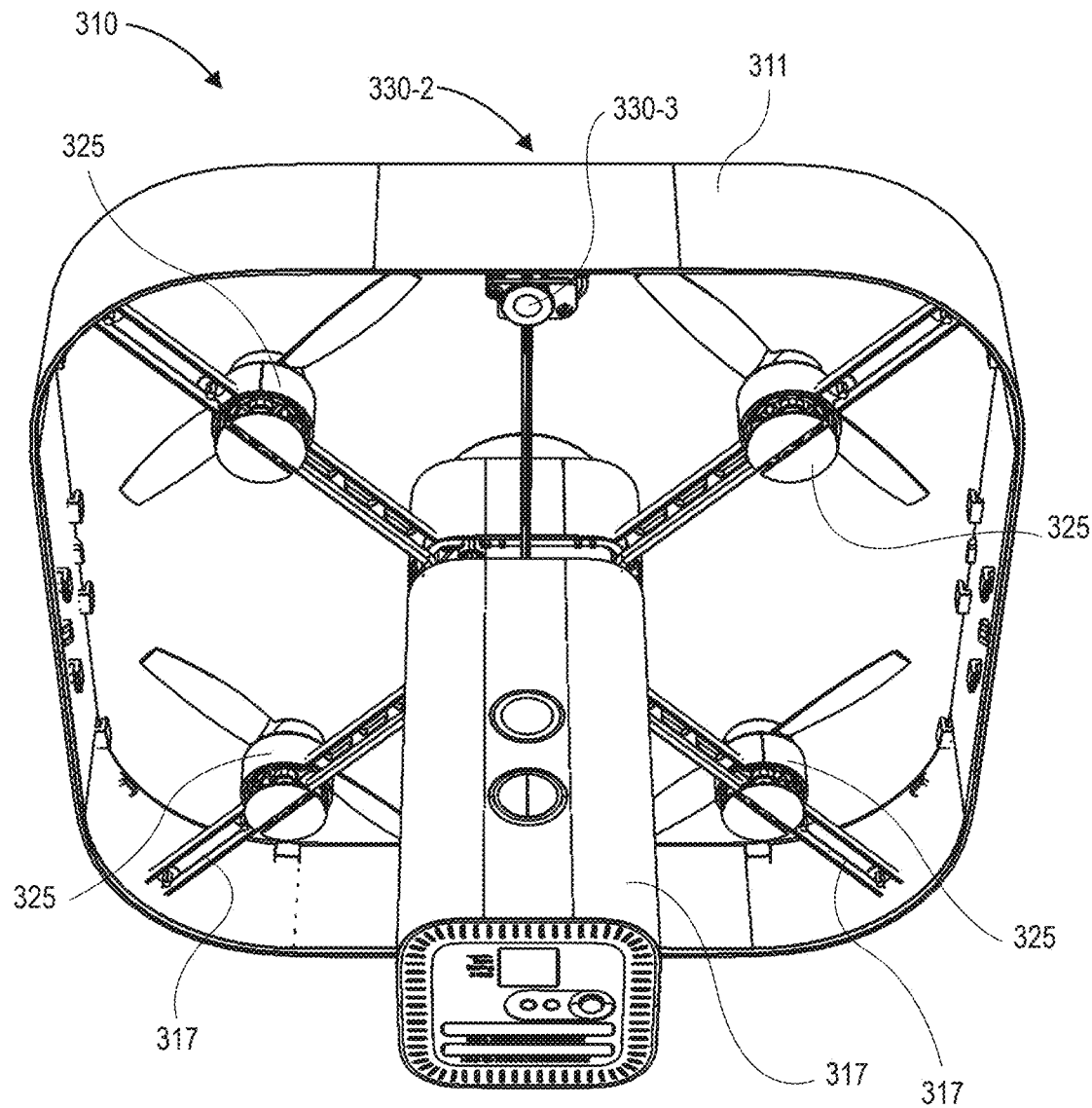

Referring to FIGS. 3A through 3C, views of aspects of one system (e.g., an unmanned aerial vehicle 310) in accordance with embodiments of the present disclosure are shown. Except where otherwise noted, reference numerals preceded by the number "3" shown in FIGS. 3A through 3C indicate components or features that are similar to components or features having reference numerals preceded by the number "2" shown in FIG. 2 or by the number "1" shown in FIGS. 1A through 1G.

FIG. 3A is a top perspective view of the aerial vehicle 310 with a top cover 315-1 and a bottom cover 315-2 mounted thereto. FIG. 3B is an exploded view of the top perspective view of the aerial vehicle 310 with the covers 315-1, 315-2 detached from the aerial vehicle 310. FIG. 3C is a bottom view of the aerial vehicle 310 with the covers 315-1, 315-2 removed therefrom.

As is shown in FIG. 3A, the aerial vehicle 310 includes a frame 311, a fuselage 313, and the pair of covers 315-1, 315-2. The frame 311 is defined by a plurality of sides (e.g., four sides) and has a common height. For example, as is shown in FIG. 3A, the frame 311 has a substantially square cross-section, e.g., a cross-section in the shape of a square with rounded corners or edges, or a squircle, with a constant height.

The fuselage 313 comprises a housing or chamber having a shape that is also defined by a plurality of sides (e.g., four sides) and a common height. For example, as is shown in FIG. 3A, the fuselage 313 also has a substantially square cross-section, e.g., a cross-section in the shape of a square with rounded corners or edges, or a squircle, with a constant height.

As is also shown in FIG. 3A, a height of the fuselage 313 is greater than a height of the frame 311. As is further shown in FIG. 3A, a length or width of the frame 311 is greater than a length or width of the fuselage 313. Alternatively, in some embodiments, the frame 311 and the fuselage 313 may have cross-sections of any other sizes or shapes, e.g., rectangles other than squares, triangles, or any other polygons, or circles or any other curvilinear shapes. In some embodiments, the frame 311 and the fuselage 313 may have the same or similar shapes, such as is shown in FIG. 3A, where each of the four sides of the frame 311 is parallel to at least one of the sides of the fuselage 313. In some other embodiments, however, the frame 311 and the fuselage 313 may have different or dissimilar shapes.

The frame 311 and the fuselage 313 are mounted to one another in a manner that causes a geometric center or centroid of a cross-section of the frame 311 to be aligned along a common axis with a geometric center or centroid of a cross-section of the fuselage 313. As is shown in FIG. 3A, the aerial vehicle 310 further includes a time-of-flight sensor module 330-1 provided at an upper end of the fuselage 313, at least partially above the frame 311, as well as a time-of-flight sensor module 330-2 provided at an upper edge of the fuselage 313, and a time-of-flight sensor module 330-3 provided at a lower edge of the fuselage 313.

The time-of-flight sensor module 330-1 may comprise an illuminator or other light source (e.g., a modulated light source) that is configured to transmit light along axes or directions that are normal to, and extend radially outward from, the axis along which the geometric center or centroid of the frame 311 and the geometric center or centroid of the fuselage 313 are coaligned. The time-of-flight sensor module 330-1 is further configured to capture reflections of the light off one or more surfaces. Reflected light captured by the time-of-flight sensor module 330-1 may be interpreted to generate a depth image or range profile of distances between the time-of-flight sensor module 330-1, and the one or more surfaces, several times per second.

In some embodiments, the time-of-flight sensor module 330-1 may be configured to rotate an illuminator, or the axis or the direction along which the time-of-flight sensor module 330-1 transmits light, about the axis along with the geometric center or centroid of the frame 311 and the geometric center or centroid of the fuselage 313 are coaligned. By rotating the illuminator or the transmissions of light about the axis along with the geometric center or centroid of the frame 311, and the geometric center or centroid of the fuselage 313 are coaligned, the time-of-flight sensor module 330-1 may be used to generate depth images, range profiles or other sets of distances covering three hundred sixty degrees around the aerial vehicle 310.

The time-of-flight sensors 330-2, 330-3 also include illuminators or other light sources (e.g., modulated light sources) that are configured to transmit light along axes that are parallel to the axis along which the geometric center or centroid of the frame 311 and the geometric center or centroid of the fuselage 313 are coaligned, and in opposite directions, e.g., up and down, with respect to the orientation of the aerial vehicle 310 as shown in FIG. 3A. The time-of-flight sensor modules 330-2, 330-3 are further configured to capture reflections of the light transmitted thereby off one or more surfaces above or below the aerial vehicle 310, and to interpret such reflections in order to generate depth images, range profiles or other sets of distances between the time-of-flight sensor modules 330-2, 330-3, and the one or more surfaces, several times per second.

The aerial vehicle 310 includes a visual camera 330-4 or other imaging device embedded or installed within the housing or chamber defined by the fuselage 313. The visual camera 330-4 has a lens and an image sensor defining a field of view extending normal to one of the sides of the fuselage 313. Alternatively, the aerial vehicle may include any number of the visual cameras 330-4, which may be provided on the same side of the fuselage 313, or on different sides of the fuselage 313. In some embodiments, the aerial vehicle 310 may include at least one visual camera 330-4 provided on each of the sides of the fuselage 313, thereby covering three hundred sixty degrees around the aerial vehicle 310. Alternatively, in some other embodiments, one or more visual cameras 330-4 may be mounted in association with the frame 311 or in any other location on the aerial vehicle 310. The housing or chamber defined by the fuselage 313 may further include any number of other components therein, including but not limited to processors, control systems, memory components, batteries or other power sources, transceivers, circuitry, or other sensors.

As is shown in FIGS. 3A and 3B, the aerial vehicle 310 further includes the top cover 315-1 and the bottom cover 315-2, which are mounted to upper and lower edges of the frame 311, respectively. The cross-sections of the covers 315-1, 315-2 have substantially the same size and shape as the frame 311, and may be joined to the upper and lower edges of the frame 311 in any manner. The covers 315-1, 315-2 may include grill-like or grated structures or features such as bars or other extensions that are distributed within planes of the covers and inhibit objects from entering into a cavity defined by the frame 311 from above or below the aerial vehicle 310. The covers 315-1, 315-2 may be aligned or provided in any manner. For example, as is shown in FIG. 3B, each of the covers 315-1, 315-2 includes four primary bars extending radially outward from a geometric center or centroid of the covers, or from the axis along which the geometric center or centroid of the frame 311 and the geometric center or centroid of the fuselage 313 are coaligned. The four primary bars are separated by approximately ninety degrees within planes defined by the respective covers 315-1, 315-2, and thereby divide such covers 315-1, 315-2 into quadrants of substantially equal area and shape.

As is also shown in FIG. 3B, the covers 315-1, 315-2 also feature secondary bars within each of the quadrants defined by the primary bars. Although secondary bars shown in FIG. 3B are aligned at forty-five degree angles with respect to the primary bars, the secondary bars of the covers 315-1, 315-2 may be aligned at any angle with respect to the primary bars, including parallel, perpendicular, or any other angle, in accordance with the present disclosure. As is further shown in FIG. 3B, the covers 315-1, 315-2 further include holes or other openings that enable light to be transmitted above or below the aerial vehicle 310 through such holes by the time-of-flight sensor modules 330-2, 330-3, and enable reflections of such light to be received through such holes by the time-of-flight sensor modules 330-2, 330-3.

As is also shown in FIGS. 3B and 3C, the aerial vehicle 310 further includes a plurality of struts 317 that join the frame 311 and the fuselage 313. For example, as is shown in FIG. 3B, each of the struts 317 includes a proximal end joined to an external surface of one of the rounded corners of the fuselage 313 and a distal end joined to an interior surface of one of the rounded corners of the frame 311. As is shown in FIGS. 3B and 3C, each of the struts 317 is of approximately equal length, and maintains the geometric center or centroid of the frame 311 in coalignment with the geometric center or centroid of the fuselage 313.

As is further shown in FIGS. 3B and 3C, the aerial vehicle 310 further includes a plurality of propulsion motors 325 that are provided within a cavity or volume defined by interior surfaces of the frame 311, exterior surfaces of the fuselage 313, and the covers 315-1, 315-2. The propulsion motors 325 may be any type or form of motors or prime movers that are configured to rotate propellers at desired speed within the cavity or volume, thereby providing forces of lift or thrust to the aerial vehicle 310.

In accordance with embodiments of the present disclosure, the top cover 315-1 and the bottom cover 315-2 may be mounted to the upper and lower edges of the frame 311 in any manner, such as by clips, screws, bolts, snap-fit connections, or any other features. Alternatively, or additionally, the covers 315-1, 315-2 may be mounted to the fuselage 313, the struts 317, the propulsion motors 325, the time-of-flight sensor modules 330-1, 330-2, 330-3 or any other portion of the aerial vehicle 310 in any manner. Moreover, as is further shown in FIGS. 3A and 3B, the top cover 315-1 includes a substantially circular hole (or bore, or other opening) at a geometric center or centroid, thereby enabling the top cover 315-1 to be placed over and coupled to an upper edge of the frame 311, with the hole or other opening encircled around or surrounding a circumference of the time-of-flight sensor module 330-1.

As is further shown in FIGS. 3B and 3C, the propulsion motors 325 includes housings or other features that are mounted to the struts 317, at locations between the proximal ends of the struts 317 joined to the rounded corners of the fuselage 313 and the distal ends of the struts 317 joined to the rounded corners of the frame 311. The propulsion motors 325 may be any type or form of motor, including but not limited to electric, gasoline-powered or other types of motors, that are capable of generating sufficient rotational speeds of one or more propellers or other components and providing thrust and/or lift forces to the aerial vehicle 310. In some embodiments, one or more of the propulsion motors 325 may be a brushless direct current ("DC") multi-phase motor such as an outrunner brushless motor or an inrunner brushless motor. In some embodiments, one or more of the propulsion motors 325 may be a brushed DC motor.

Furthermore, the frame 311, the fuselage 313, the covers 315-1, 315-2 and the struts 317, or external portions of housings of the propulsion motors 325, or any other components of the aerial vehicle 310, may be formed as single pieces, or as two or more pieces, that may be joined together or combined to form such components. For example, as is shown in FIG. 3B, the struts 317 may be substantially hollow or open channels that are closed or defined at least in part when the bottom cover 315-2 is mated with an upper portion of the fuselage 313. As is also shown in FIG. 3B, in some embodiments, the bottom cover 315-2 forms a portion of the housings of each of the propulsion motors 325. In some other embodiments, however, the struts 317 may be closed channels that extend between the fuselage 313 and the housings of the propulsion motors 325 or the frame 311.

In some embodiments, the top cover 315-1, the bottom cover 315-2 and one or more portions of the fuselage 313 may be mated together in a manner that defines a cavity or volume that includes the propulsion motors 325 and any rotating propellers therein. For example, as is shown in FIG. 3B, the top cover 315-1 and the bottom cover 315-2 may be configured for mounting to an upper portion of the fuselage 313, thereby defining the cavity or the volume within which the propulsion motors 325 may operate to rotate one or more propellers. A lower portion of the fuselage 313 including the visual camera 330-4 and any number of other components therein, e.g., processors, control systems, memory components, batteries or other power sources, transceivers, circuitry, or other sensors, may be mounted to an underside of the bottom cover 315-2. Alternatively, in some embodiments, the fuselage 313 may be formed as a single, integral unit. In such embodiments, the bottom cover 315-2 may include a substantially square hole (or bore, or other opening) at a geometric center or centroid, thereby enabling the bottom cover 315-2 to be placed over the fuselage 313, such that the fuselage 313 is inserted through the hole, prior to coupling the bottom cover 315-2 to a lower edge of the frame 311.

The unmanned aerial vehicles of the present disclosure may be formed from materials of any type or form. For example, in some embodiments, one or more of the frame 311, the fuselage 313, the covers 315-1, 315-2 and the struts 317, or external portions of housings of the propulsion motors 325, may be formed from one or more polycarbonates, or from one or more styrenes, e.g., polystyrenes or acrylonitrile butadiene styrenes (or "ABS"), or blends thereof, including but not limited to blends of polycarbonates and ABS. Alternatively, or additionally, one or more of the frame 311, the fuselage 313, the covers 315-1, 315-2 and the struts 317, or external portions of housings of the propulsion motors 325, may be formed from any other lightweight, durable materials such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

Figure 4A:
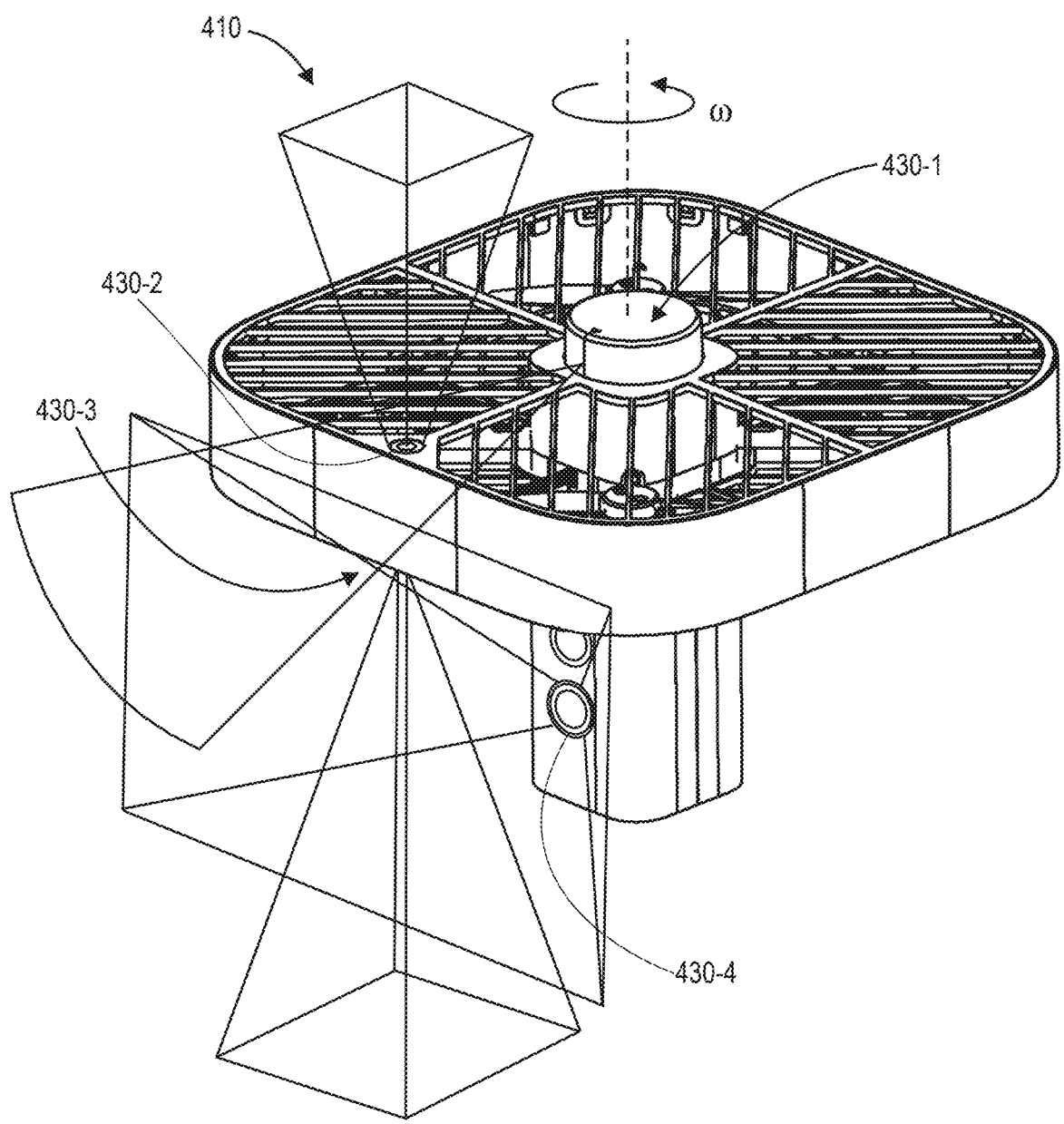
FIGS. 4A through 4C are views of aspects of one system in accordance with embodiments of the present disclosure.
Figure 4B:
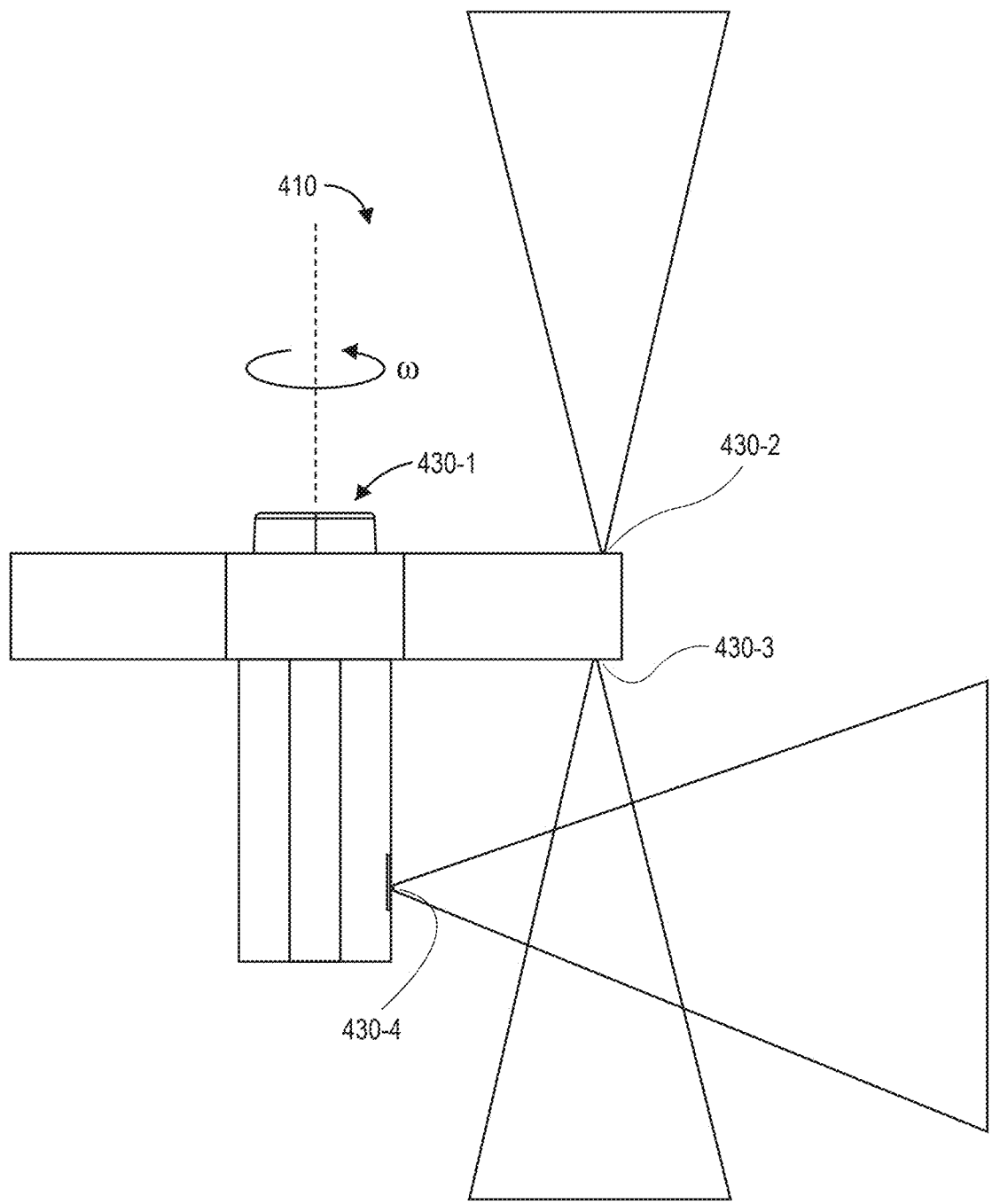
Figure 4C:
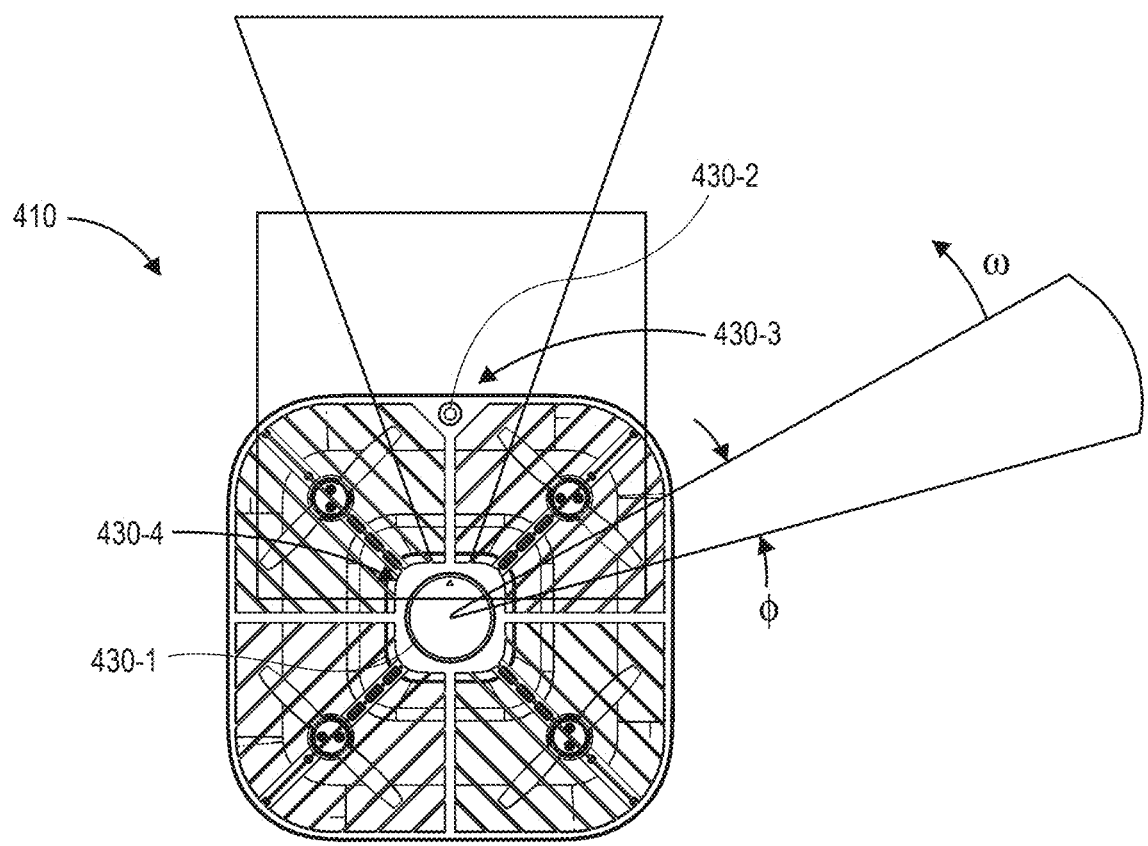

Aerial vehicles of the present disclosure may be operated in any manner to capture information or data, e.g., distances or ranges to surfaces of objects above, below or around the aerial vehicles, as well as images of their surroundings, or any other information or data. Referring to FIGS. 4A through 4C, views of aspects of one system (e.g., an aerial vehicle 410) in accordance with embodiments of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A through 3C, by the number "2" shown in FIG. 2 or by the number "1" shown in FIGS. 1A through 1G.

As is shown in FIGS. 4A through 4C, the aerial vehicle 410 includes range sensors (or other imaging devices) 430-1, 430-2, 430-3, 430-4. One or more of the range sensors 430-1, 430-2, 430-3, 430-4 may be a time-of-flight sensor, a LIDAR sensor, an imaging device, or any other type or form of sensors.

The range sensor 430-1 extends above the aerial vehicle 410 and is configured to transmit light on axes or directions that may rotate at any angular velocity @, such as ten revolutions per second, relative to the fuselage 413. The range sensors 430-2, 430-3 are configured to transmit light in fixed axes or directions above and below the aerial vehicle 410, respectively. The range sensor 430-4 extends radially outward from the fuselage 413, and is configured to transmit light on a fixed axis or direction relative to the fuselage 413. In some implementations, one or more of the range sensors 430-1, 430-2, 430-3, 430-4 may be or include additional sensors or components. Alternatively, one or more of the range sensors 430-1, 430-2, 430-3, 430-4 may be replaced by other sensors or components.

In some implementations, fields of view of the range sensors 430-2, 430-3, 430-4 may define any angles with respect to their axes of orientation. For example, in some implementations, the fields of view may extend from the respective range sensors 430-2, 430-3, 430-4 at angles of twenty to thirty degrees on either side of their respective axes of orientation. The range sensors 430-2, 430-3, 430-4 may thus define image planes in the shapes of squares having sides of approximately sixteen centimeters (16 cm) each at a distance of twenty centimeters (20 cm) from the respective sensors, or sides of approximately twenty-eight centimeters (28 cm) each at a distance of thirty-five centimeters (35 cm) from the respective sensors. Alternatively, the sensors 430-2, 430-3, 430-4 may define fields of view having any other angles, and with any other dimensions, in accordance with implementations of the present disclosure.

Reflections of light captured by the range sensors 430-1, 430-2, 430-3, 430-4 may be interpreted to construct depth images, range profiles or other sets of distances between the range sensors 430-1, 430-2, 430-3, 430-4 and one or more surfaces above, below or around the aerial vehicle 410, or forward of the aerial vehicle 410, several times per second.

Thus, as is shown in FIGS. 4A through 4C, the aerial vehicle 410 may be operated to travel in any direction and on any course, at any speed, and at any altitude, and may capture imaging data, e.g., reflections of light or visual images, regarding its surroundings. In some embodiments, the aerial vehicle 410 may include any other type or form of sensors, including but not limited to Wi-Fi or Bluetooth receivers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors, and may capture any type or form of information or data as the aerial vehicle 410 travels on any course, at any speed, and at any altitude.

Figure 5:
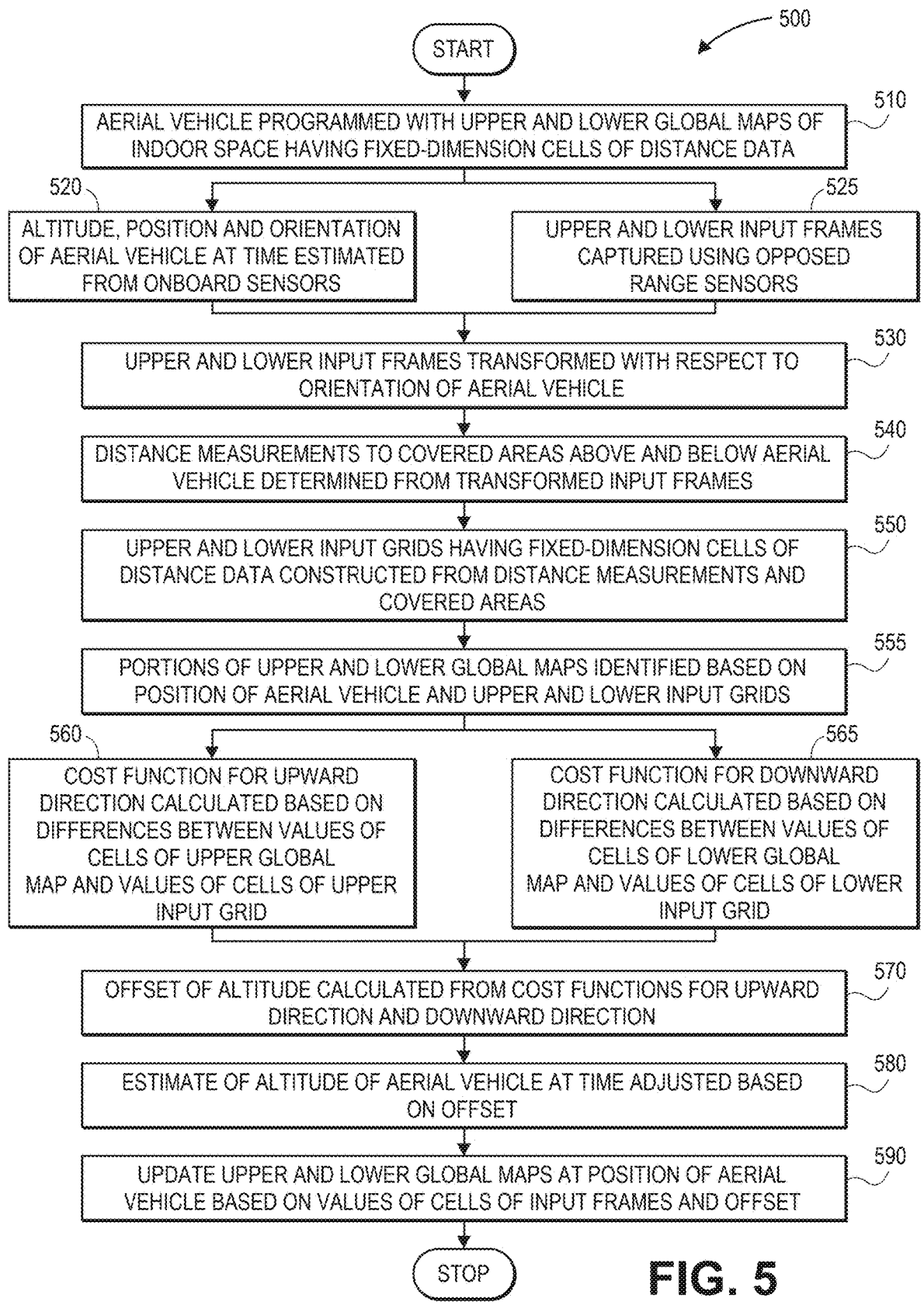
FIG. 5 is a flow chart of one process in accordance with embodiments of the present disclosure.

As is discussed above, an aerial vehicle that is programmed with global maps of an indoor space may capture data regarding distances between the aerial vehicle and one or more surfaces above or below the aerial vehicle, and utilize the global maps and the captured data to determine altitudes of the aerial vehicle within the indoor space, or to refine one or more of such determinations accordingly. Referring to FIG. 5, a flow chart 500 of one process in accordance with embodiments of the present disclosure is shown. At box 510, an aerial vehicle is programmed with an upper global map of an indoor space and a lower global map of the indoor space, with each of the upper global map and the lower global map having cells of distance data that are fixed in dimension.

The indoor space may include one or more rooms such as a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. The indoor space may be bounded by a ceiling or another upper boundary, as well as a floor or another lower boundary. The ceiling or the floor may be aligned horizontally or at any other angle with respect to one another.

The upper global map and the lower global map may be divided into discrete cells (or elements or other portions thereof), and the global maps, or the cells, may have any shape or dimensions. In some implementations, each of the cells may have a square shape, and each of the sides of the square shape may have a length of ten centimeters (or 10 cm). Alternatively, the cells may have any other shapes or any other dimensions, and may be homogenous or heterogenous in nature.

The upper global map, the lower global map, or one or more of the cells, may be associated with a position or any number of positions in three-dimensional space, or within a horizontal plane. For example, where the upper global map or the lower global map is a substantially two-dimensional representation of distance data within the indoor space, each of such cells may have at least one position in three-dimensional space, or in a horizontal plane. Where a position of the aerial vehicle is known or determined, one or more cells of the upper global map or the lower global map may be identified and based on the position of the aerial vehicle.

The distance data may represent distances associated with each of the cells with respect to a datum or fixed altitude or level. In some implementations, the distance data may represent perpendicular distances from an altitude or a level corresponding to an initial position of the aerial vehicle, e.g., a dock or other landing or takeoff station or location, to an altitude or a level corresponding to a surface above or below the altitude or the level corresponding to the initial position of the aerial vehicle. For example, where a dock or another station or location associated with an aerial vehicle is provided at a height of three feet above a floor at a given position within the indoor space, the upper global map will include distances to surfaces throughout the indoor space that are above the initial three-foot height of the aerial vehicle, and the lower global map will include distances to surfaces throughout the indoor space that are below the initial three-foot height of the aerial vehicle. Furthermore, where surfaces within a cell are provided at various distances from the datum or fixed altitude or level, a value represented in the distance data may be a minimum distance of the various distances, an average distance of the various distances, or any other measure representative of the various distances.

The aerial vehicle may be outfitted with any number of motors, propellers (or rotors), control surfaces or any other components, such as one or more range sensors (or other imaging devices), any of which may be a time-of-flight sensor, a LIDAR sensor, an imaging device, or any other type or form of sensors. In some implementations, the aerial vehicle may include a first range sensor that is configured to transmit light along a first axis of orientation or in a first direction with respect to the aerial vehicle, and a second range sensor that is configured to transmit light along a second axis of orientation or in a second direction with respect to the aerial vehicle, with the second axis or the second direction being opposite the first axis or the first direction, e.g., above and below the aerial vehicle.

Additionally, in some implementations, fields of view of the range sensors may define any angles with respect to their axes of orientation. For example, in some implementations, the fields of view may extend from the respective range sensors at angles of twenty to thirty degrees on either side of their respective axes of orientation. Alternatively, the range sensors may define fields of view having any other angles, and with any other dimensions, in accordance with implementations of the present disclosure. Reflections of light captured by the range sensors may be interpreted to construct depth images, range profiles or other sets of distances between the range sensors and any number of surfaces above or below the aerial vehicle, several times per second.

At box 520, an altitude, a position and an orientation of the aerial vehicle at a time are estimated using one or more onboard sensors.

For example, in some implementations, the aerial vehicle may include an inertial measurement unit (or "IMU") having one or more accelerometers, gyroscopes, compasses, position sensors or other components. The inertial measurement unit may be used to determine or calculate accelerations, velocities and/or orientations of the aerial vehicle along or about one or more principal axes, or any other aspects of the position or motion of the aerial vehicle. Alternatively, the aerial vehicle may include any other type or form of sensors from which an altitude, a position or an orientation of the aerial vehicle may be estimated or determined, and may be programmed with any information or data regarding the indoor space, e.g., an environment map, a navigation map, a range map, or any other information or data. The altitude may be determined with respect to a lower surface within the indoor space (e.g., a floor), an upper surface within the indoor space (e.g., a ceiling), or any other datum or altitude or level within the indoor space (e.g., a baseline altitude or level).

In parallel, at box 525, upper and lower input frames are captured using opposed range sensors of the aerial vehicle. For example, where the aerial vehicle is outfitted or equipped with an upwardly-oriented range sensor, e.g., a time-of-flight sensor, and a counterpart downwardly-oriented range sensor, e.g., another time-of-flight sensor, such as the range sensors 430-2, 430-3 shown in FIGS. 4A and 4B, the respective range sensors may transmit light in opposite directions by way of one or more illuminators or other light sources, and capture reflections of the light from any surfaces above or below the aerial vehicle, respectively. Information or data regarding the reflected light may be interpreted to generate a depth image or a range profile of distances between the respective sensors and the respective surfaces above or below the aerial vehicle. An input frame may refer to a depth image (or a range image), a set of returns, or interpretations of the returns, captured by each of the range sensors having axes of orientation extending above and below the aerial vehicle.

Alternatively, the range sensors may be any other type or form of sensors that may be used to determine ranges in opposite directions, e.g., above and below the aerial vehicle.

At box 530, the upper and lower input frames are transformed with respect to the orientation the aerial vehicle. For example, in some implementations, where axes of orientation of the range sensors that captured the upper and lower input frames from opposite perspectives are substantially parallel to a yaw axis of the aerial vehicle, e.g., or otherwise extend above and below the aerial vehicle, the upper input frame or the lower input frame may require flipping, inversion, or some other transformation about a roll axis or a pitch axis of the aerial vehicle, in order to ensure that coordinates of the upper input frame and the lower input frame are coaligned with respect to one another and also to a position and/or an orientation of the aerial vehicle determined at box 520. Alternatively, in some implementations, the input frames may be considered independently without flipping, inversion or any other transformations.

Likewise, the upper and lower input frames may be filtered to remove any input ranges that are located outside a desired or predetermined interval, e.g., to remove returns that are too close or too far from the aerial vehicle and are likely outliers or aberrant returns. For example, where either of the input frames includes a return that is less than a minimum range associated with the range sensors, or beyond a maximum range associated with the range sensors, such returns may be disregarded or replaced with an average value, a minimum value, or any other value of any returns surrounding the disregarded return.

At box 540, distance measurements to covered areas above and below the aerial vehicle are determined from the transformed input frames. For example, where the range sensors operate by transmitting light and capturing returns of the reflected light, distances to surfaces of objects above or below the aerial vehicle may be calculated based on times at which the light was transmitted and captured, and the speed of light.

In some implementations, a covered area associated with the transmission and returns of light may be calculated or determined. For example, where an angle associated with the transmission and returns of light by either or both of the range sensors is known, a size of the covered area may be calculated based on the distance measurements, e.g., according to standard trigonometric functions. In some implementations, where a field of view of a range sensor extends at an angle of approximately twenty to thirty degrees on either side of an axis of orientation of the range sensor, the range sensor may define an image frame (or an image plane) having a covered area in a shape of a square having sides of approximately sixteen centimeters (16 cm) each at a distance of twenty centimeters (20 cm) from the range sensor, or sides of approximately twenty-eight centimeters (28 cm) each at a distance of thirty-five centimeters (35 cm) from the image sensor. Alternatively, fields of view of range sensors may extend at any other angles with respect to axes of orientation of the range sensors, and covered areas may have any other sizes with respect to distances from such range sensors.

Furthermore, image frames may be further processed to account for any yaw, pitch or roll of the aerial vehicle at the time at which the upper and lower input frames were captured at box 525. For example, one or more of the distance measurements may be modified to account for angles of the respective range sensors with respect to horizontal, or with respect to any other standard by which the altitude or the position of the aerial vehicle were determined at box 520. The distances may be determined by constructing hypothetical planes parallel to surfaces above or below the aerial vehicle and calculating distances to points on the respective planes.

At box 550, upper and lower input grids having fixed-dimension cells of distance data are constructed from the distance measurements and the covered areas. For example, where the upper and lower portions of the global map include distance data in cells (or elements) having fixed dimensions, upper and lower grids of distances may be constructed from the upper and lower input frames, respectively, and may include cells or elements having the same fixed dimensions as those of the global map. For example, where cells of the global map have lengths and widths of ten centimeters (10 cm), input grids having cells with lengths and widths of ten centimeters (10 cm) each may be formed from the covered areas, and distances may be assigned to each of such cells accordingly. Such distances may be a minimum distance measurement for any points within a cell, an average distance measurement for any point within a cell, or any other distance measurement.

At box 555, a portion of the upper global map and a portion of the lower global map are identified based on the position of the aerial vehicle determined at box 520 and the upper input grid and lower input grid constructed at box 550. As is discussed above, portions of the upper global map and the lower global map, or cells of such portions, may be associated with positions in three-dimensional space, or within a horizontal plane. Based on the position determined at box 520, sets of cells in each of the upper global map and the lower global map associated with that position may be identified.

In some implementations, the upper input grid or the lower input grid may be rotated about a yaw axis of the aerial vehicle with respect to the upper global map or the lower global map, as necessary, in order to identify portions of the upper global map or the lower global map corresponding to the upper input grid or the lower input grid, respectively. For example, in some implementations, where the cells of distance data of the global maps are aligned at an angle with respect to the cells of distance data of the input grids, the global maps may be rotated toward the input grids about the yaw axis by the angle, or vice versa, in order for the global maps and the input grids to be coaligned with respect to one another.

Additionally, in some implementations, the upper input grid or the lower input grid may be translated within a two-dimensional plane with respect to the upper global map or the lower global map, as necessary, in order to identify portions of the upper global map or the lower global map corresponding to the upper input grid or the lower input grid, respectively. For example, in some implementations, where the cells of distance data of the global maps have the same shapes and sizes as the cells of distance data of the input grids, the input grids may be translated with respect to the global maps in order to determine which, of any, cells of the input grids correspond to cells of the global maps.

At box 560, a cost function for an offset of altitude in an upward direction is calculated based on differences between values of the cells of the upper global map and values of the cells of the upper input grid. The cost function may be used to calculate an offset that should be applied to the altitude estimated at box 520 in order to minimize differences between cells or elements in common between the upper global map and the upper input grid constructed at box 550. In some implementations, the cost function may determine a logarithmic sum of differences between values of cells in the upper global map and the upper input grid, to minimize the offset in altitude. For example, one such cost function is referenced above in Equation (1). In some implementations, the number of cells or elements in common between the upper global map and the upper input grid may be the same as the number of cells or elements in the upper input grid, such that all of such cells or elements match or correspond to the upper global map. Alternatively, the number of cells or elements in common may be fewer than all of the cells or elements in the upper input grid, such that some of the cells or elements of the upper input grid do not match or correspond to any of the cells in the upper global map.

In parallel, at box 565, a cost function for the offset of altitude in a downward direction is calculated based on differences between values of the cells of the lower global map and values of the cells of the lower input grid. In a manner similar to that described above with respect to box 560, the cost function may be used to calculate an offset that should be applied to the altitude estimated at box 520 in order to minimize differences between cells or elements in common between the lower global map and the lower input grid constructed at box 550. In some implementations, the cost function may determine a logarithmic sum of differences between values of cells in the lower global map and the lower input grid, to minimize the offset in altitude. For example, one such cost function is referenced above in Equation (2). The number of cells or elements in common between the lower global map and the lower input grid may be the same as the number of cells or elements in the lower input grid, such that all of such cells or elements match or correspond to the lower global map, or fewer than all of the cells or elements in the lower input grid, such that some of the cells or elements of the lower input grid do not match or correspond to any of the cells in the lower global map.

In some implementations, the cost function for the offset of altitude in the upward direction calculated at box 560 and the cost function for the offset of altitude in the downward direction calculated at box 565 may apply the offset in opposite directions, e.g., a positive addition to the values of the cells of the upper input grid, and a negative addition to the values of the cells of the lower input grid, when minimizing differences.

At box 570, the offset of altitude is calculated from the cost functions for the upward direction and the downward direction. The offset may be calculated as a cost function, e.g., a weighted sum of the cost function for the offset of altitude in the upward direction calculated at box 560 and the cost function for the offset of altitude in the downward direction calculated at box 565. The weighted sum may apply a coefficient to emphasize or weight the cost function for the upward direction with respect to the cost function for the downward direction, or vice versa, or to weight the cost functions equally in either direction. For example, one such cost function is referenced above in Equation (3).

At box 580, an estimate of the altitude at the time at which the upper and lower input frames were captured is adjusted based on the offset. In some implementations, the altitude of the arial vehicle that was estimated or determined at box 520 may be updated or modified to account for the offset, e.g., an argument of the minimum of the domain of the offsets.

At box 590, the upper global map and the lower global map at the position of the aerial vehicle is updated based on values of the cells of the input frames, and the process ends. For example, where a cell of one of the input grids is in common with a cell of one of the global maps, a value associated with the cell of the one of the global maps may be updated based on the existing value of that cell and also a value of a corresponding cell of the input grid that is in common with that cell, along with the offset of altitude. Alternatively, where a cell of one of the input grids is not present in a corresponding portion of one of the global maps (e.g., an upper global map or a lower global map), that cell, and its corresponding value, plus or minus a value of the offset of altitude, may be added to the one of the global maps.

The process represented in the flow chart 500 of FIG. 5 may be repeated any number of times at and at any frequency. For example, where each of the range sensors is configured to transmit and receive light at a given rate or frequency, e.g., 4,500 Hertz, or 4,500 transmissions per second, or any other rate or frequency, the process represented in the flow chart 500 may be repeated for each of such transmissions and their respective returns, or for any number of such transmissions or returns. Alternatively, where altitudes, positions or orientations of the aerial vehicle are determined based on data captured by onboard sensors, e.g., sensors utilized for simultaneous localization and mapping, at a given rate or frequency, e.g., 10 Hertz (or ten times per second), 100 Hertz (or one hundred times per second), or any other rate or frequency, the process represented in the flow chart 500 may be repeated for each of the determinations of altitude, position or orientation, or for any number of such determinations.

In accordance with implementations of the present disclosure, a global map may be generated in any manner. Referring to FIGS. 6A through 6F, views of aspects of one system in accordance with embodiments of the present disclosure are shown. Except where otherwise noted, reference numerals preceded by the number "6" shown in FIGS. 6A through 6F indicate components or features that are similar to components or features having reference numerals preceded by the number "4" shown in FIGS. 4A through 4C, by the number "3" shown in FIGS. 3A through 3C, by the number "2" shown in FIG. 2 or by the number "1" shown in FIGS. 1A through 1G.

Figure 6A:
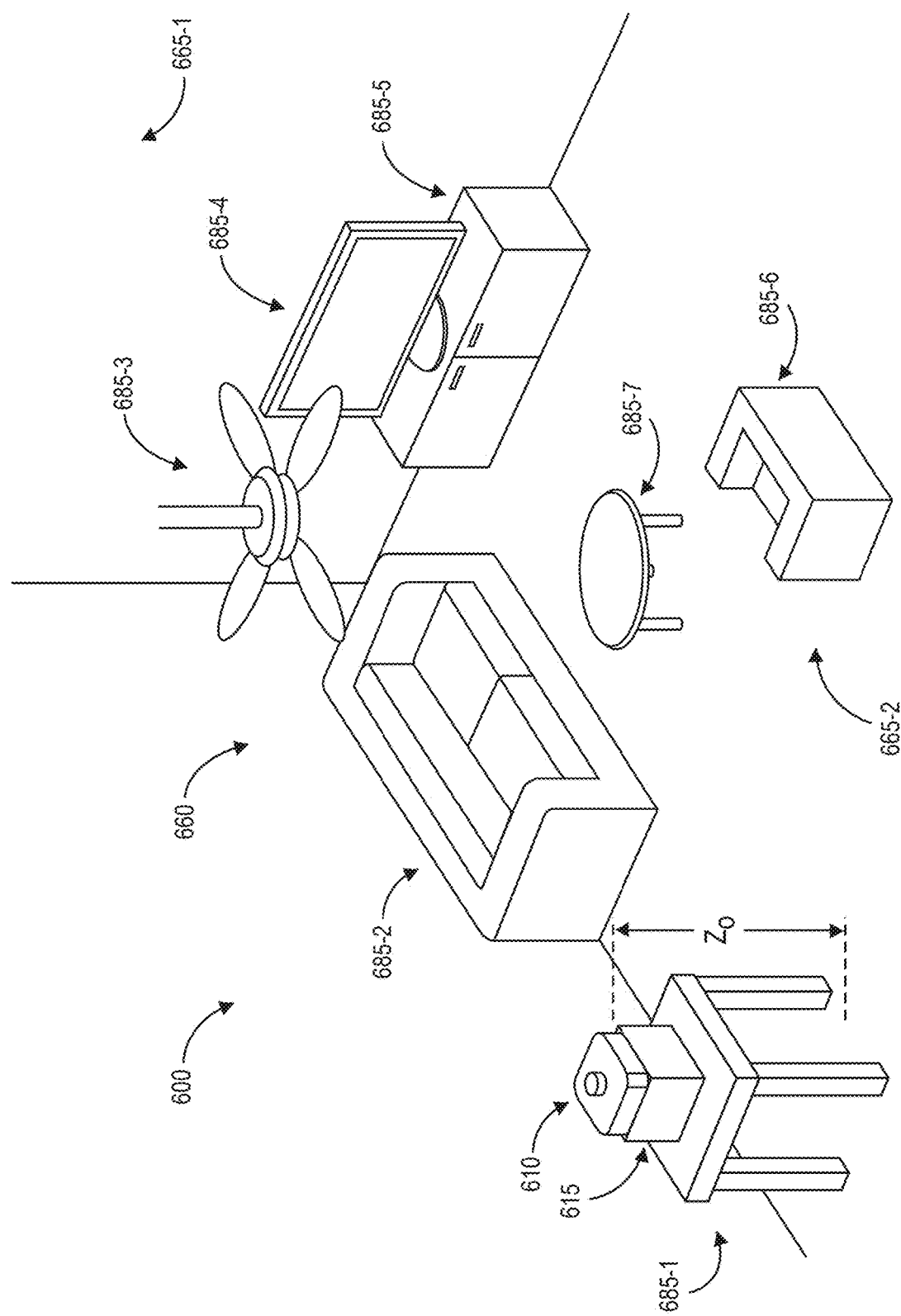
FIGS. 6A through 6F are views of aspects of one system in accordance with embodiments of the present disclosure.

As is shown in FIG. 6A, a facility 660 (e.g., one or more rooms or spaces of any type or form) includes an aerial vehicle 610 provided in or resting on a base component 615 (e.g., dock, docking station, or other component) provided on a table 685-1 or another structure within the facility 660. The aerial vehicle 610 includes one or more propulsion motors, control surfaces or other components for enabling the aerial vehicle 610 to take off from or land on the base component 615, or to otherwise travel at one or more selected altitudes, on one or more selected courses or at one or more selected speeds. The table 685-1 may be any structure or component having one or more surfaces for accommodating the base component 615 or any other objects thereon. As is also shown in FIG. 6A, the aerial vehicle 610 is at an initial datum $z_0$ (or another altitude or level) when the aerial vehicle 610 is provided in or resting on the base component 615.

As is further shown in FIG. 6A, the facility 660 includes a plurality of other objects or components, such as a couch 685-2 resting on a floor 665-2 or another lower surface of the facility 660 and provided along one wall of the facility 660, a ceiling fan 685-3 descending from a ceiling 665-1 or another upper surface of the facility 660, a television 685-4 and a credenza 685-5 resting on the floor 665-2 of the facility 660 and provided along another wall of the facility 660, and a chair 685-6 and a table 685-7 resting on the floor 665-2 of the facility 660. Alternatively, the facility 660 may include any number of other static or dynamic objects (e.g., articles of furniture, humans, animals such as pets, or any others).

Figure 6B:
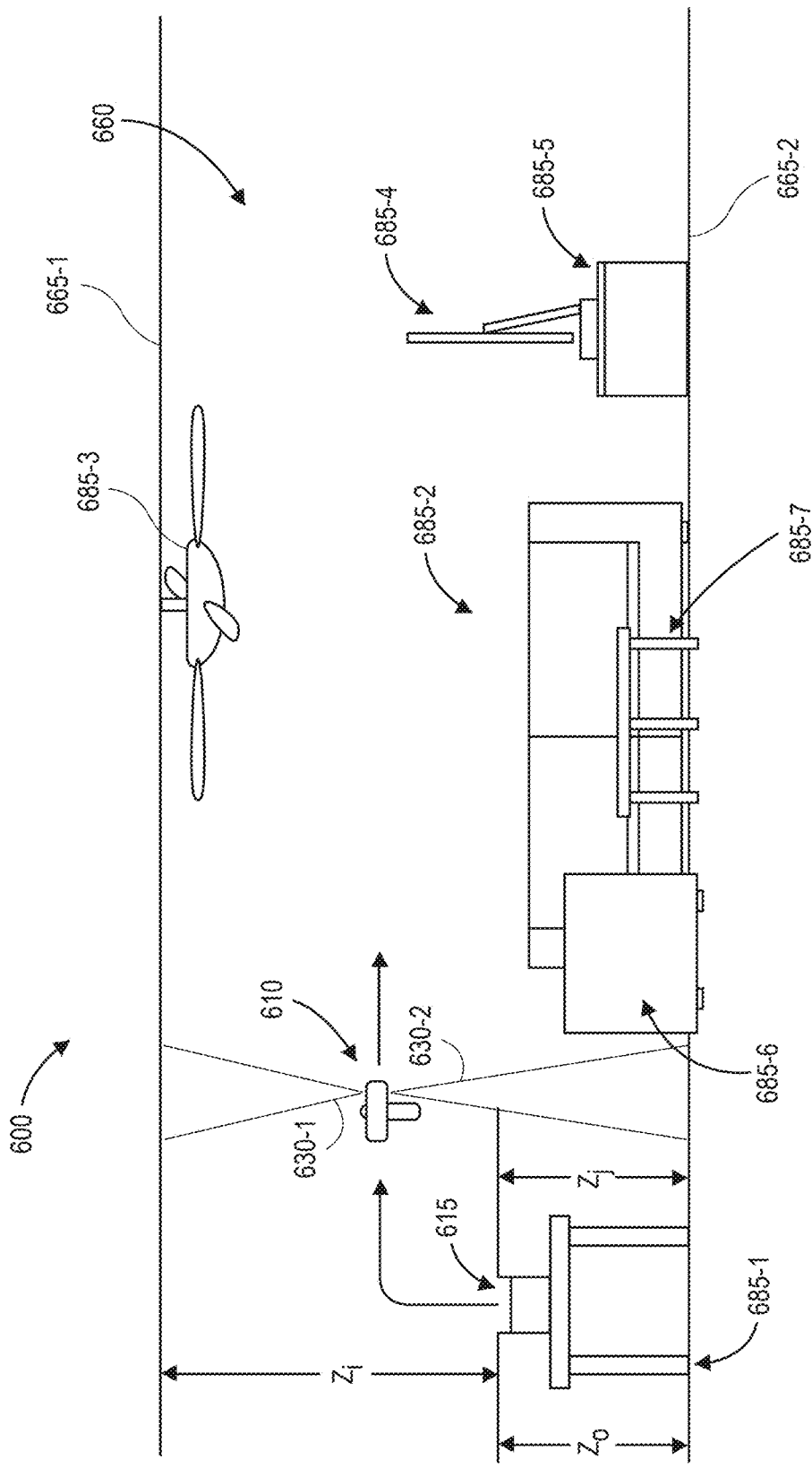
Figure 6C:
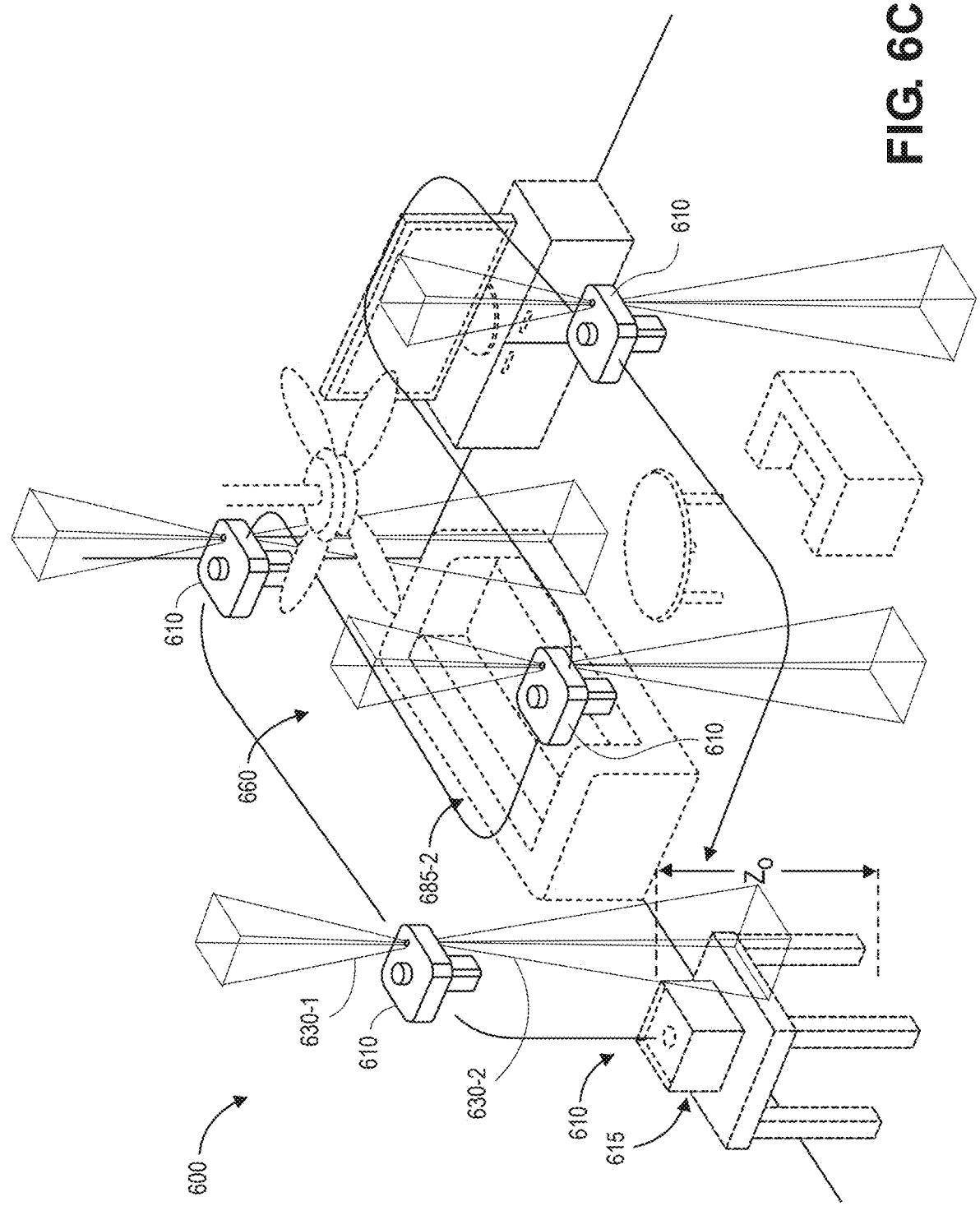

As is shown in FIGS. 6B and 6C, when the aerial vehicle 610 is engaged in flight operations within the facility 660, the aerial vehicle 610 may capture data regarding distances $z_i$ between the aerial vehicle 610 and the ceiling 665-1 or other objects or surfaces using a range sensor 630-1 and distances $z_j$ between the aerial vehicle 610 and the floor 665-2 or other objects or surfaces using a range sensor 630-2. The aerial vehicle 610 may capture the data using the range sensors 630-1, 630-2 at any rate or frequency, and interpret the data to calculate the distances $z_i$, $z_j$. For example, as is shown in FIG. 6C, the aerial vehicle 610 may travel throughout the facility 660 in one or more patterns, or at any selected altitudes, on any selected courses or at any speeds, and may capture data using the range sensors 630-1, 630-2 regarding distances to the ceiling 665-1 and the floor 665-2, respectively. The aerial vehicle 610 may further include any other sensors, e.g., imaging devices of any kind, that may be configured to capture data during flight operations at any rate or frequency, and for navigation or for any other purpose.

Figure 6D:
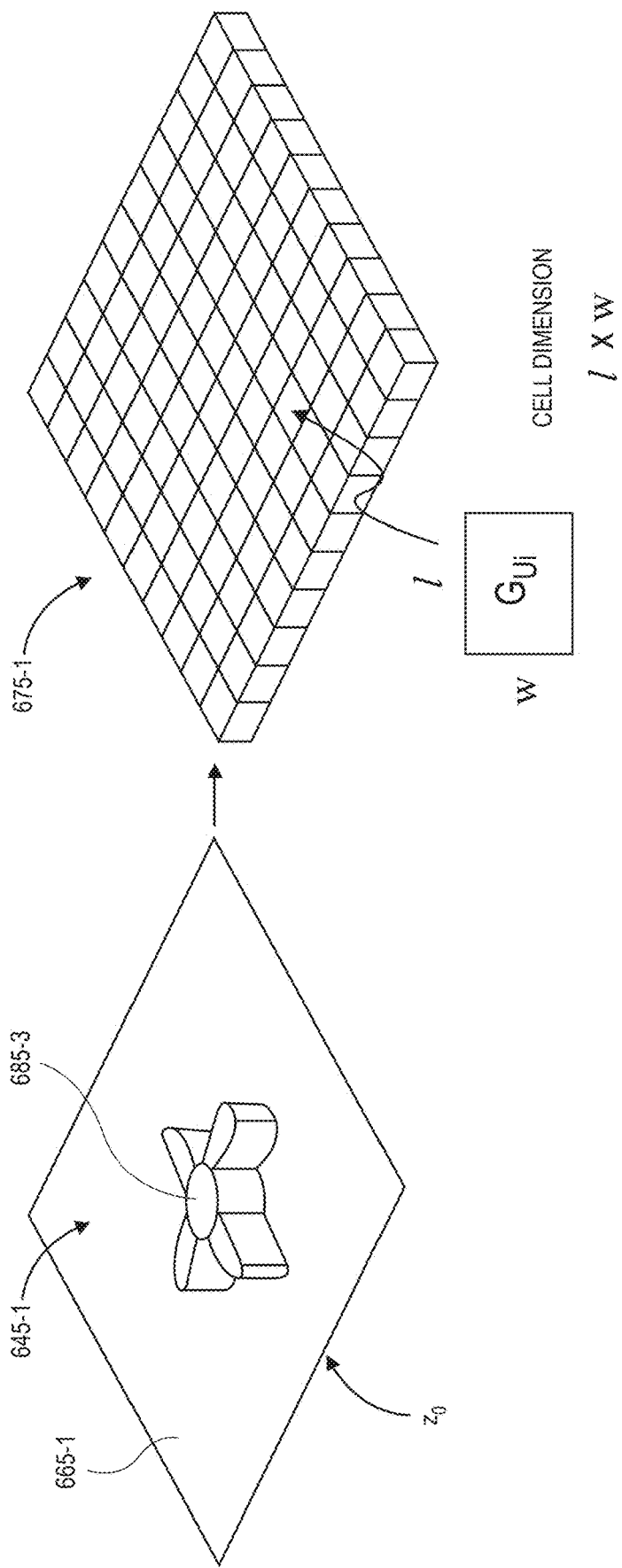

As is shown in FIG. 6D, range data 645-1 captured using the range sensor 630-1 may be processed to generate an upper global map 675-1. The range data 645-1 may represent distances between the aerial vehicle 610 and surfaces above the aerial vehicle 610, e.g., the ceiling 665-1 or the ceiling fan 685-3. Once the range data 645-1 has been captured, the range data 645-1 may be processed to determine values $G_{Ui}$ corresponding to distances to cells (or elements) with respect to the datum $z_0$. Each of the cells may having fixed dimensions, e.g., a length l and a width w, and the values $G_{Ui}$ may be stored in association with such cells in one or more memory components or data stores of the aerial vehicle 610.

Figure 6E:
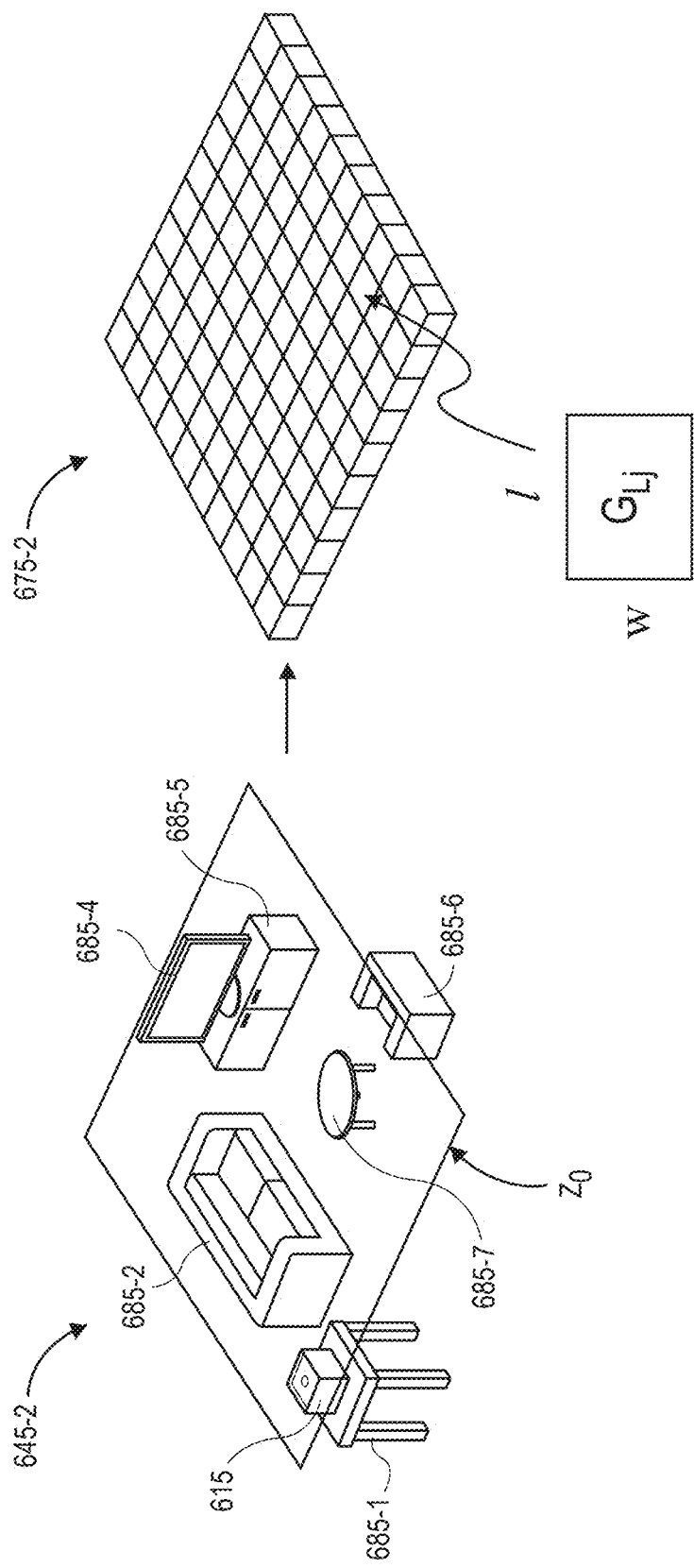

Similarly, as is shown in FIG. 6E, range data 645-2 captured using the range sensors 630-2 may be processed to generate a lower global map 675-2. The range data 645-2 may represent distances between the aerial vehicle 610 and surfaces below the aerial vehicle 610, e.g., the floor 665-2 or the table 685-1, the couch 685-2, the television 685-4, the credenza 685-5, the chair 685-6, the table 685-7 or any other objects. Once the range data 645-2 has been captured, the range data 645-2 may be processed to determine values $G_{Lj}$ corresponding to distances to cells (or elements) with respect to the datum $z_0$. Each of the cells may have fixed dimensions, e.g., the same length l and width w, of the cells of the upper global map 675-1, or any other dimensions, and the values $G_{Lj}$ may be stored in association with such cells in one or more memory components or data stores of the aerial vehicle 610.

The cells of the upper global map 675-1 and the lower global map 675-2 may have any shape or dimensions. In some implementations, each of the cells may have a square shape, with sides of ten centimeters (or 10 cm) each. Alternatively, the cells may have any other shape, or any other dimensions, and may be homogenous or heterogenous in nature.

Figure 6F:
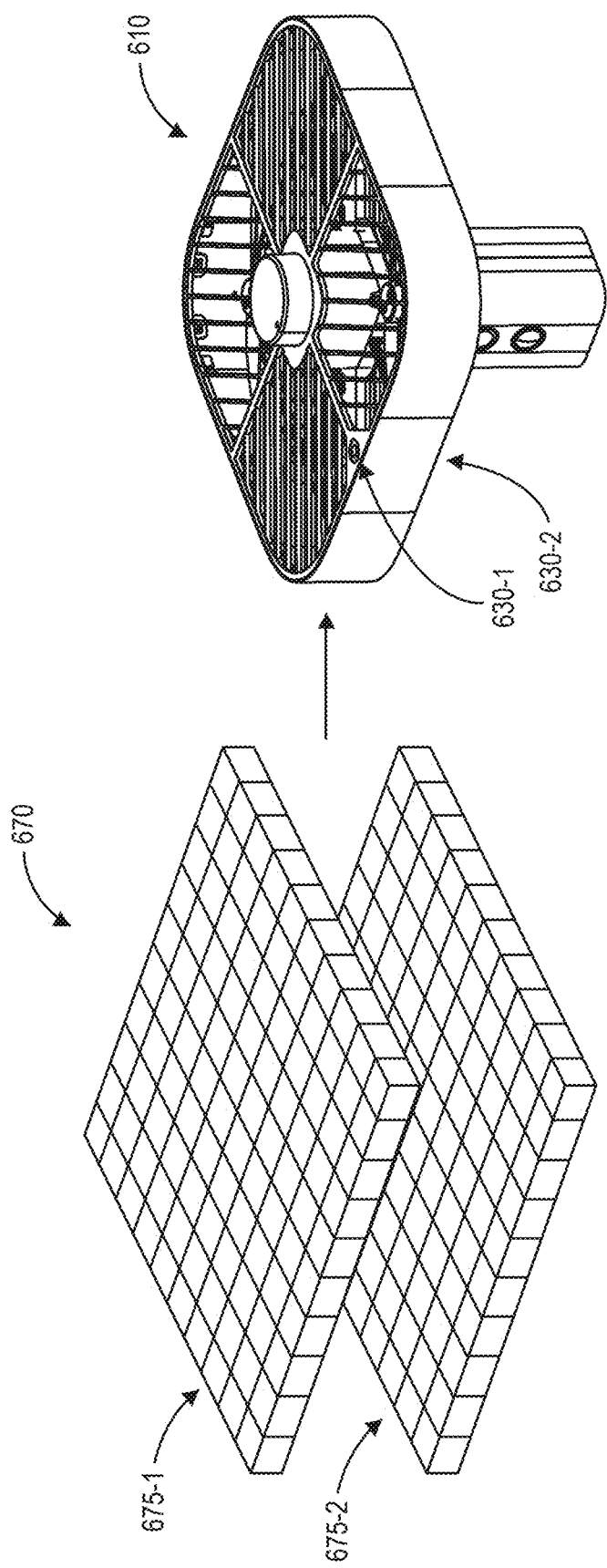

As is shown in FIG. 6F, once the aerial vehicle 610 has captured the range data 645-1, 645-2 and generated the upper global map 675-1 and the lower global map 675-2, data 670 representing the upper global map 675-1 and the lower global map 675-2 may be programmed into or stored by the aerial vehicle 610, or any other aerial vehicles, that operate within the facility 660. The data 670 or either the upper global map 675-1 or the lower global map 675-2 may be utilized by the aerial vehicle 610 for any purpose, and may be updated at any time, e.g., on each instance of flight operations within the facility 660.

As is discussed above, an aerial vehicle programmed with global maps of indoor spaces may utilize the global maps to determine altitudes while operating within the indoor spaces, or to refine any such determinations. Referring to FIGS. 7A through 7D, views of aspects of one system in accordance with embodiments of the present disclosure are shown. Except where otherwise noted, reference numerals preceded by the number "7" shown in FIGS. 7A through 7D indicate components or features that are similar to components or features having reference numerals preceded by the number "6" shown in FIGS. 6A through 6F, by the number "4" shown in FIGS. 4A through 4C, by the number "3" shown in FIGS. 3A through 3C, by the number "2" shown in FIG. 2 or by the number "1" shown in FIGS. 1A through 1G.

Figure 7A:
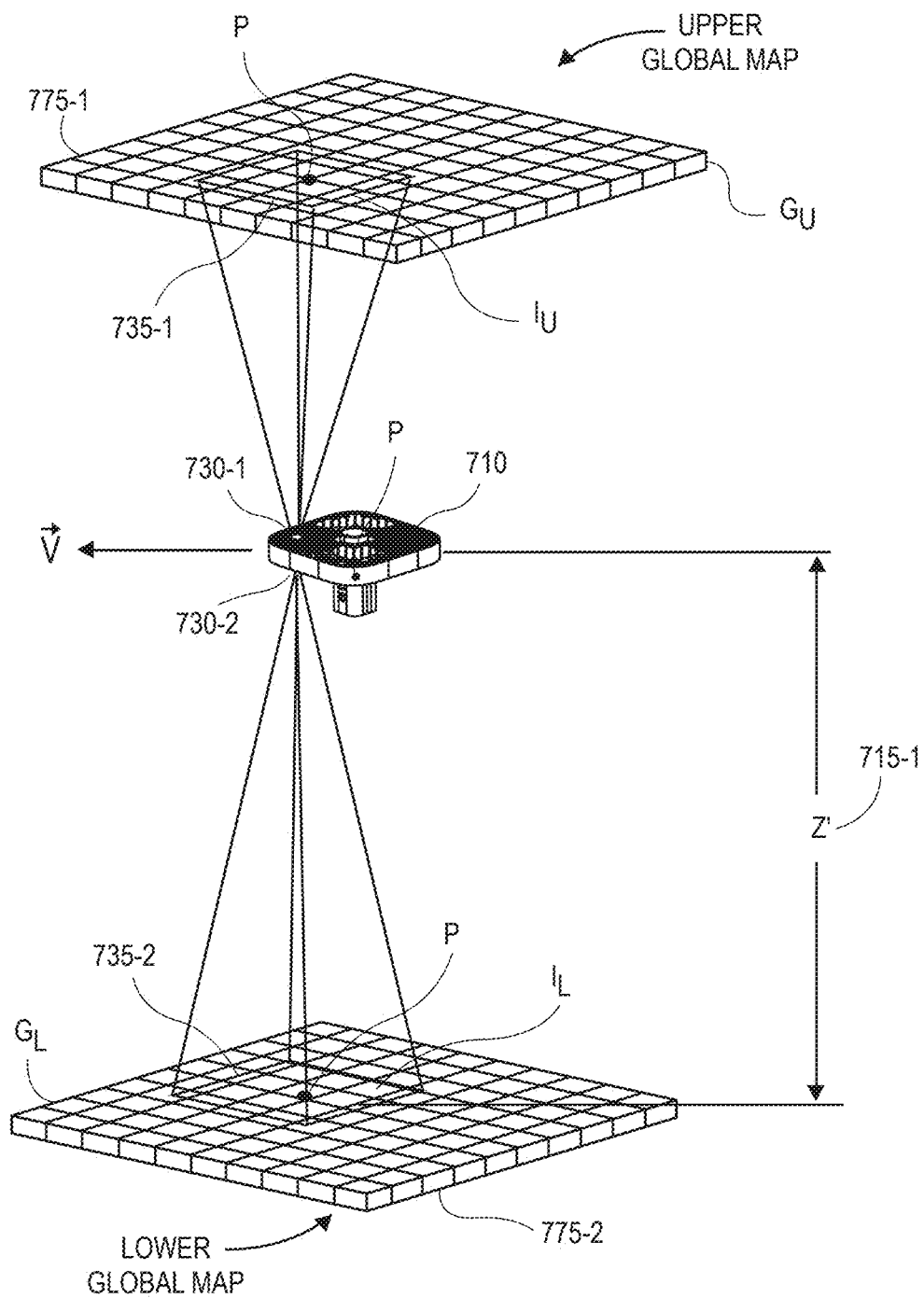

As is shown in FIG. 7A, an aerial vehicle 710 is engaged in flight operations within a facility 760 (e.g., an indoor room or space of any kind). The aerial vehicle 710 determines a position P and an altitude 715-1, or z', while traveling at a velocity V. Using range sensors 730-1, 730-2 provided oriented in opposed directions, e.g., upward and downward, the aerial vehicle 710 captures data, e.g., input frames $I_U$ and $I_L$, regarding distances to an upper surface 765-1 provided above the aerial vehicle 710 and a lower surface 765-2 provided below the aerial vehicle 710. Additionally, based on the position P, the aerial vehicle 710 identifies a set of cells included in an upper global map 775-1 and a lower global map 775-2. The cells of the upper global map 775-1 and the lower global map 775-2 may have any shapes or dimensions, and each may represent a distance between a portion of the surface and a datum or another altitude or level within the facility 760.

Figure 7B:
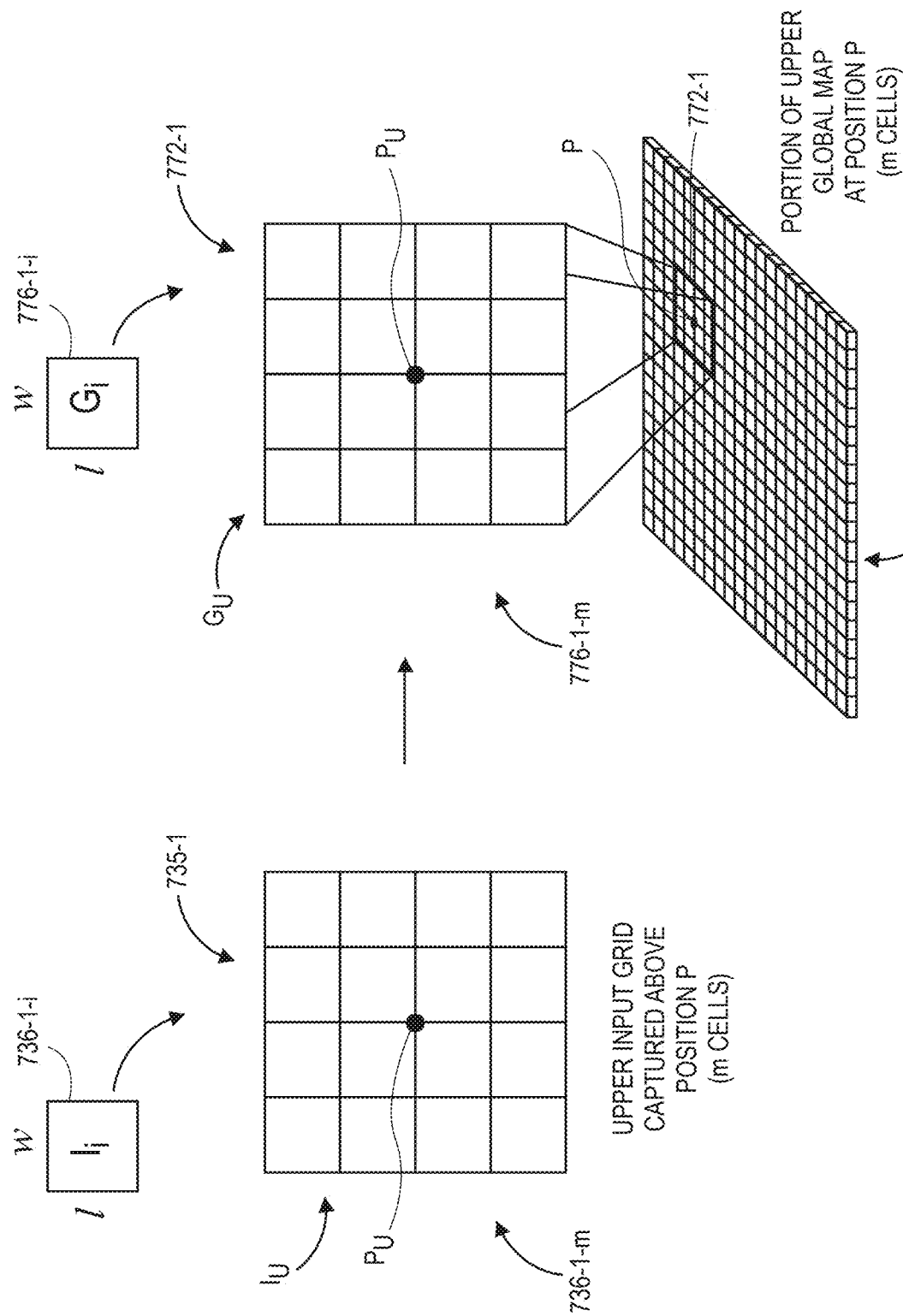

As is shown in FIG. 7B, an input grid 735-1 is formed from the input frame $I_U$. The input grid 735-1 is centered at a point Pu in a horizontal plane corresponding to the position P, and includes a plurality of cells 736-1-*m*. A representative cell 736-1-*i* of the cells 736-1-*m* has a length l and a width w, and a distance value $I_i$ representing a distance from the aerial vehicle 710 to a portion of the upper surface 765-1 corresponding to the representative cell 736-1-*i*.

As is also shown in FIG. 7B, a set of m cells 776-1-*m* of a portion of the upper global map 775-1 is identified based on the point Pu. A representative cell 776-1-*i* of the cells 776-1-*m* has a length l and a width w, and a distance value $G_i$ representing a distance from a datum or another altitude or level to the portion of the upper surface 765-1 corresponding to the representative cell 776-1-*i*.

The input grid 735-1 and the set of cells 776-1-*m* have the same number m of cells in common, and each of the cells has the same shape, viz., a square with sides of ten centimeters (or 10 cm) each. Alternatively, the cells may have any other shape, or any other dimensions, and may be homogenous or heterogenous in nature. Moreover, in some implementations, the set of cells 776-1-*m* may include fewer than all of the m cells of the input grid 735-1, such as where the point Pu corresponds to a position P that is near an edge of the global map, or is in an area or region of the facility 760 that is not included in the global map.

In some implementations, the input grid 735-1 may be rotated about a yaw axis of the aerial vehicle 710 with respect to the upper global map 775-1, as necessary, in order to identify the cells 776-1-*m* of the input grid 735-1 that correspond to the upper global map 775-1. For example, in some implementations, where the cells of the upper global map 775-1 are aligned at an angle with respect to the cells of distance data of the input grid 735-1, the upper global map 775-1 may be rotated toward the input grid 735-1 about the yaw axis by the angle, or vice versa, in order for the upper global map 775-1 at an angle with respect to the cells of distance data of the input grid 735-1 to be coaligned with respect to one another.

Additionally, in some implementations, the input grid 735-1 may be translated within a two-dimensional plane with respect to the upper global map 775-1, as necessary, in order to identify portions of the upper global map 775-1 corresponding to the input grid 735-1. For example, in some implementations, where the cells of the upper global map 775-1 have the same shapes and sizes as the cells of distance data of the input grid 735-1, the input grid 735-1 may be translated with respect to the upper global map 775-1 in order to determine which, of any, cells of the input grid 735-1 correspond to cells of the upper global map 775-1.

Figure 7C:
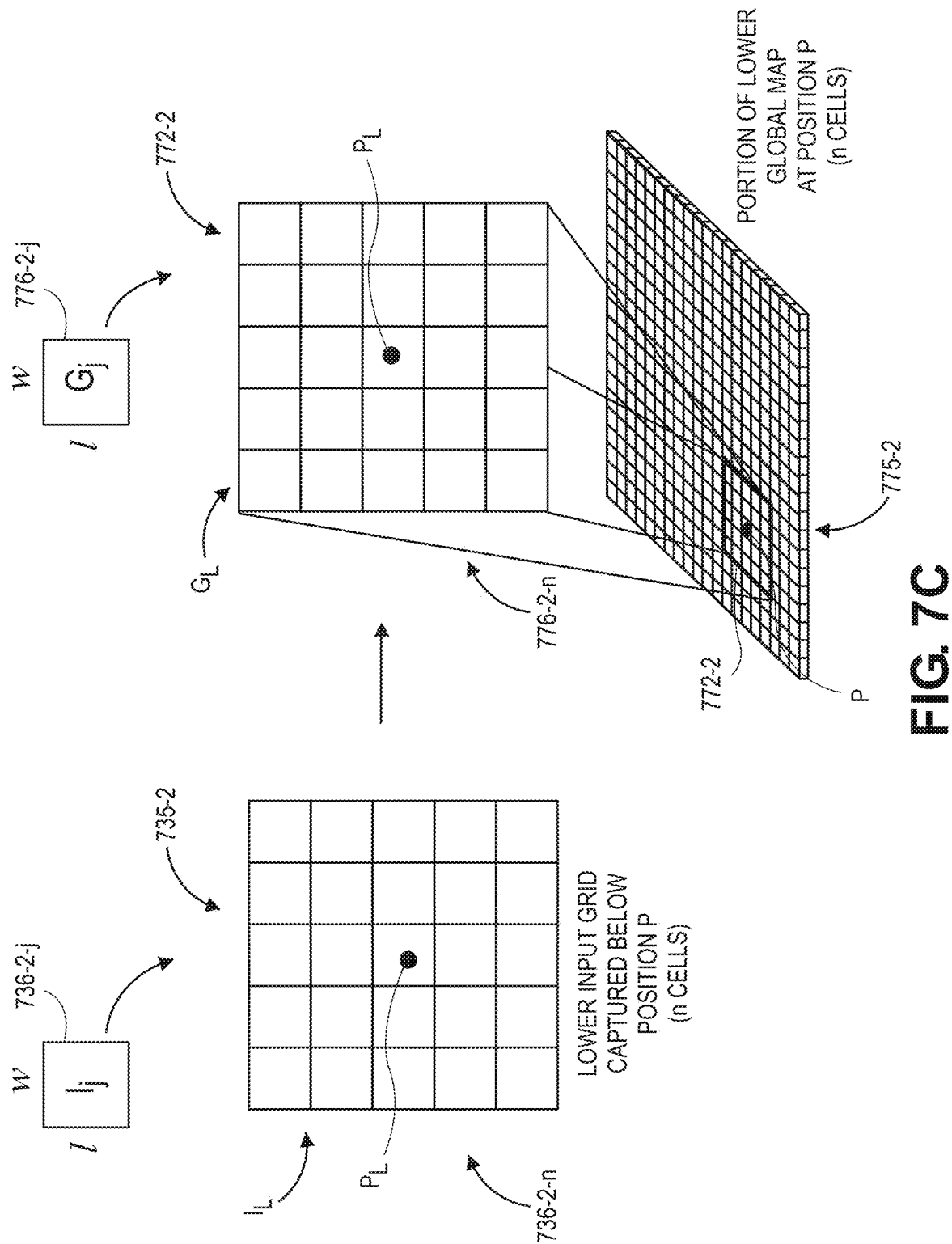

Similarly, as is shown in FIG. 7C, an input grid 735-2 is formed from the input frame $I_L$. The input grid 735-2 is centered at a point $P_L$ in a horizontal plane corresponding to the position P, and includes a plurality of cells 736-2-*n*. A representative cell 736-2-*j* of the cells 736-2-*n* has a length l and a width w, and a distance value $I_j$ representing a distance from the aerial vehicle 710 to a portion of the lower surface 765-2 corresponding to the representative cell 736-2-*j*.

As is also shown in FIG. 7C, a set of n cells 776-2-*n* of a portion of the lower global map 775-2 is identified based on the point $P_L$. A representative cell 776-2-*j* of the cells 776-2-*n* has a length l and a width w, and a distance value $G_j$ representing a distance from a datum or another altitude or level to the portion of the lower surface 765-2 corresponding to the representative cell 776-2-*j*.

The input grid 735-2 and the set of cells 776-2-*n* have the same number n of cells in common, and each of the cells has the same shape, viz., a square with sides of ten centimeters (or 10 cm) each. Alternatively, the cells may have any other shape, or any other dimensions, and may be homogenous or heterogenous in nature. Moreover, in some implementations, the set of cells 776-2-*n* may include fewer than all of the n cells of the input grid 735-2.

In some implementations, the input grid 735-2 may be rotated about a yaw axis of the aerial vehicle 710 with respect to the lower global map 775-2, as necessary, in order to identify the cells 776-2-*n* of the input grid 735-2 that correspond to the lower global map 775-2 in a manner similar to that described above with respect to the input grid 735-1 and the upper global map 775-1. Likewise, in some implementations, the input grid 735-2 may also be translated within a two-dimensional plane with respect to the lower global map 775-2, as necessary, in order to identify portions of the lower global map 775-2 corresponding to the input grid 735-2, in a manner similar to that described above with respect to the input grid 735-1 and the upper global map 775-1.

The values of the cells of the input grids and the values of the cells of the portions of the global map may be used to calculate an adjustment to the altitude determined by the aerial vehicle based on an offset of altitude determined according to one or more cost functions. As is shown in FIG. 7D, a first cost function 792 for determining an offset of altitude with respect to the upper surface 765-1, which is shown above in Equation (1), may consider the values $G_i$ of the m cells 776-1-*m* of the upper global map 775-1 and the values $I_i$ of the m cells 736-1-*m* of the input grid 735-1. A second cost function 794 for determining an offset of altitude with respect to the lower surface 765-2, which is shown above in Equation (2), may consider the values $G_j$ of the n cells 776-2-*n* of the lower global map 775-2 and the values $I_j$ of the n cells 736-2-*n* of the input grid 735-2. A third cost function 795 may calculate an overall offset 790 of altitude based on the offset of altitude with respect to the upper surface 765-1, and the offset of altitude with respect to the lower surface 765-2, which is shown above in Equation (3).

Once the offset 790 has been calculated, an adjusted altitude 715-2, or z, may be calculated by adding the offset 790 to the altitude 715-1 or subtracting the offset 790 from the altitude 715-1, as appropriate.

Figure 8A:
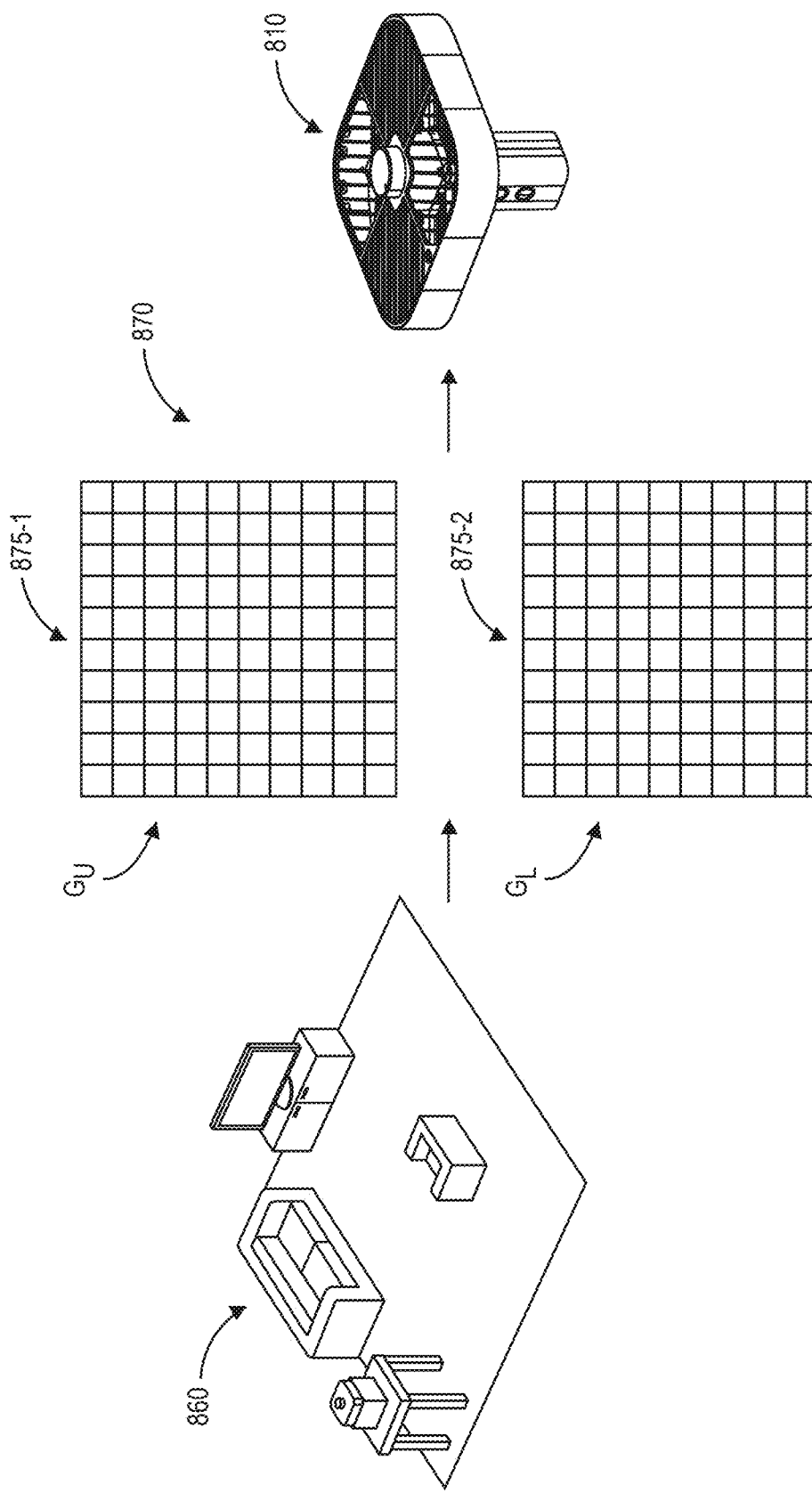
FIGS. 8A through 8C are views of aspects of one system in accordance with embodiments of the present disclosure.
Figure 8B:
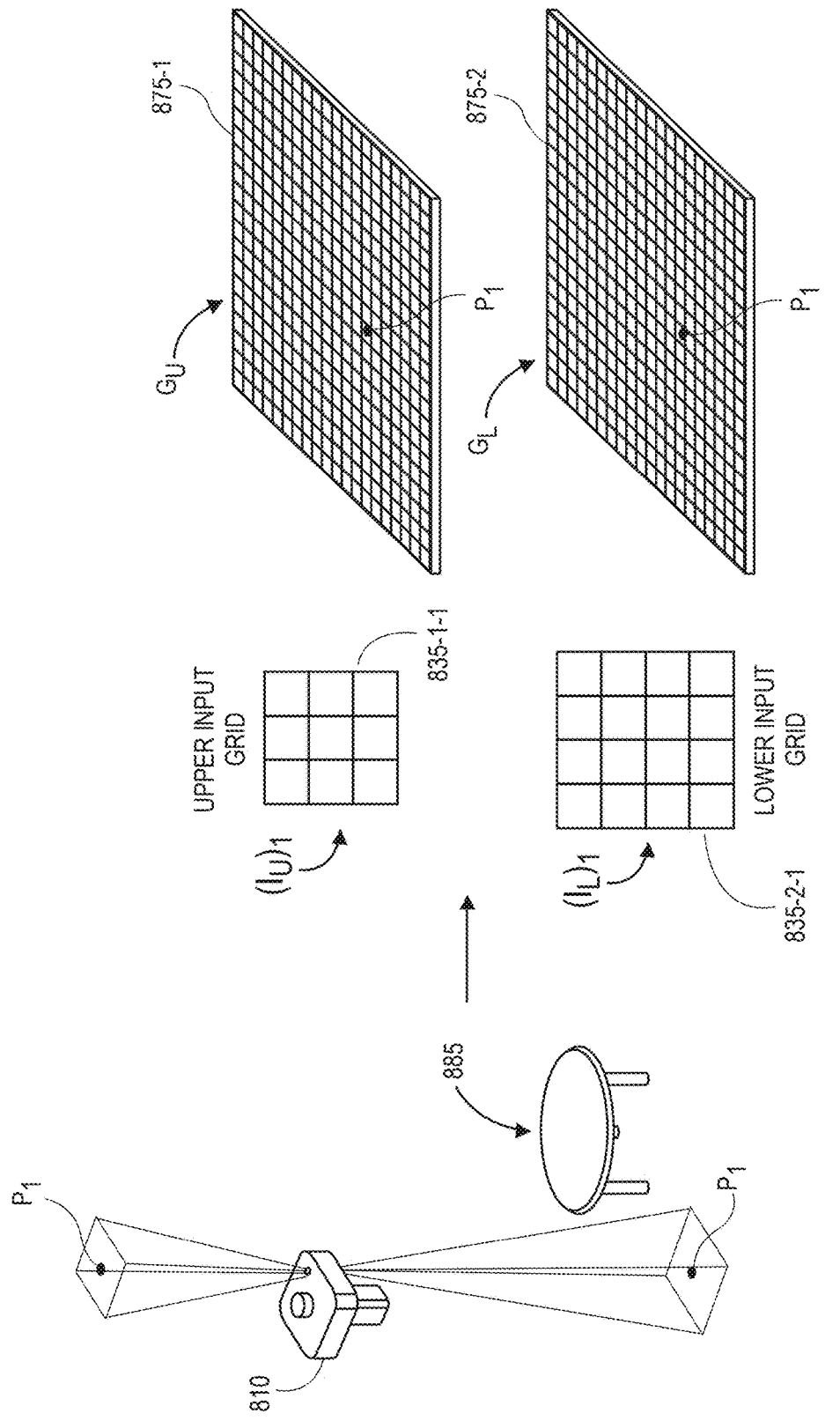
Figure 8C:
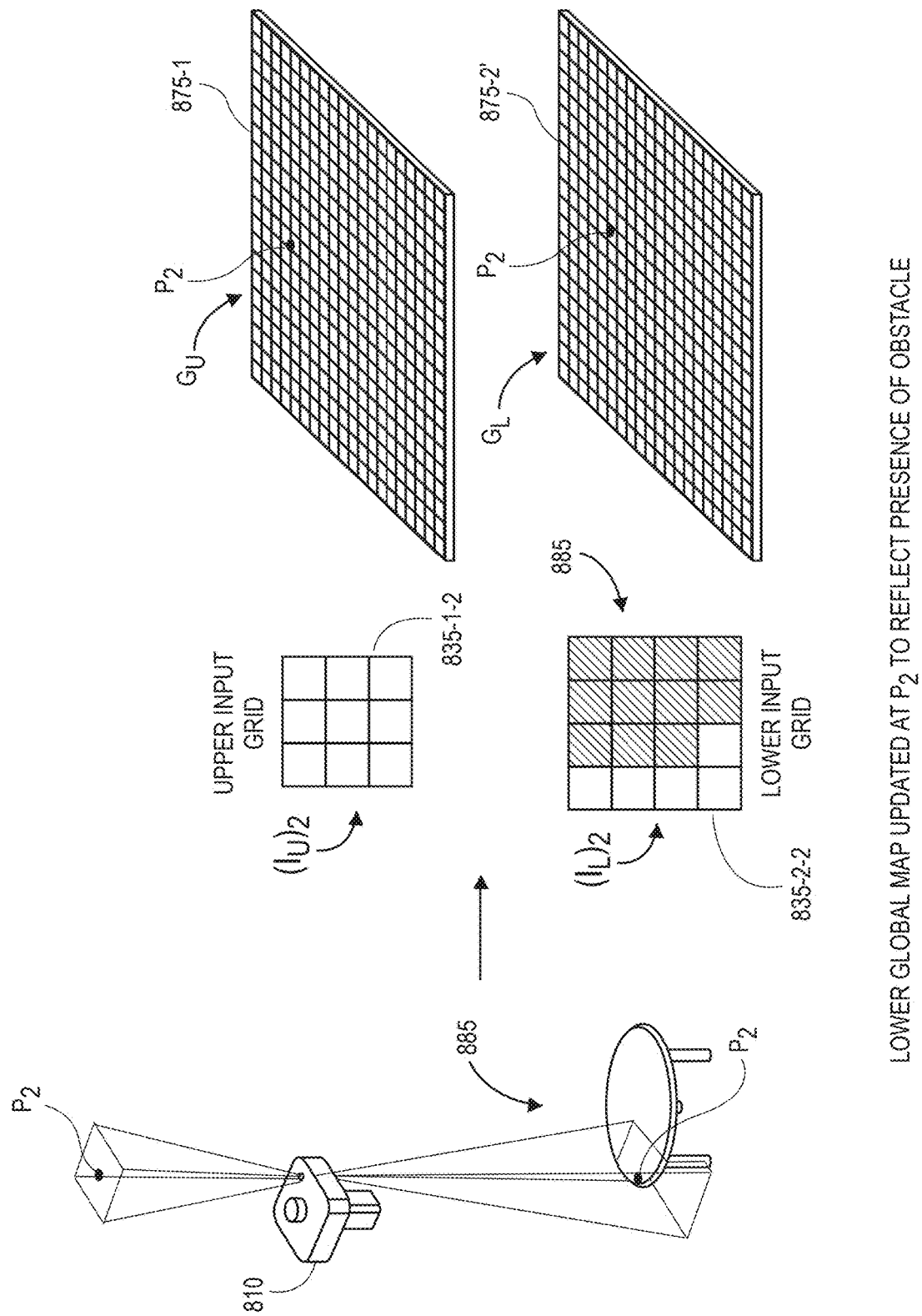

As is discussed above, an aerial vehicle may update a global map upon detecting obstacles within an indoor space. Referring to FIGS. 8A through 8C, views of aspects of one system in accordance with embodiments of the present disclosure are shown. Except where otherwise noted, reference numerals preceded by the number "8" shown in FIGS. 8A through 8C indicate components or features that are similar to components or features having reference numerals preceded by the number "7" shown in FIGS. 7A through 7D, by the number "6" shown in FIGS. 6A through 6F, by the number "4" shown in FIGS. 4A through 4C, by the number "3" shown in FIGS. 3A through 3C, by the number "2" shown in FIG. 2 or by the number "1" shown in FIGS. 1A through 1G.

As is shown in FIG. 8A, an aerial vehicle 810 may be programmed with data 870 representing an upper global map 875-1, or $G_U$, and a lower global map 875-2, or GL, corresponding to upper and lower surfaces of a facility 860 (e.g., one or more rooms or spaces of any type or form). The upper global map 875-1 may represent distances from a datum (or another altitude or level) within the facility 860 to surfaces above the aerial vehicle 810 at various positions, and the lower global map 875-2 may represent distances from the datum within the facility to surfaces below the aerial vehicle 810 at various positions. For example, as is discussed above, each of the upper global map 875-1 and the lower global map 875-2 may include values representing the distances in cells (or elements) having fixed dimensions, e.g., a square having sides of ten centimeters each.

The upper global map 875-1 and the lower global map 875-2 may have been generated in any manner, such as is shown in FIGS. 6A through 6F, e.g., based on distance data captured by the aerial vehicle 810, or by any other aerial vehicles, traveling throughout the facility 860, or in any other manner. In some implementations, the datum may relate or be defined by an initial position of the aerial vehicle 810, or a location of a dock (or docking station) for the aerial vehicle 810 within the facility 860. Alternatively, the datum may be any other altitude or level associated with the aerial vehicle 810 or the facility 860.

As is shown in FIG. 8B, when the aerial vehicle 810 is at a position $P_1$ within the facility 860, the aerial vehicle 810 captures data regarding distances between the aerial vehicle 810 and a ceiling (or other objects or surfaces) above the aerial vehicle and a floor (or other objects or surfaces) using a range sensor 830-1 and distances between the aerial vehicle 810 and the floor 865-2 or other objects or surfaces using a range sensor 830-2. Input frames or other representations of the data captured may be processed to generate input grids 835-1-1, 835-2-1 of cells, or $(I_U)_1$, $(I_L)_1$. The input grids 835-1-1, 835-2-1 may be used to calculate an offset of altitude of the aerial vehicle 810 and to update an altitude determined by the aerial vehicle 810 at the position $P_1$ accordingly. Additionally, any differences between the cells of the input grids 835-1-1, 835-2-1 and the cells of the upper global map 875-1 or lower global map 875-2 may be used to update either or both of the global maps 875-1, 875-2 accordingly.

As is also shown in FIG. 8B, because the surfaces above and beneath the aerial vehicle 810 at position $P_1$ are predominantly a ceiling and a floor, respectively, which presumably do not substantially change over time, neither the upper global map 875-1 nor the lower global map 875-2 corresponding to the position $P_1$ need be updated to any substantial extent.

As is shown in FIG. 8C, when the aerial vehicle 810 is at a position P2 within the facility 860, e.g., directly above an obstacle 885 (viz., a table) that was not within the facility 860 when the upper global map 875-1 and the lower global map 875-2 were generated, or which is otherwise not represented within the lower global map 875-2 of the data 870, the aerial vehicle 810 captures data regarding distances between the aerial vehicle 810 and the ceiling and the floor and the obstacle 885 using the range sensors 830-1, 830-2. Input grids 835-1-2, 835-2-2 of cells generated based on the data, or $(I_U)_2$, $(I_L)_2$, may be used to calculate an offset of altitude of the aerial vehicle 810 and to update an altitude determined by the aerial vehicle 810 at the position P2 accordingly. Additionally, any differences between the cells of the input grids 835-1-2, 835-2-2 and the cells of the upper global map 875-1 or lower global map 875-2 may be used to update such portions 875-1, 875-2 accordingly.

As is also shown in FIG. 8C, because the obstacle 885 is present on the floor, an updated lower global map 875-2' corresponding to the position P2 may be generated to include data representing distances between the datum and surfaces of the obstacle 885. Subsequently, the aerial vehicle 810, or any other aerial vehicles, may utilize the upper global map 875-1 and the updated global map 875-2' when traveling throughout the facility 860, e.g., to calculate offsets of altitude, or for any other purpose.

The contents of U.S. patent application Ser. Nos. 16/584,721 and 17/029,688, and International Patent Application No. PCT/US2020/052268, are incorporated by reference herein in their entireties.

Although some embodiments of the present disclosure show the use of unmanned aerial vehicles in support of one or more applications or functions at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function. Moreover, none of the embodiments or implementations described herein is limited to use only by aerial vehicles having structures, geometries or configurations shown in the drawings or described herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 5, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   storing a first set of distance values;
   determining, based at least in part on data generated by a first range sensor of an unmanned aerial vehicle, a second set of distance values;
   determining, based at least in part on pose data for the unmanned aerial vehicle, that a first distance value of the second set of distance values corresponds to a second distance value of the first set of distance values;
   determining an optimized value for a first variable based at least in part on a deviation function, wherein an output value of the deviation function is minimized based at least in part on determining that the first distance value corresponds to the second distance value;
   determining an altitude of the unmanned aerial vehicle based at least in part on the optimized value; and
   updating the second distance value of the first set of values based at least in part on the altitude.

2. The method of claim 1, further comprising:
   storing a third set of distance values;
   determining, based at least in part on data generated by a second range sensor of the unmanned aerial vehicle, a fourth set of distance values; and
   determining, based at least in part on the pose data for the unmanned aerial vehicle, that a third distance value of the fourth set of distance values corresponds to a fourth distance value of the third set of distance values,
   wherein the output value of the deviation function is determined based at least in part on the third distance value and the fourth distance value, and
   wherein the method further comprises:
      updating the fourth distance value of the second set of values based at least in part on the altitude.

3. The method of claim 2, wherein the first set of distance values represent a first reference map,
   wherein the third set of distance values represent a second reference map,
   wherein the second set of distance values represents a first input grid, and
   wherein the fourth set of distance values represents a second input grid.

4. The method of claim 2, further comprising:
   determining, based at least in part on the pose data for the unmanned aerial vehicle,
      one or more distance values of the second set of distance values that each correspond to a distance value of the first set of distance values, wherein the one or more distance values of the second set of distance values includes the first distance value; and
      one or more distance values of the fourth set of distance values that each correspond to a distance value of the third set of distance values, wherein the one or more distance values of the fourth set of distance values includes the third distance value,
   wherein the output value of the derivation function is determined based at least in part on the one or more distance values of the third set of distance values and the one or more distance values of the first set of distance values.

5. The method of claim 1, wherein determining that the first distance value of the second set of distance values corresponds to the second distance value of the first set of distance values comprises:
   determining a first position in a coordinate system associated with the first distance value;
   determining a second position in the coordinate system associated with the second distance value; and
   determining that the first position corresponds to the second position.

6. The method of claim 1, wherein determining that the first distance value of the second set of distance values corresponds to the second distance value of the first set of distance values comprises:
  determining a first set of one or more positions in a coordinate system associated with the first distance value;
  determining a second set of one or more positions in the coordinate system associated with the second distance value; and
  determining that at least one position of the first set of one or more positions corresponds to at least one position of the second set of one or more positions.

7. The method of claim 6, wherein the second set of one or more positions represents boundaries of a grid cell associated with the second distance value.

8. The method of claim 6, wherein the first set of one or more positions comprises a first position representing a center of a grid cell associated with the first distance value.

9. The method of claim 6, wherein determining that the at least one position of the first set of one or more positions corresponds to the at least one position of the second set of one or more positions comprises:
  determining an area of overlap between a first grid cell defined by the first set of one or more positions and a second grid cell defined by the second set of one or more positions.

10. The method of claim 1, further comprising:
  determining, based at least in part on the pose data for the unmanned aerial vehicle, a respective set of one or more positions in a coordinate system for each distance value of the second set of distance values,
  wherein the respective set of one or more positions represents a grid cell.

11. The method of claim 10, further comprising:
  determining, based at least in part on the pose data for the unmanned aerial vehicle, a respective position in a coordinate system for each distance value of the second set of distance values; and
  determining a respective grid cell to which the respective position that is defined with respect to the coordinate system determined for each value of the second set of distance values corresponds.

12. The method of claim 11, wherein determining that the first distance value of the second set of distance values corresponds to the second distance value of the first set of distance values comprises:
  determining that the grid cell to which a position in the coordinate system corresponding to the first distance value corresponds to a grid cell associated with the second distance value.

13. The method of claim 1, wherein determining that the first distance value of the second set of distance values corresponds to the second distance value of the first set of distance values comprises:
  determining that a first grid cell associated with the first distance value corresponds to a second grid cell associated with the second distance value.

14. The method of claim 1, wherein each value of the first set of values indicates a distance to detected matter from a respective position within a first plane associated with the unmanned aerial vehicle.

15. The method of claim 1, wherein the data generated by the first range sensor of the unmanned aerial vehicle comprises data representing distance and angle measurements.

16. The method of claim 1, wherein the first range sensor comprises a time of flight sensor.

17. The method of claim 1, wherein the pose data for the unmanned aerial vehicle comprises a two-dimensional position and yaw angle of the unmanned aerial vehicle relative to a two-dimensional coordinate system.

18. The method of claim 1, wherein determining the optimized value comprises:
  calculating, for each of a plurality of values of the first variable, a respective output value;
  determining a lowest value of the output values calculated for the plurality of values of the first variable; and
  determining a value of the plurality of values corresponding to the lowest value of the output values, wherein the value is the optimized value.

19. The method of claim 1, wherein determining the optimized value comprises:
  utilizing gradient descent.

20. The method of claim 1, wherein determining the optimized value comprises:
  utilizing an exhaustive search algorithm.

21. The method of claim 1, further comprising:
  determining a first position in a coordinate system associated with the first distance value based at least in part on orientation data indicating a pitch angle of the unmanned aerial vehicle.

22. The method of claim 1, further comprising:
  determining an unprojected distance value based at least in part on a projected distance value provided by a sensor interface; and
  determining a first position in a coordinate system associated with the first distance value based at least in part on the unadjusted distance value and orientation data indicating a pitch angle of the unmanned aerial vehicle.

* * * * *